US009863694B2

(12) United States Patent
Broadbent

(10) Patent No.: US 9,863,694 B2
(45) Date of Patent: Jan. 9, 2018

(54) CONTROLLING REFRIGERATION APPLIANCES WITH A PORTABLE ELECTRONIC DEVICE

(71) Applicant: True Manufacturing Company, Inc., O'Fallon, MO (US)

(72) Inventor: John Allen Broadbent, Denver, CO (US)

(73) Assignee: True Manufacturing Company, Inc., O'Fallon, MO (US)

(*) Notice: Subject to any disclaimer, the term of this patent is extended or adjusted under 35 U.S.C. 154(b) by 633 days.

(21) Appl. No.: 14/172,374

(22) Filed: Feb. 4, 2014

(65) Prior Publication Data

US 2014/0216071 A1     Aug. 7, 2014

Related U.S. Application Data

(60) Provisional application No. 61/760,925, filed on Feb. 5, 2013.

(51) Int. Cl.
*F25C 1/00* (2006.01)
*G05B 23/02* (2006.01)
(Continued)

(52) U.S. Cl.
CPC ............ *F25D 29/00* (2013.01); *H04L 12/281* (2013.01); *H04L 12/2809* (2013.01);
(Continued)

(58) Field of Classification Search
CPC ............ F25B 2600/07; F25C 2400/12; F25C 2600/04; F25D 2400/361; F25D 29/00; H04L 12/2809; H04L 12/281
(Continued)

(56) References Cited

U.S. PATENT DOCUMENTS 7,085,623 B2 * 8/2006 Siegers .............. G05B 19/4184
                                                         318/568.11
7,110,836 B2    9/2006 Sturm et al.
(Continued)

FOREIGN PATENT DOCUMENTS

EP          2592785          5/2013
JP       2007292421         11/2007
(Continued)

OTHER PUBLICATIONS

Patent Cooperation Treaty, International Search Report for PCT/US2014/014636 dated May 12, 2014, 3 pages May 12, 2014
(Continued)

*Primary Examiner* — Henry Crenshaw
(74) *Attorney, Agent, or Firm* — Bryan Cave LLP

(57) ABSTRACT

A method of interacting with a refrigeration appliance using a portable electronic device, wherein the refrigeration appliance comprises a refrigeration system comprising one or more refrigeration components and a controller adapted to control the one or more refrigeration components and wherein the portable electronic device comprises an application for interacting with the controller of the refrigeration appliance. The method comprising the steps of positioning the portable electronic device in proximity to the refrigeration appliance, establishing a wireless communication connection between the refrigeration appliance and the portable electronic device, and displaying information on the portable electronic device corresponding to the refrigeration appliance to which the portable electronic device is connected.

30 Claims, 54 Drawing Sheets

(51) Int. Cl.
  *H04B 10/00* (2013.01)
  *H04M 1/00* (2006.01)
  *G05B 15/00* (2006.01)
  *F25D 29/00* (2006.01)
  *H04L 12/28* (2006.01)
  *H04L 29/08* (2006.01)

(52) U.S. Cl.
  CPC ........ *H04L 67/125* (2013.01); *F25B 2600/07* (2013.01); *F25C 2400/12* (2013.01); *F25C 2600/04* (2013.01); *F25D 2400/361* (2013.01)

(58) Field of Classification Search
  USPC ............ 62/66; 340/3.1; 398/135; 455/556.1; 700/83
  See application file for complete search history.

(56) References Cited

U.S. PATENT DOCUMENTS

| | | | | |
|---|---|---|---|---|
| 7,177,706 | B2* | 2/2007 | Schweizer | A63G 7/00 340/3.1 |
| 7,676,287 | B2* | 3/2010 | Eryurek | G05B 23/0221 700/1 |
| 7,856,185 | B2 | 12/2010 | Hudgins et al. | |
| 7,904,219 | B1* | 3/2011 | Lowrey | G01C 21/26 701/32.3 |
| 2001/0025245 | A1* | 9/2001 | Flickinger | G06Q 10/06 705/1.1 |
| 2002/0143564 | A1* | 10/2002 | Webb | G06Q 10/087 705/305 |
| 2002/0151327 | A1* | 10/2002 | Levitt | G06F 17/30867 455/556.1 |
| 2004/0230327 | A1* | 11/2004 | Opheim | G05B 19/0428 700/83 |
| 2006/0255128 | A1* | 11/2006 | Johnson | G06Q 20/12 235/380 |
| 2007/0156492 | A1* | 7/2007 | Hawkins | G06Q 10/06 705/7.26 |
| 2009/0276239 | A1* | 11/2009 | Swart | A61L 2/00 705/2 |
| 2010/0283573 | A1* | 11/2010 | Yum | F25D 29/00 340/3.1 |
| 2010/0304787 | A1 | 12/2010 | Lee et al. | |
| 2016/0117646 | A1* | 4/2016 | Lerick | G06Q 10/067 705/7.21 |

FOREIGN PATENT DOCUMENTS

| | | |
|---|---|---|
| KR | 100880487 | 1/2009 |
| KR | 1020110096772 | 8/2011 |
| KR | 1020120080084 | 7/2012 |
| WO | 2012005512 | 1/2012 |

OTHER PUBLICATIONS

Patent Cooperation Treaty, International Search Report for PCT/US2014/014933, dated Jul. 10, 2014, 2 pages Jul. 10, 2014

* cited by examiner

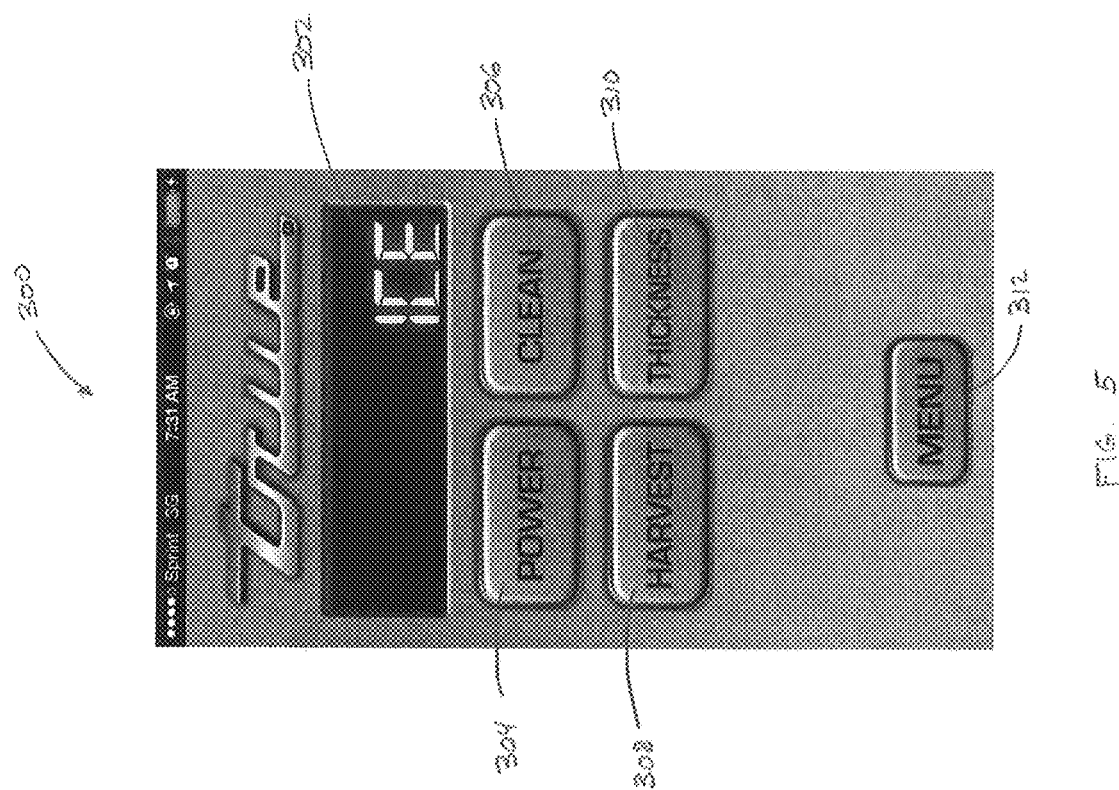

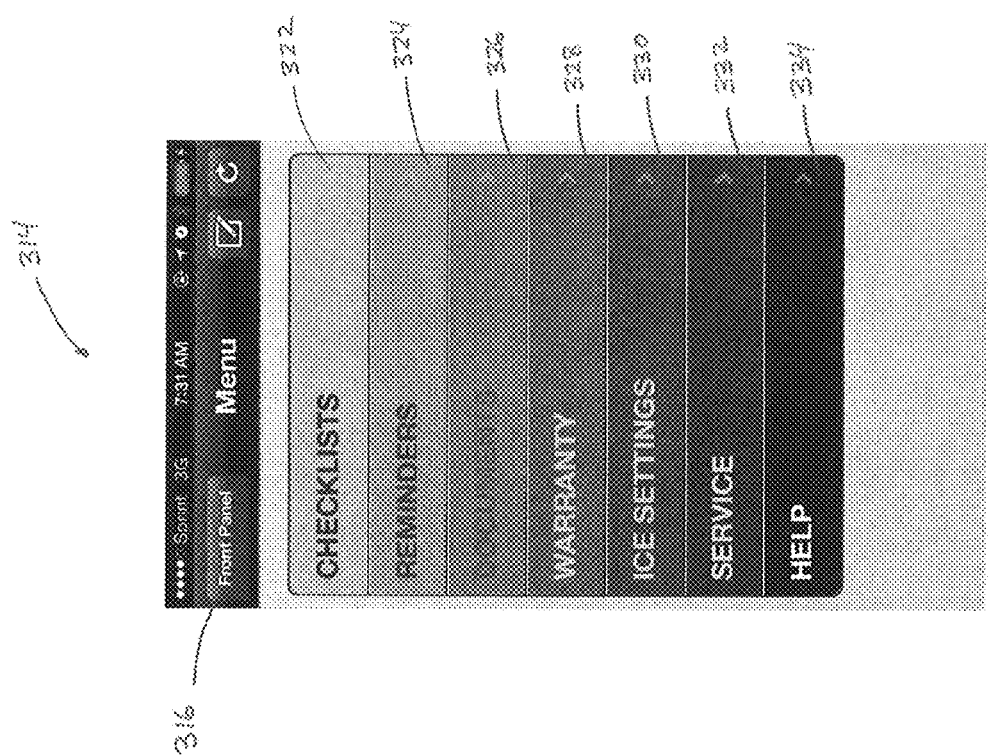

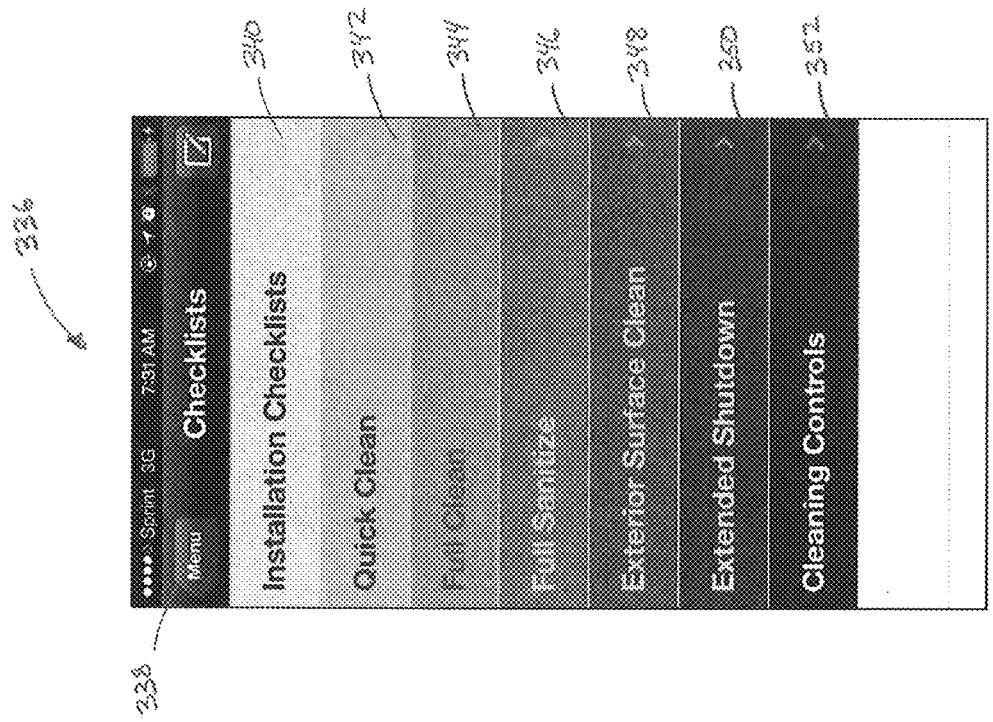

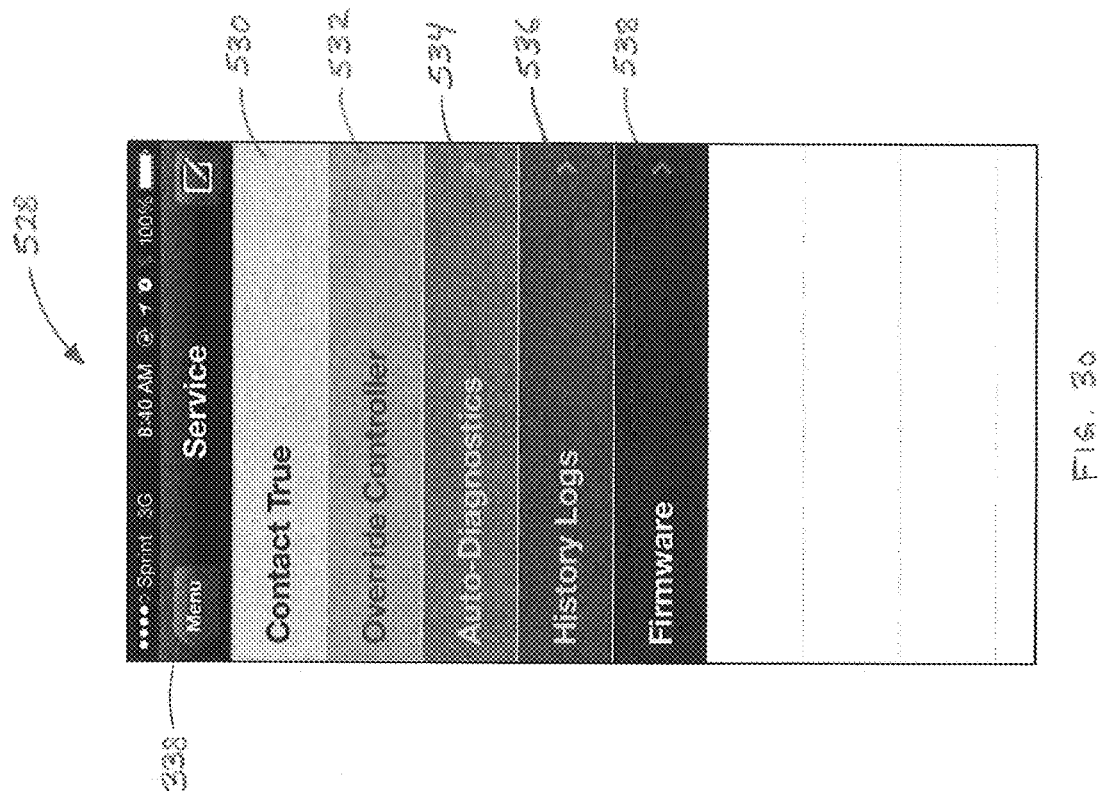

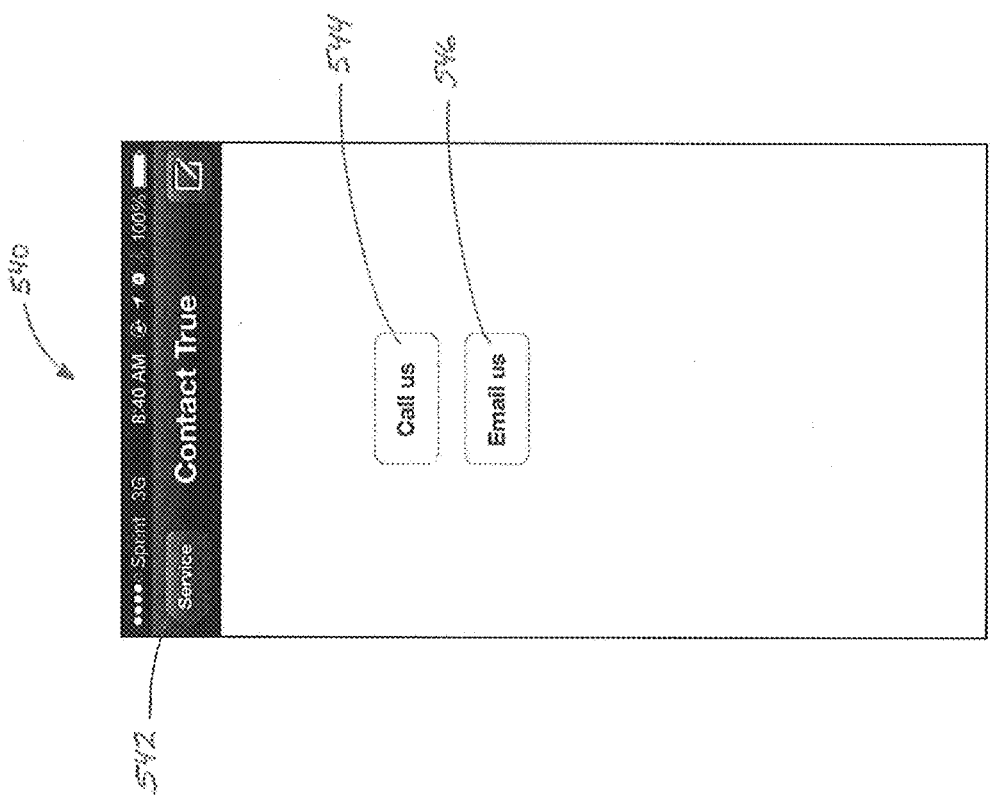

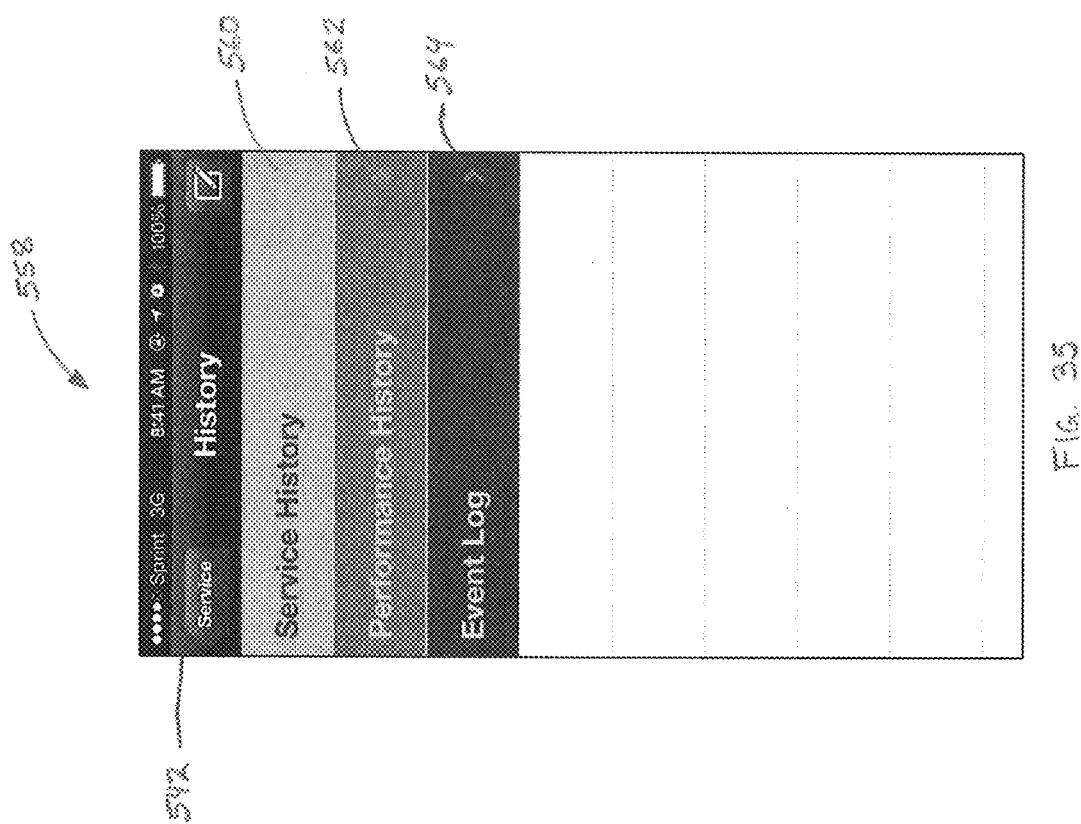

| Day | Ice (lbs) | Energy(kwh) | Water(lbs) |
|---|---|---|---|
| Sun | 320 | 240 | 416 |
| Mon | 510 | 382 | 663 |
| Tue | 495 | 371 | 643 |
| Wed | 502 | 376 | 652 |
| Thu | 400 | 300 | 520 |
| Fri | 520 | 390 | 676 |
| Sat | 525 | 393 | 682 |

Ice: Pounds of ice produced per day
Energy: kWH of electricity consumed per day
Water: Gallons of water consumed per day

| Date | Service | By |
|---|---|---|
| 09/05/13 | Installed | Broadb... |
| 09/05/13 | Installed | Broadb... |
| 09/05/13 | Installed | Broadb... |

Event Log

History

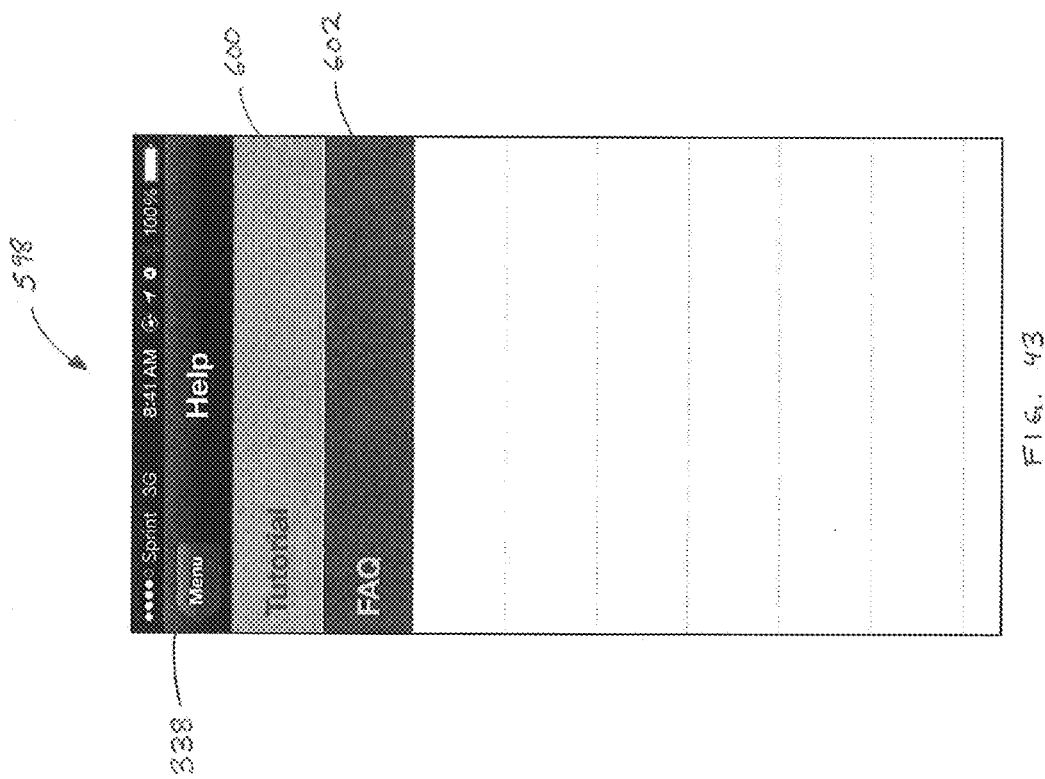

US 9,863,694 B2

CONTROLLING REFRIGERATION APPLIANCES WITH A PORTABLE ELECTRONIC DEVICE

FIELD OF THE INVENTION

This invention relates to refrigeration appliances generally and in particular to utilizing a portable electronic device to interact with a variety of refrigeration appliances including commercial, residential and/or industrial ice makers, refrigerators, and/or freezers.

BACKGROUND OF THE INVENTION

Refrigeration appliances such as commercial, residential and/or industrial ice makers, refrigerators, and/or freezers are well known in the art. Typically these refrigeration appliances have simplistic interfaces and are not highly controllable. However, while refrigeration appliances such as commercial, residential and/or industrial ice makers, refrigerators, and/or freezers are not typically viewed as such, refrigeration appliances are food processing devices that should be maintained in order to keep them in proper and sanitary operating condition.

A richer user experience would be helpful to operators of refrigeration appliances in maintaining and controlling the parameters of operation of refrigeration appliances. However, the refrigeration appliance market is a commercially competitive market and the addition of interfaces like keyboards and large displays would increase the price of refrigeration appliances, such as commercial, residential and/or industrial ice makers, refrigerators, and/or freezers, to an uncompetitive level. Therefore, there exists a need in the art for systems, methods and apparatuses for interacting with and/or controlling refrigeration appliances while not dramatically increasing the cost of individual refrigeration appliances.

SUMMARY OF THE INVENTION

Briefly, therefore, one embodiment of the invention is directed to a method of interacting with a refrigeration appliance using a portable electronic device, wherein the refrigeration appliance comprises a refrigeration system comprising one or more refrigeration components and a controller adapted to control the one or more refrigeration components and wherein the portable electronic device comprises an application for interacting with the controller of the refrigeration appliance. The method comprising the steps of positioning the portable electronic device in proximity to the refrigeration appliance, establishing a wireless communication connection between the refrigeration appliance and the portable electronic device, and displaying information on the portable electronic device corresponding to the refrigeration appliance to which the portable electronic device is connected.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the invention, and wherein:

FIGS. 5-43 are screen shots of an application for interacting with and/or controlling a refrigeration appliance with a portable electronic device according to various embodiments of the invention.

DETAILED DESCRIPTION

Figure 1A:
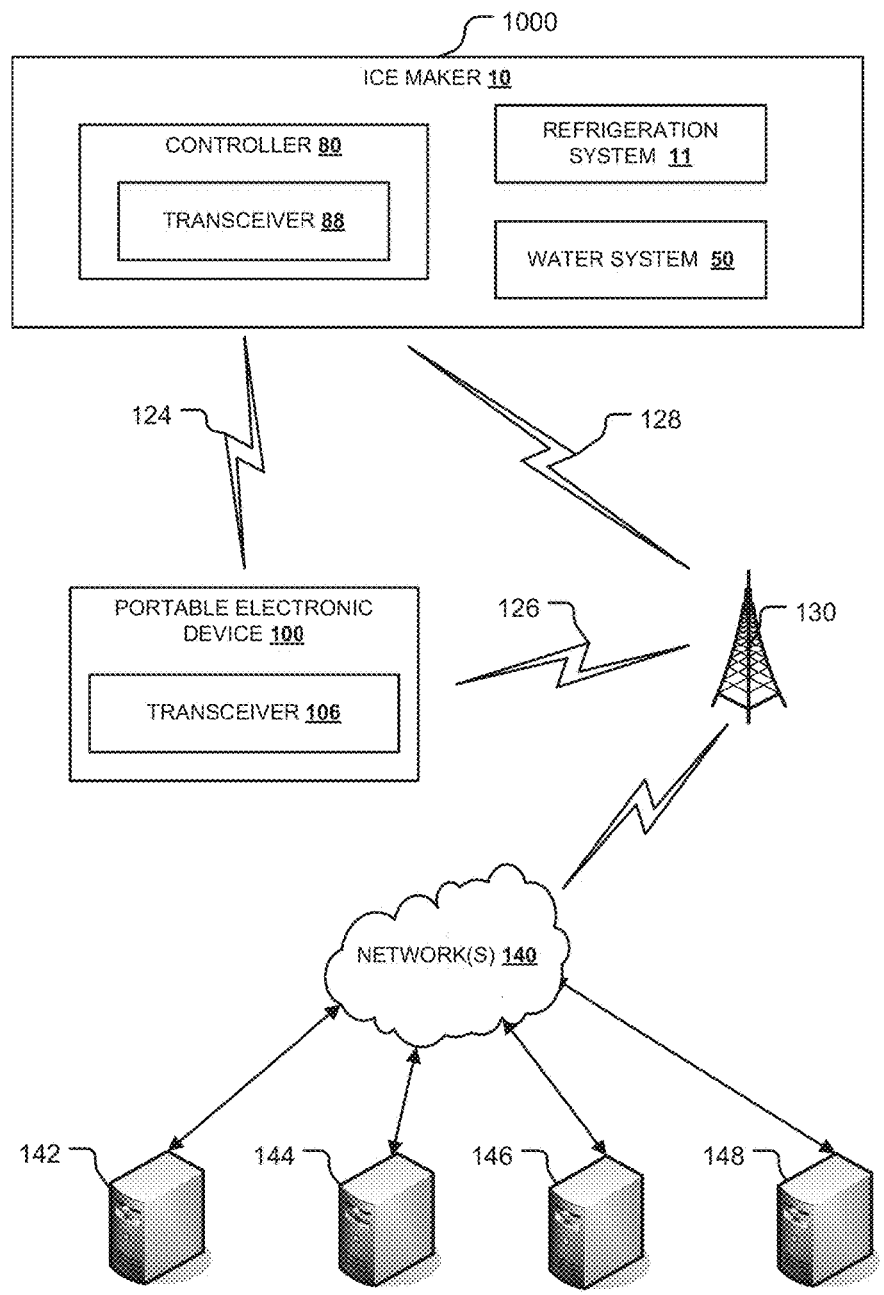
FIG. 1A is a diagram of a system according to one embodiment of the invention.

The invention is not limited in its application to the details of construction and the arrangement of components set forth in the following description or illustrated in the following drawings. The invention is capable of other embodiments and of being practiced or of being carried out in various ways. The phraseology and terminology used herein is for the purpose of description and should not be regarded as limiting. For example, the use of "including," "comprising," or "having" and variations thereof herein is meant to encompass the items listed thereafter and equivalents thereof as well as additional items.

Embodiments of the invention provide novel and unique means for controlling, maintaining and repairing refrigeration appliances including commercial, residential and/or industrial ice markers, refrigerators, and/or freezers. The portable electronic device may be able to connect to the refrigeration appliance(s) to send to and receive data from the refrigeration appliance. Embodiments of the invention allow a user to use a portable electronic device to interact with the ice maker, refrigerator and/or freezer. The interaction may include, but is not limited to, controlling, installing, diagnosing, setting and/or modifying operating parameters, and for servicing, cleaning, etc. Embodiments of the invention may also allow the use of a portable electronic device to set up and receive reminders and/or alerts pertaining to maintenance tasks, view documents pertaining to the refrigeration appliance to which the portable electronic device is connected, register for a warranty, view warranty information, review operating history of the refrigeration appliance, and to contact the manufacturer, dealer, servicer, etc. Accordingly, embodiments of the invention thus avoid the costly addition of a full user interface to each refrigeration appliance.

As will be appreciated by one skilled in the art, the embodiments of the invention may be embodied as a system, method, computer program product or any combination thereof. Accordingly, the present invention may take the form of an entire hardware embodiment, an entire software embodiment (including firmware, resident software, microcode, etc.) or an embodiment combining software and hardware aspects that may all generally be referred to herein as a "circuit," "module" or "system." Furthermore, the present invention may take the form of a computer program product embodied in any tangible medium having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including, but not limited to, an object oriented programming language such as Java, Smalltalk, C++, C# or the like and conventional procedural programming languages, such as the "C" programming language or similar programming languages. The program code may execute entirely on the portable electronic device, partly on the portable electronic device or refrigeration appliance, as a stand-alone software package, partly on the portable electronic device and partly on a remote computer, or entirely on a remote computer or server. In the latter scenario, the remote computer may be connected to the portable electronic device through any type of network, including a local area network (LAN) or a wide area network (WAN), or the connection may be made to an external computer (for example, through the Internet using an Internet Service Provider).

Figure 1B:
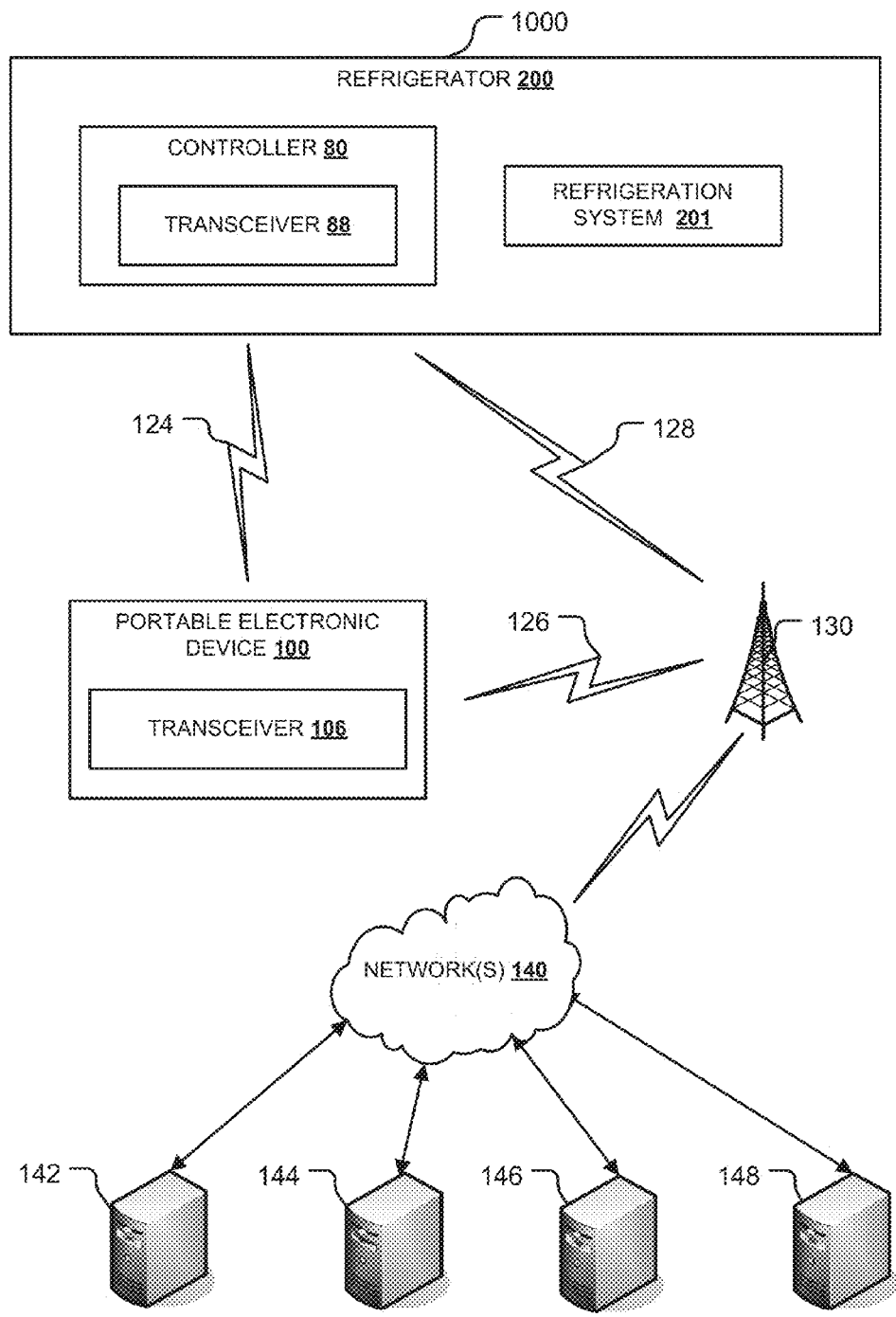
FIG. 1B is a diagram of a system according to one embodiment of the invention.
Figure 1C:
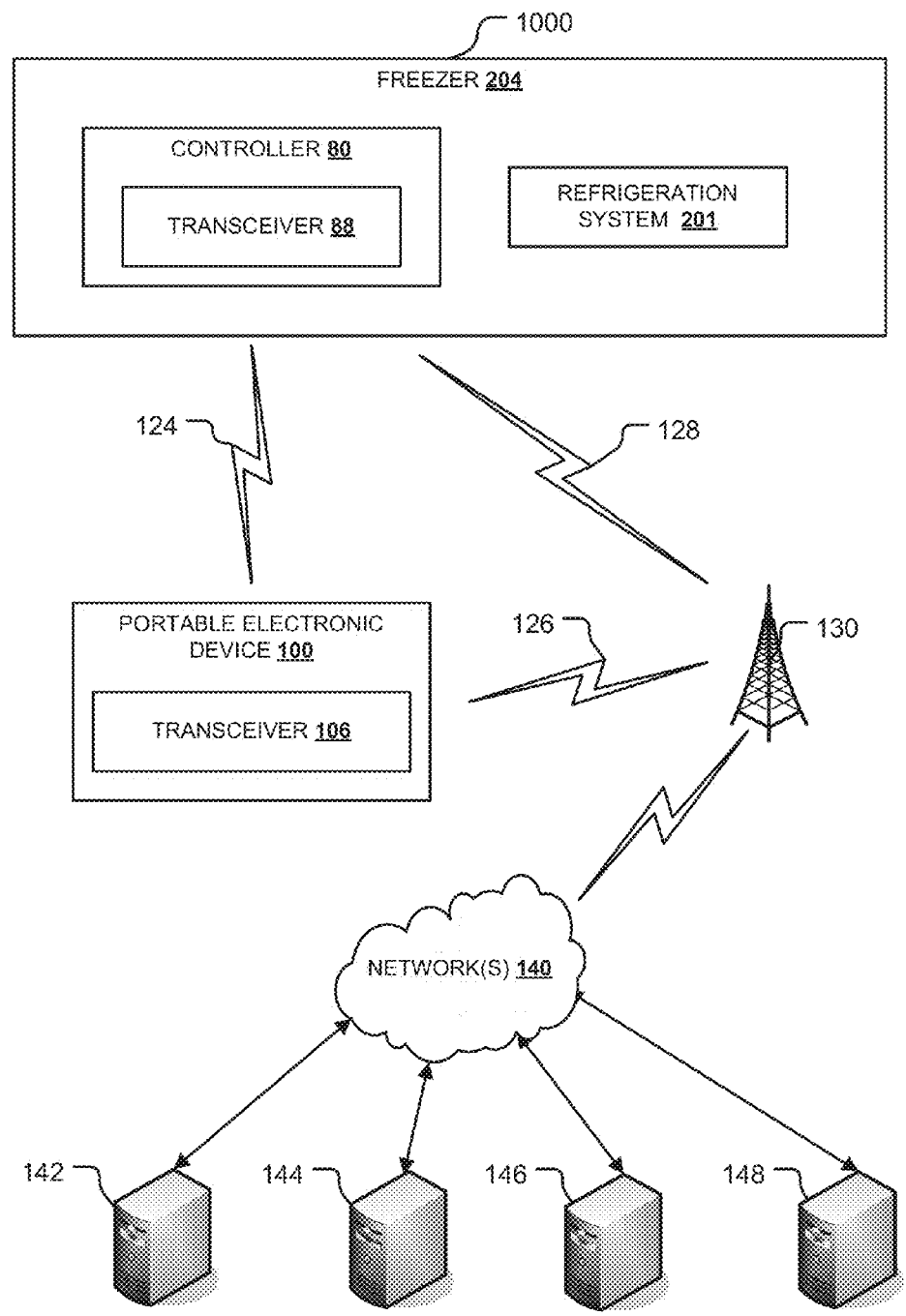
FIG. 1C is a diagram of a system according to one embodiment of the invention.

As illustrated in FIGS. 1A-1C, portable electronic device 100 may be connected to a variety of refrigeration appliances 1000 including, but not limited to, ice makers 10, refrigerators 200, and freezers 204 so that portable electronic device 100 can interact with and/or control the refrigeration appliance(s) 1000. In various embodiments, portable electronic device 100 may include a smartphone, a tablet computer, a portable music player (e.g., an mp3 player), a portable gaming device, a computer, and/or any type of portable electronic device which can be adapted to control ice makers 10, refrigerators 200, and/or freezers 204. Ice makers 10, refrigerators 200, and freezers 204 may be residential, commercial, and/or industrial refrigeration appliances 1000. Portable electronic device 100 may comprise transceiver 106 which can connect to and communicate with ice maker 10, refrigerator 200, and/or freezer 204. Portable electronic device 100 may thus be able to send to and receive data from ice maker 10, refrigerator 200, and/or freezer 204. Accordingly, portable electronic device 100 may be able to access, read, and/or write data on ice maker 10, refrigerator 200, and/or freezer 204. These and other components of portable electronic device 100 will be described more fully elsewhere herein with respect to FIG. 2. Ice maker 10 may comprise refrigeration system 11, water system 50 and controller 80 having transceiver 88. The components of ice maker 10 will be described more fully elsewhere herein with respect to FIG. 3A. Refrigerator 200 may comprise refrigeration system 201 and controller 80 having transceiver 88. These and other components refrigerator 200 will be described more fully elsewhere herein with respect to FIG. 3B. Freezer 204 may comprise refrigeration system 201 and controller 80 having transceiver 88. These and other components of freezer 204 will be described more fully elsewhere herein with respect to FIG. 3C.

As shown in FIGS. 1A, 1B, and 1C, in various embodiments, portable electronic device 100 may communicate directly, via link 124, with refrigeration appliance 1000 (e.g., ice maker 10, refrigerator 200, and/or freezer 204) when portable electronic device 100 is in proximity to refrigeration appliance 1000 in a variety of ways including, but not limited to, Bluetooth®, near field communications (NFC), Wi-Fi, or other wireless communication protocols. As shown in FIG. 1A, in certain embodiments, refrigeration appliance 1000 may be ice maker 10. As shown in FIG. 1B, in certain embodiments, refrigeration appliance 1000 may be refrigerator 200. As shown in FIG. 1C, in certain embodiments, refrigeration appliance 1000 may be refrigerator 204.

In other embodiments, portable electronic device 100 may communicate indirectly with refrigeration appliance 1000

(e.g., ice maker 10, refrigerator 200, and/or freezer 204). Accordingly, in certain embodiments, for example, portable electronic device 100 and refrigeration appliance 1000 (e.g., ice maker 10, refrigerator 200, and/or freezer 204) may connect to wireless access point 130 via links 126, 128, respectively. Wireless access point 130 may communicate using Bluetooth®, Wi-Fi, or other wireless communication protocols. Additionally, portable electronic device 100 and refrigeration appliance 1000 (e.g., ice maker 10, refrigerator 200, and/or freezer 204) may access one or more network(s) 140 via wireless access point 130. Network(s) 140 may include, but are not limited to, a LAN, a WAN, the Internet or any type and/or construction of network known in the art.

One or more servers, computers, or other network components known in the art may be connected to network(s) 140 and may be accessed by portable electronic device 100 and/or refrigeration appliance 1000. In certain embodiments, for example, a computer or server 142 of a portable electronic device 100 manufacturer and/or a portable electronic device 100 operating system 114 (see FIG. 2) developer may be connected to network 140. In other embodiments, for example, a computer or server 144 of the owner of refrigeration appliance 1000 may be additionally or alternatively connected to network 140. In yet other embodiments, for example, a computer or server 146 of the manufacturer of refrigeration appliance 1000 may be additionally or alternatively connected to network 140. In yet other embodiments, for example, a computer or server 148 of a third party including, but not limited to, a servicer of refrigeration appliance 1000, a dealer of refrigeration appliance 1000, etc. may be additionally or alternatively connected to network 140. Accordingly, portable electronic device 100 and/or refrigeration appliance 1000 may be able to send to (e.g., upload) and/or receive (e.g., download) data from one or more of the one or more computers or servers 142, 144, 146, 148, or other network components (not shown) connected to network(s) 140.

Figure 2:
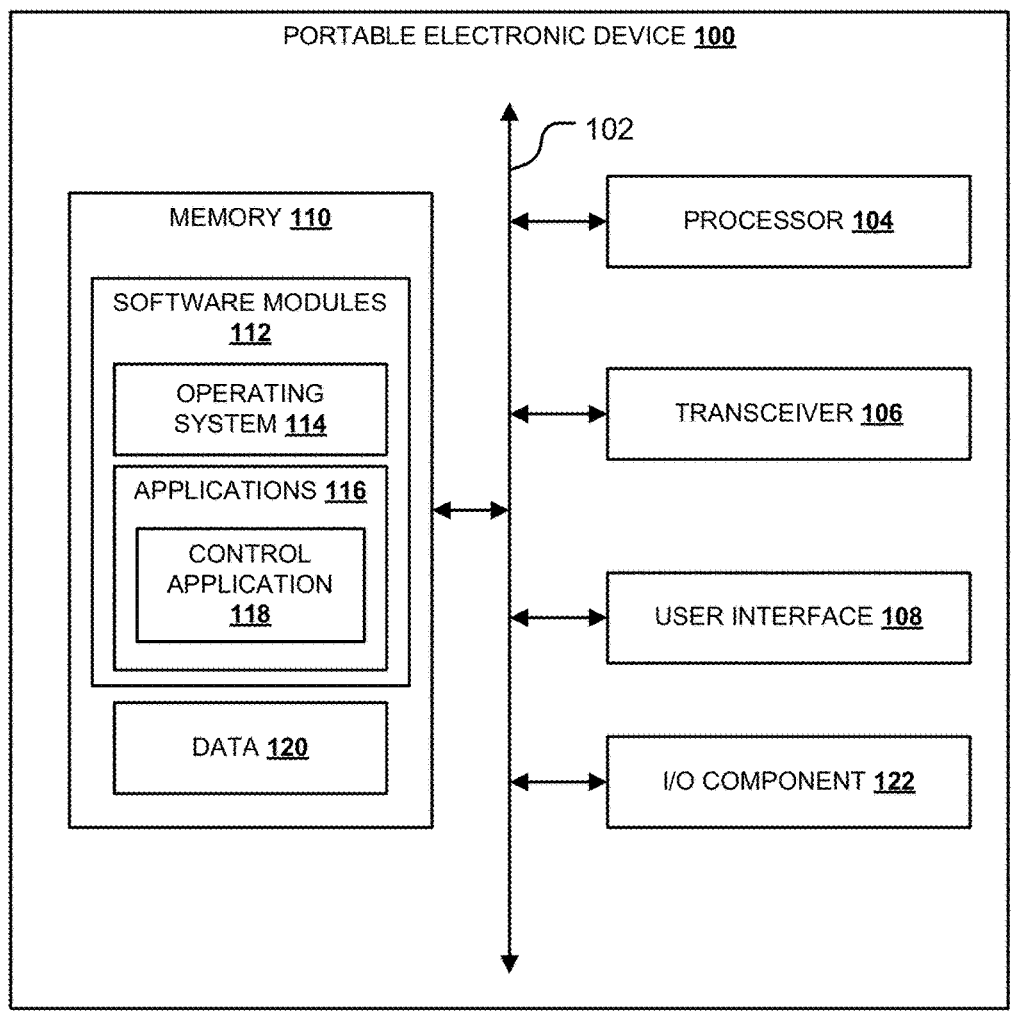
FIG. 2 is a block diagram of a portable electronic device according to one embodiment of the invention.

Referring now to FIG. 2 a block diagram of one embodiment of portable electronic device 100 is described. Portable electronic device 100 may include processor 104, transceiver 106, user interface 108, memory 110 and/or input/output (I/O) component 122. Bus 102 may provide data communication between processor 104, transceiver 106, user interface 108, memory 110 and/or I/O component 122. Processor 104 may control the operation of portable electronic device 100 and may interact with transceiver 106, user interface 108, memory 110 and/or input/output component 122 via bus 102. Processor 104 may be, for example, a commercially available microprocessor, an application-specific integrated circuit (ASIC) or a combination of ASICs, which are designed to achieve one or more specific functions, or enable one or more specific devices or applications. Accordingly, processor 104 may include any type of processor typically used in portable electronic devices including, but not limited to, smartphones, tablets, computers, etc. In certain embodiments, processor 104 may have one or more microprocessors and/or one or more co-processors.

Transceiver 106 may include a population of transceiver modules that can provide a wireless communication connection or link between portable electronic device 100 and a refrigeration appliance 1000. In certain embodiments, for example, transceiver 106 permits portable electronic device 100 to establish a wireless communication connection with ice maker 10, refrigerator 200 and/or freezer 204 as shown by link 124 (see FIGS. 1A-1C). In various embodiments, for example, transceiver 106 permits communication between portable electronic device 100 and ice maker 10, refrigerator 200 and/or freezer 204 via Bluetooth®. In other embodiments, for example, transceiver 106 permits communication between portable electronic device 100 and ice maker 10, refrigerator 200 and/or freezer 204 via near field communication (NFC). In yet other embodiments, transceiver 106 permits communication, directly and/or indirectly between portable electronic device 100 and ice maker 10, refrigerator 200 and/or freezer 204 using a variety of communication protocols, including, but not limited to, GSM, IS-95 (CDMA), UMTS, Wi-Fi, WiMAX, or any other wireless communication protocol. In certain embodiments, for example, transceiver 106 permits portable electronic device 100 to connect to wireless access point 130 via link 126 and to ice maker 10, refrigerator 200 and/or freezer 204 via link 128 instead of or in addition to link 124 (see FIGS. 1A-1C). Additionally, transceiver 106 may permit portable electronic device 100 to access one or more network(s) 140 via wireless access point 130 (see FIGS. 1A-1C). Network(s) 140 (see FIGS. 1A-1C) may include, but are not limited to, a LAN, a WAN, the Internet or any type and/or construction of network known in the art. Accordingly, transceiver 106 may also permit portable electronic device 100 to connect to a remote server, to computers or servers 142, 144, 146, and/or 148, to the Internet, to ice maker 10, refrigerator 200, freezer 204, and/or other portable electronic devices 100 via one or more wide-area, local or other networks.

In certain embodiments, I/O component 122 can include a variety of suitable communication interfaces. For example, I/O component 122 can include wired connections, such as standard serial ports, parallel ports, universal serial bus (USB) ports, S-video ports, local area network (LAN) ports, and small computer system interface (SCSI) ports. Additionally, in other embodiments, I/O component 122 may include, for example, wireless connections, such as infrared ports, optical ports, Bluetooth® wireless ports, wireless LAN ports, or the like.

Memory 110 may include operating memory and data storage memory. The operating memory may include random access memory (RAM) and the data storage memory may include read-only memory (ROM), Flash memory, hard drives, or any other memory/storage element known in the art. In certain embodiments, memory 110 may include magnetic (e.g., hard disk or drive, tape, etc.), optical (e.g., compact disc, DVD, etc.) and/or semiconductor memory (e.g., RAM, ROM, flash memory or drive, etc.), alone or in combination.

In certain embodiments, memory 110 may store software modules 112 which may be executed by processor 104. Software modules 112 may include an operating system 114 and one or more applications 116. In particular embodiments, one application 116 includes a refrigeration appliance control application 118 which may be launched and may permit portable electronic device 100 to interact with and/or control ice maker 10, refrigerator 200 and/or freezer 204. In certain embodiments, refrigeration appliance control application 118 may be pre-installed on portable electronic device 100. In other embodiments, refrigeration appliance control application 118 may be downloaded from one or more of computers or servers 142, 144, 146, and 148.

Additionally, data 120 may be stored in memory 110. Data 120 may include information and/or application data regarding ice maker 10, refrigerator 200, and/or freezer 204 that may be read, written and/or accessed by refrigeration appliance control application 118. Data 120 may also include other application data including, but not limited to, contact lists, images, email messages, text messages, voicemail messages, and/or any other type of data typically stored on a portable electronic device 100. Data 120 may also include a variety of records read, written and/or executed by refrigeration control application 118 as will be described more fully elsewhere herein.

Portable electronic device 100 may also include user interface 108 which may comprise any user interface or presentation element typically included with a portable electronic device, including, but not limited to, a touch-sensitive input surface, a display screen, microphones, speakers, keyboards or keypads, etc. The display screen may be any type and/or construction of display including, but not limited to, a liquid-crystal display (LCD) screen, one or more light emitting diodes (LEDs), etc. without departing from the scope of the invention. Portable electronic device 100 may include other typical components in addition to those described herein without departing from the scope of the invention.

Figure 3A:
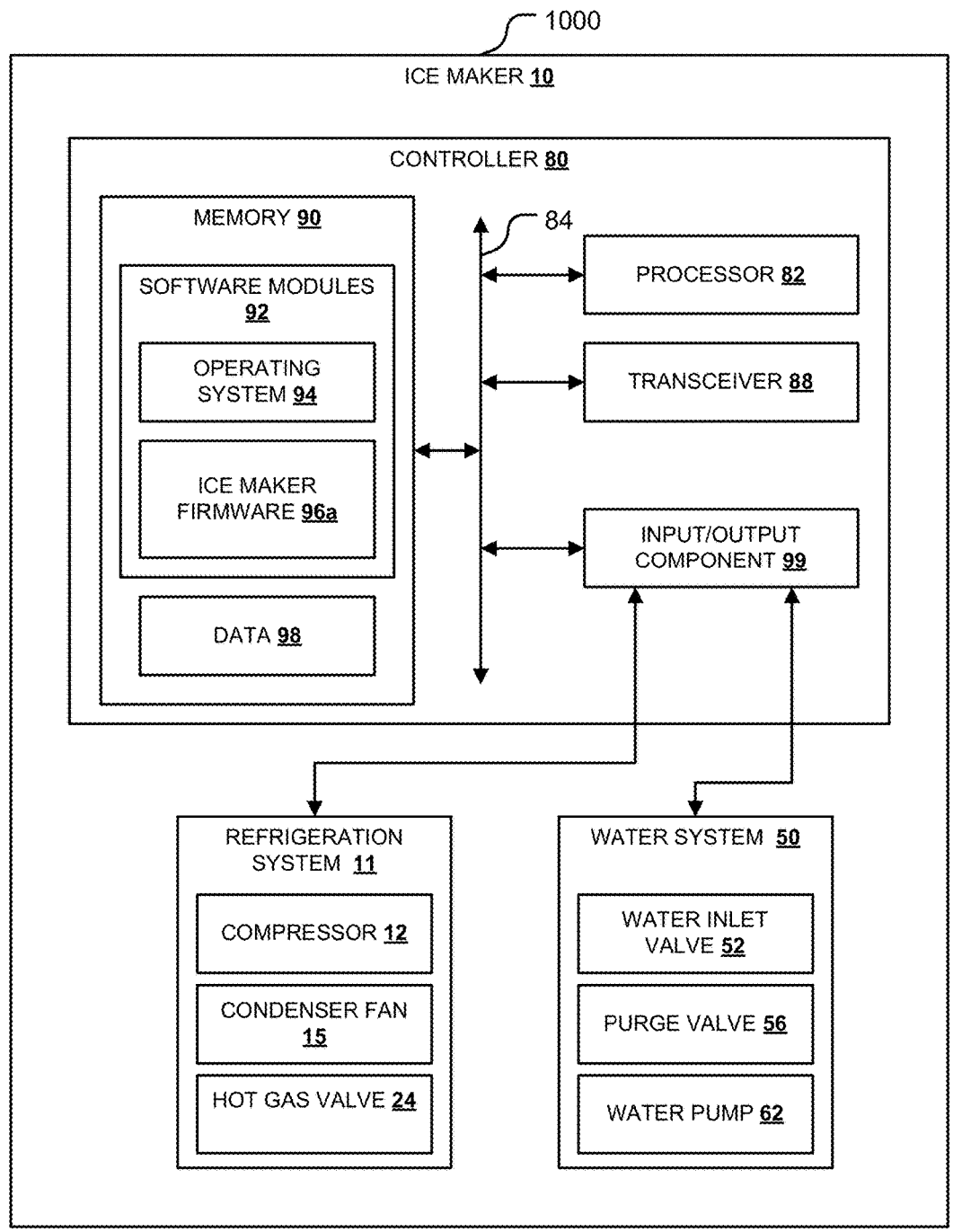
FIG. 3A is a block diagram of an ice maker according to one embodiment of the invention.
Figure 3B:
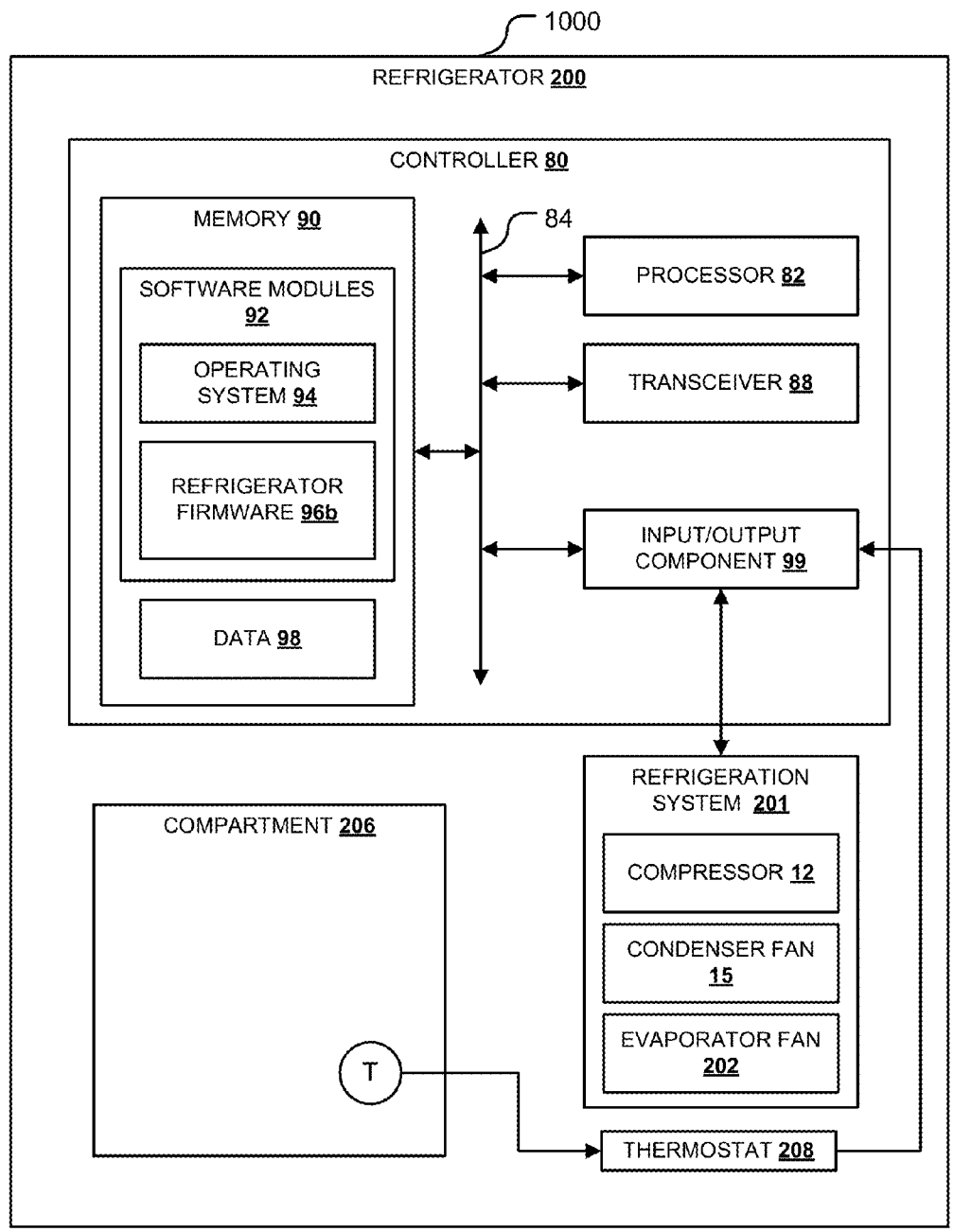
FIG. 3B is a block diagram of a refrigerator according to one embodiment of the invention.
Figure 3C:
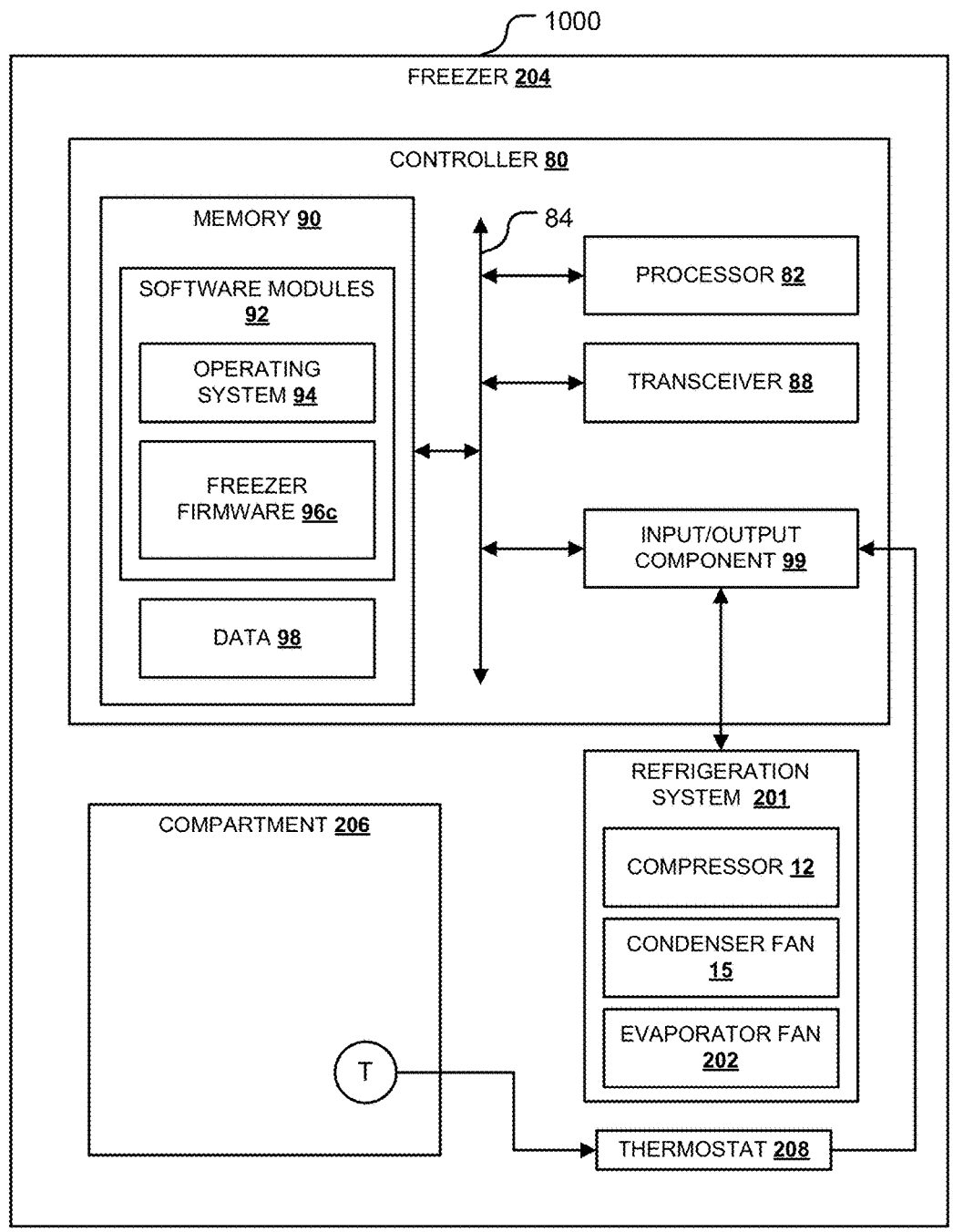
FIG. 3C is a block diagram of a freezer according to one embodiment of the invention.

Referring now to FIGS. 3A-3C, embodiments of refrigeration appliances 1000 including ice maker 10, refrigerator 200 and freezer 204 are described in detail. As illustrated as a block diagram in FIG. 3A, ice maker 10 may include a controller 80, a refrigeration system 11 and a water system 50. Refrigeration system 11 may include compressor 12, a condenser (not shown), a thermal expansion device (not shown), an evaporator assembly (not shown), a freeze plate (not shown) thermally coupled to the evaporator assembly, and hot gas valve 24. Additionally, in certain embodiments that utilize a gaseous cooling medium (e.g., air) to provide condenser cooling, a condenser fan 15 may be positioned to blow the gaseous cooling medium across the condenser. Water system 50 may include water inlet valve 52, purge valve 56, water pump 62, a water distributor (not shown), a water line (not shown) connected to and in fluid communication with water pump 62 and the water distributor (not shown), and a sump (not shown) located below the freeze plate adapted to hold water. Ice maker 10 may have other conventional components not described herein without departing from the scope of the invention. Ice maker 10 may operate in a typical manner as known in the art to produce ice.

Controller 80 of ice maker 10 may include processor 82, transceiver 88, memory 90, and input/output (I/O) component 99. Bus 84 may provide data communication between processor 82, transceiver 88, memory 90, and input/output component 99. Processor 82 may control the operation of ice maker 10 and may interact with transceiver 88, memory 90, and input/output (I/O) component 99 via bus 84. Input/output (I/O) component 99 may permit controller 80 to communicate with and/or control the various components of ice maker 10. In certain embodiments, for example controller 80 may receive inputs from a harvest sensor (not shown), an electrical power source (not shown), and/or a variety of sensors and/or switches including, but not limited to, pressure transducers, temperature sensors, acoustic sensors, etc. In various embodiments, based on those inputs for example, controller 80 may be able to control the operation of components of refrigeration system 11 including compressor 12, condenser fan 15, and hot gas valve 24. Controller 80 may also be able to control the operation of components of water system 50 including water inlet valve 52, purge valve 56 and water pump 62.

In certain embodiments, I/O component 99 can include a variety of suitable communication interfaces. For example, I/O component 99 can include wired connections, such as standard serial ports, parallel ports, universal serial bus (USB) ports, S-video ports, local area network (LAN) ports, and small computer system interface (SCSI) ports. Additionally, in other embodiments, I/O component 99 may include, for example, wireless connections, such as infrared ports, optical ports, Bluetooth® wireless ports, wireless LAN ports, or the like.

Processor 82 may be, for example, a commercially available microprocessor, an application-specific integrated circuit (ASIC) or a combination of ASICs, which are designed to achieve one or more specific functions, or enable one or more specific devices or applications. In certain embodiments, processor 82 of ice maker 10 may be similar to processor 104 of portable electronic device 100. In certain embodiments, processor 104 may have one or more microprocessors and/or one or more co-processors.

Transceiver 88 of ice maker 10 may include a population of transceiver modules that can provide communication between ice maker 10 and portable electronic device 100. In certain embodiments, transceiver 88 of ice maker 10 may be similar in construction and/or operation to transceiver 106 of portable electronic device 100. In certain embodiments, for example, transceiver 88 permits ice maker 10 to establish a wireless communication connection with portable electronic device 100 as shown by link 124 (see FIGS. 1A-1C). In various embodiments, for example, transceiver 88 permits communication between ice maker 10 and portable electronic device 100 via Bluetooth®. In other embodiments, for example, transceiver 88 permits communication between ice maker 10 and portable electronic device 100 via near field communication (NFC). In yet other embodiments, transceiver 88 permits communication, directly and/or indirectly between ice maker 10 and portable electronic device 100 using a variety of communication protocols, including, but not limited to, GSM, IS-95 (CDMA), UMTS, Wi-Fi, WiMAX, or any other wireless communication protocol. In certain embodiments, for example, transceiver 88 permits ice maker 10 to connect to wireless access point 130 via link 128 and to portable electronic device 100 via link 126 (see FIG. 1A). Additionally, transceiver 88 may permit ice maker 10 to access one or more network(s) 140 via wireless access point 130 (see FIG. 1A). Network(s) 140 (see FIG. 1A) may include, but are not limited to, a LAN, a WAN, the Internet or any type and/or construction of network known in the art. Accordingly, transceiver 88 may also permit ice maker 10 to connect to one or more computers or servers 142, 144, 146, and/or 148, a remote server, to the Internet, and/or to portable electronic device 100 via one or more wide-area, local or other networks.

Memory 90 of ice maker 10 may include operating memory and data storage memory. In certain embodiments, memory 90 of ice maker 10 may be similar in construction and/or operation to memory 110 of portable electronic device 100. The operating memory may include random access memory (RAM) and the data storage memory may include read-only memory (ROM), Flash memory, hard drives, or any other memory/storage element known in the art. In certain embodiments, memory 90 may include magnetic (e.g., hard disk or drive, tape, etc.), optical (e.g., compact disc, DVD, etc.) and/or semiconductor memory (e.g., RAM, ROM, flash memory or drive, etc.), alone or in combination.

In certain embodiments, memory 90 of ice maker 10 may store software modules 92 which may be executed by processor 82. Software modules 92 may include an operating system 94 and/or an ice maker firmware 96a which may control the operation of ice maker 10. Additionally, data 98 may be stored in memory 90. Data 98 may include information and/or application data regarding ice maker 10. Data 98 may be read, written and/or executed by ice maker firmware 96a and/or operating system 94 of ice maker 10. In various embodiments, data 98 may include, but is not limited to, operating settings or parameters, warranty information, performance history, name of ice maker 10, service records, installation records, cleaning records, event logs, etc.

When portable electronic device 100 is connected to ice maker 10, portable electronic device 100 may send signals to ice maker 10 and may receive signals sent by ice maker 10. Accordingly, portable electronic device 100 may be adapted to control and/or set and/or modify the operating parameters of some or all of the components of ice maker 10 by sending signals to controller 80, wherein those signals can be received by controller 80 of ice maker 10 and wherein those signals cause controller 80 to carry out a function and/or operate one or more of the components of ice maker 10 according to the set and/or modified operating parameters. Thus, in certain embodiments, for example, portable electronic device 100 may control ice maker 10 by overriding controller 80 such that portable electronic device 100 may cause controller 80 to carry out a function and/or operate one or more of the components of ice maker 10. In certain embodiments, for example, portable electronic device 100 may control ice maker 10 by overriding ice maker firmware 96a. In certain embodiments, for example, portable electronic device 100 may control ice maker 10 by directly carrying out a function and/or operating one or more of the components of ice maker 10 thereby bypassing controller 80 of ice maker 10. Additionally, controller 80 of ice maker 10 may be able to operate one or more of the components of ice maker 10 according to the set and/or modified operating parameters without requiring portable electronic device 100 to be connected to ice maker 10.

Additionally, in various embodiments, portable electronic device 100 may be able to read, write and/or execute information stored on memory 90 of controller 80 of ice maker 10. Accordingly, in various embodiments, portable electronic device 100 may be able to read, write and/or execute operating system 94, ice maker firmware 96a, and/or data 98 on memory 90 of controller 80 of ice maker 10. Data 98 on memory 90 of controller 80 of ice maker 10 may also include a variety of records read, written and/or executed by refrigeration control application 118 as will be described more fully elsewhere herein.

As shown in FIGS. 3B and 3C, refrigerator 200 and freezer 204 may include similar components to ice maker 10. Refrigerator 200 and freezer 204 may include a refrigeration system 201 for keeping the inside of a compartment 206 at a reduced temperature T. Refrigeration system 201 may include one or more of compressor 12, condenser fan 15, evaporator fan 202 and thermostat 208 which may be controlled by controller 80. In certain embodiments, refrigerator 200 and/or freezer 204 may include one or more refrigeration systems. In certain embodiments, refrigerator 200 and/or freezer 204 may also include a water system similar to that of ice maker 10 if refrigerator 200 and/or freezer 204 also make ice, such as in residential refrigerators and/or freezers. Additionally, controllers 80 of refrigerator 200 and/or freezer 204 may be substantially similar or identical to controller 80 of ice maker 10. That is, refrigerator 200 and/or freezer 204 may include controller 80 having processor 82, transceiver 88, input/output (I/O) component 99, bus 84, and/or memory 90 including software modules 92, operating system 94 and data 98, as shown, for example, in FIGS. 3B and 3C. Instead of ice maker firmware 96a, refrigerator 200 may include refrigerator firmware 96b for controlling refrigeration system 201 and freezer 204 may include freezer firmware 96c for controlling refrigeration system 201. In some embodiments, for example, the firmware in each of ice maker 10, refrigerator 200 and freezer 204 may be the same. Accordingly, it will be understood that the various components of refrigerator 200 and freezer 204 may be similar in construction and/or operation to the corresponding components of ice maker 10 as described above. Refrigerator 200 and freezer 204 may have other conventional components not described herein without departing from the scope of the invention. Refrigerator 200 and freezer 204 may operate in a typical manner as known in the art.

Similar to ice maker 10, portable electronic device 100 may connect to refrigerator 200 and/or freezer 204 in order to control refrigerator 200 and/or freezer 204. When portable electronic device 100 is connected to refrigerator 200 and/or freezer 204, portable electronic device 100 may send signals to refrigerator 200 and/or freezer 204 and may receive signals sent by refrigerator 200 and/or freezer 204. Accordingly, portable electronic device 100 may be adapted to control and/or set and/or modify the operating parameters of some or all of the components of refrigerator 200 and/or freezer 204 by sending signals to controller 80, wherein those signals can be received by controller 80 of refrigerator 200 and/or freezer 204 and wherein those signals cause controller 80 to carry out a function and/or operate one or more of the components of refrigerator 200 and/or freezer 204 according to the set and/or modified operating parameters. Thus, in certain embodiments, for example, portable electronic device 100 may control refrigerator 200 and/or freezer 204 by overriding controller 80 such that portable electronic device 100 may cause controller 80 to carry out a function and/or operate one or more of the components of refrigerator 200 and/or freezer 204. In certain embodiments, for example, portable electronic device 100 may control refrigerator 200 and/or freezer 204 by overriding ice maker firmware 96a. In certain embodiments, for example, portable electronic device 100 may control refrigerator 200 and/or freezer 204 by directly carrying out a function and/or operating one or more of the components of refrigerator 200 and/or freezer 204 thereby bypassing controller 80 of refrigerator 200 and/or freezer 204. Additionally, controllers 80 of refrigerator 200 and/or freezer 204 may be able to operate one or more of the components of refrigerator 200 and/or freezer 204 according to the set and/or modified operating parameters without requiring portable electronic device 100 to be connected to refrigerator 200 and/or freezer 204.

Additionally, in various embodiments, portable electronic device 100 may be able to read, write and/or execute information stored on memory 90 of controller 80 of refrigerator 200 and/or freezer 204. Accordingly, in various embodiments, portable electronic device 100 may be able to read, write and/or execute operating system 94, refrigerator firmware 96b, freezer firmware 96c, and/or data 98 on memory 90 of controller 80 of refrigerator 200 and/or freezer 204. Data 98 on memory 90 of controller 80 of refrigerator 200 and/or freezer 204 may also include a variety of records read, written and/or executed by refrigeration control application 118 as will be described more fully elsewhere herein.

Various embodiments of the invention are described below with reference to screen views of methods, apparatus (systems) and computer program products. It will be understood that each screen view can be implemented or supported by computer program instructions. These computer program instructions may be provided to a processor (e.g., processor 104, processor 82) of a general purpose computer, special purpose computer, or other programmable data processing apparatus, including, but not limited to, portable electronic device 100 and controller 80 of ice maker 10, refrigerator 200, and/or freezer 204, to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 110, memory 90) that can direct a computer or other programmable data processing apparatus, including, but not limited to, portable electronic device 100 and controller 80 of ice maker 10, refrigerator 200, and/or freezer 204, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus, including, but not limited to, portable electronic device 100 and controller 80 of ice maker 10, refrigerator 200, and/or freezer 204, to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the invention are operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, portable electronic devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

Figure 4:
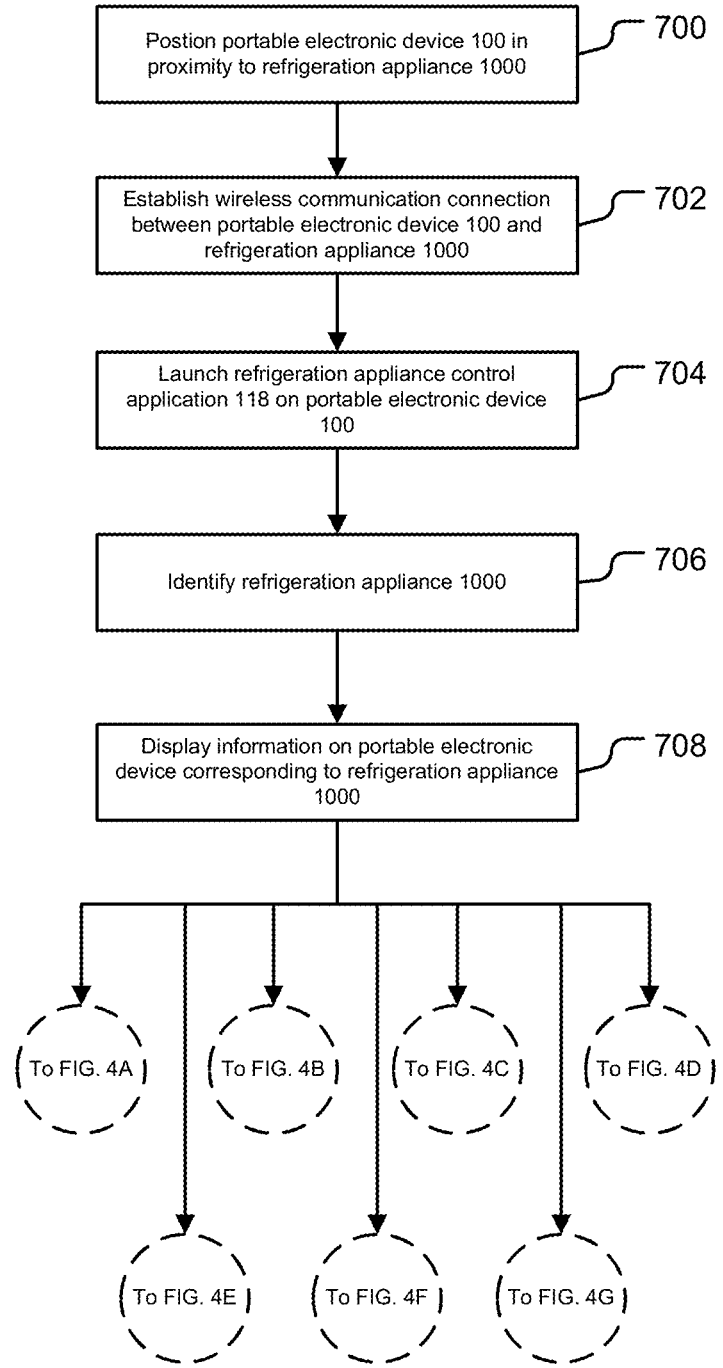
FIG. 4 is a flow chart describing a method of interacting with and/or controlling a refrigeration appliance with a portable electronic device according to one embodiment of the invention.
Figure 4A:
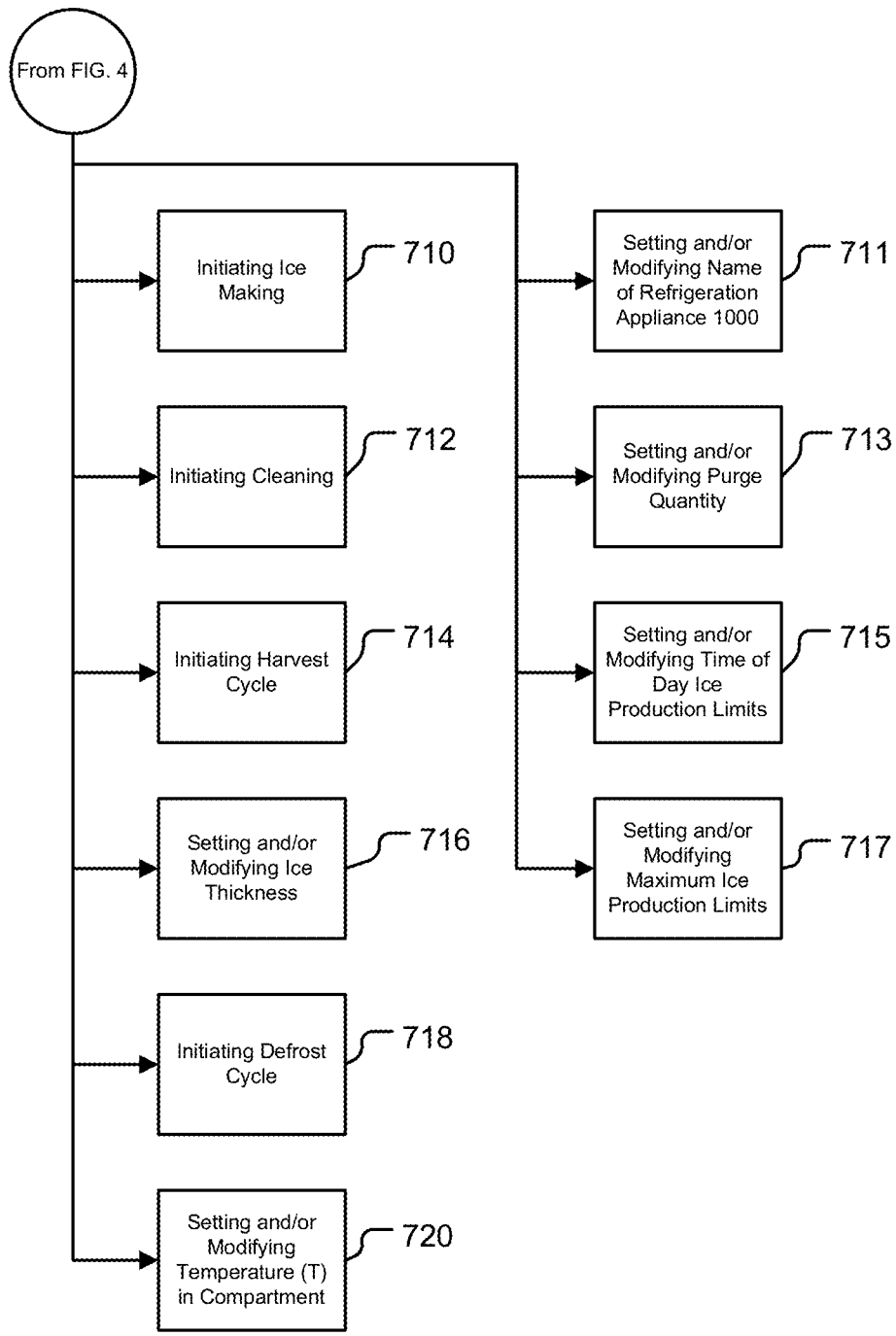
FIG. 4A is a flow chart describing optional steps of a method of interacting with and/or controlling a refrigeration appliance with a portable electronic device according to one embodiment of the invention.
Figure 4B:
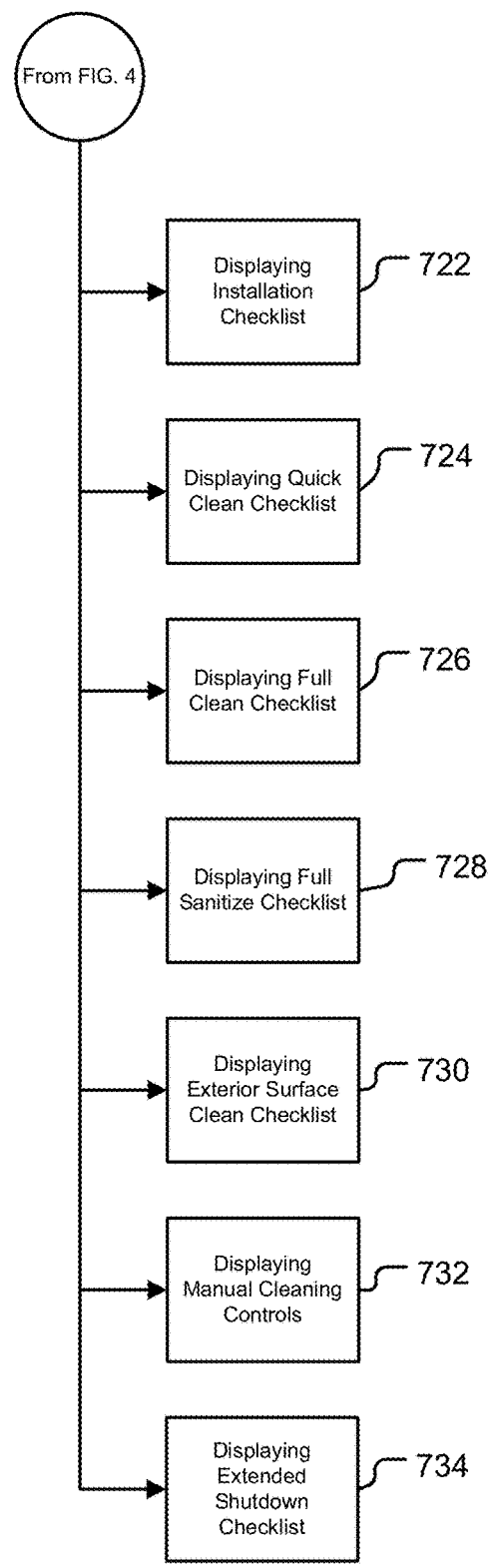
FIG. 4B is a flow chart describing optional steps of a method of interacting with and/or controlling a refrigeration appliance with a portable electronic device according to one embodiment of the invention.
Figure 4C:
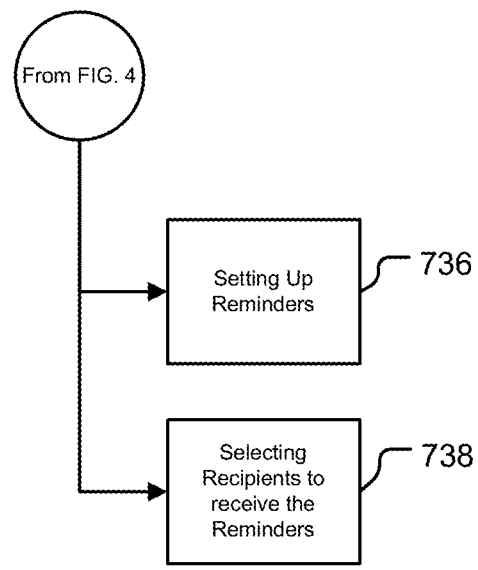
FIG. 4C is a flow chart describing optional steps of a method of interacting with and/or controlling a refrigeration appliance with a portable electronic device according to one embodiment of the invention.
Figure 4D:
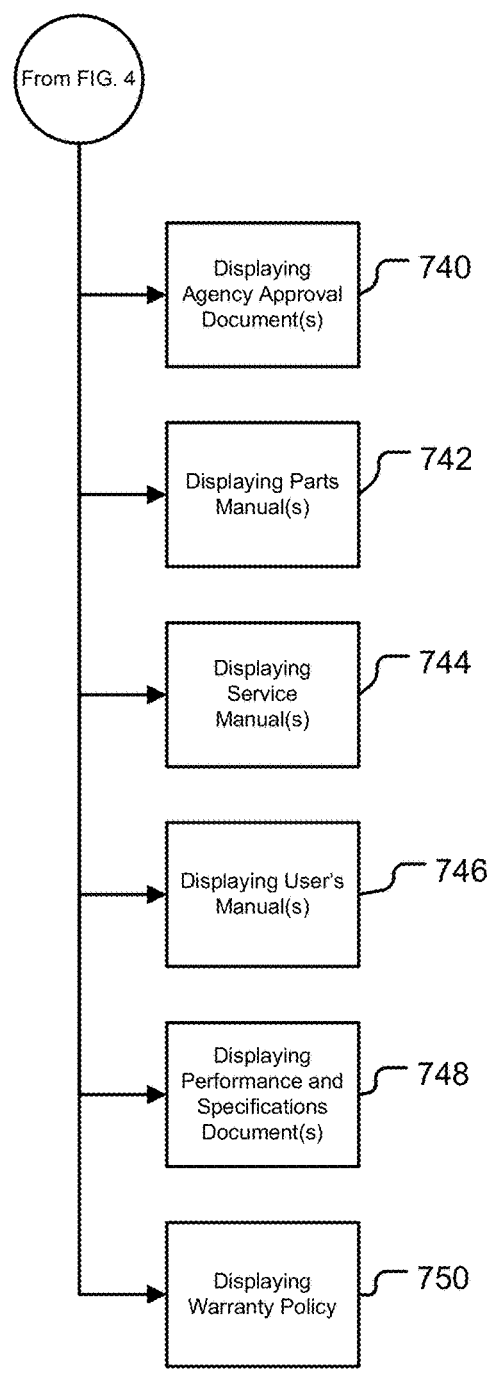
FIG. 4D is a flow chart describing optional steps of a method of interacting with and/or controlling a refrigeration appliance with a portable electronic device according to one embodiment of the invention.
Figure 4E:
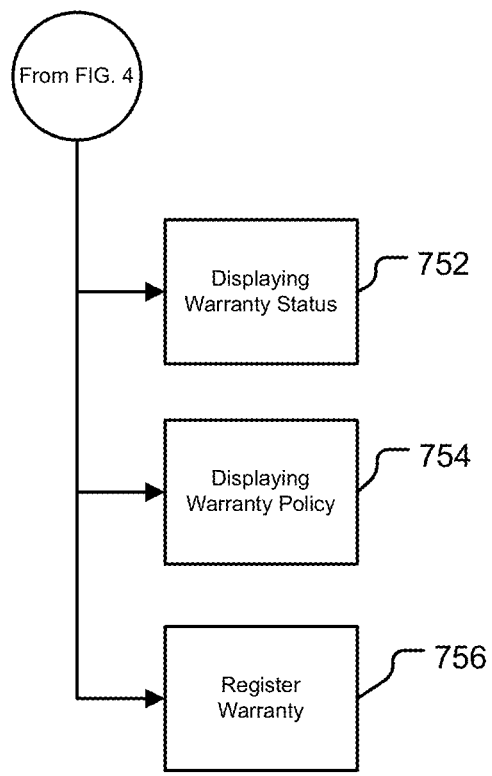
FIG. 4E is a flow chart describing optional steps of a method of interacting with and/or controlling a refrigeration appliance with a portable electronic device according to one embodiment of the invention.
Figure 4F:
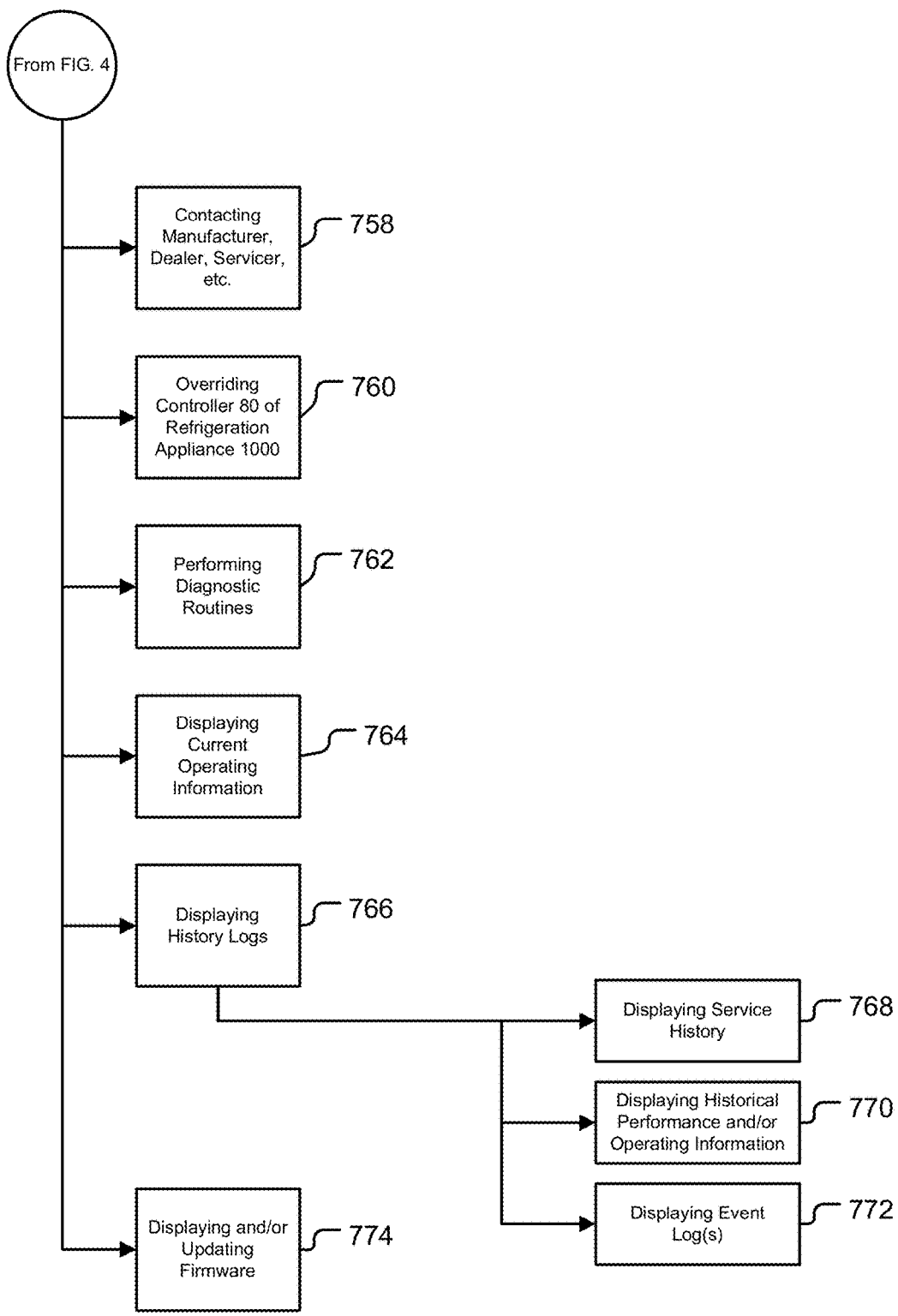
FIG. 4F is a flow chart describing optional steps of a method of interacting with and/or controlling a refrigeration appliance with a portable electronic device according to one embodiment of the invention.
Figure 4G:
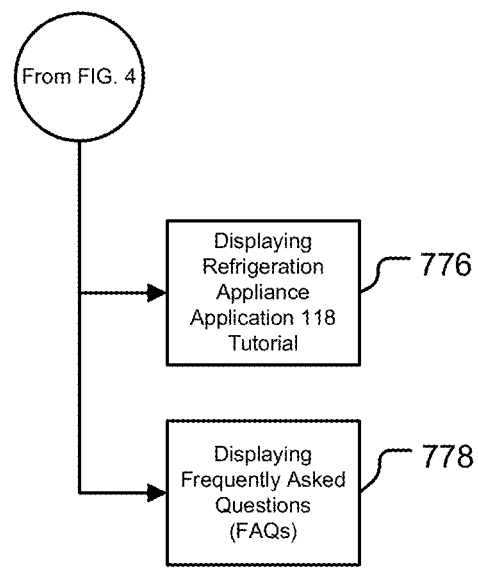
FIG. 4G is a flow chart describing optional steps of a method of interacting with and/or controlling a refrigeration appliance with a portable electronic device according to one embodiment of the invention.

Referring now to FIGS. 4-4G, a method of interacting and/or controlling a refrigeration appliance 1000 with a portable electronic device 100 is described in detail. Refrigeration appliance 1000 may be an ice maker 10, a refrigerator 200, and/or a freezer 204. At step 700, portable electronic device 100 is positioned in proximity to refrigeration appliance 1000 so that a wireless communication connection can be established between portable electronic device 100 and refrigeration appliance 1000. In certain embodiments, portable electronic device 100 may be within about 50 meters or less of refrigeration appliance 1000. In certain embodiments, for example, portable electronic device 100 is positioned about 50 meters or less away from refrigeration appliance 1000. In other embodiments, for example, portable electronic device 100 is positioned about 25 meters or less away from refrigeration appliance 1000. In other embodiments, for example, portable electronic device 100 is positioned about 20 meters or less away from refrigeration appliance 1000. In yet other embodiments, for example, portable electronic device 100 is positioned about 15 meters or less away from refrigeration appliance 1000. In other embodiments, for example, portable electronic device 100 is positioned about 10 meters or less away from refrigeration appliance 1000. In yet other embodiments, for example, portable electronic device 100 is positioned about 5 meters or less away from refrigeration appliance 1000. In other embodiments, for example, portable electronic device 100 is positioned about 3 meters or less away from refrigeration appliance 1000. In other embodiments, for example, portable electronic device 100 is positioned about 1 meter or less away from refrigeration appliance 1000. In certain embodiments, the wireless communication connection may be, but is not limited to, a Bluetooth® connection, an optical connection, an infrared connection, a WLAN connection, a WAN connection, a Wi-Fi connection, a near field communication (NFC) connection, or any other suitable other wireless communication protocol. In other embodiments, communication connection between portable electronic device 100 and refrigeration appliance 1000 may be a wired connection including, but not limited to, a USB connection, a serial connection, or any other wired connection known in the art.

In certain embodiments, if portable electronic device 100 is in proximity to a population of refrigeration appliances 1000 with which a connection can be made with portable electronic device 100, one or more of the population of refrigeration appliances 1000 may be selected with which to connect. If after interacting with one of the population of refrigeration appliances 1000, it is desired to interact with one or more remaining refrigeration appliances 1000 of the population of refrigeration appliances 1000, a connection can be established between portable electronic device 100 and one or more remaining refrigeration appliances 1000. In other embodiments, if portable electronic device 100 is in proximity to a population of refrigeration appliances 1000 with which a connection can be made with portable electronic device 100, portable electronic device 100 may establish a connection with the population of refrigeration appliances 1000. Accordingly, portable electronic device 100 may be able to interact with and/or control the entire population of refrigeration appliances 1000 at the same time. For example, portable electronic device 100 may be able to connect to all of the freezers 204 in a grocery store aisle at the same time and interact with and/or control all of the freezers 204. Thus, for example, all of the operating parameters for all of the freezers can be set at once. This may assist in setting and/or modifying the operating parameters for the population of refrigeration appliances 1000 in a quicker way than connecting to each of the population of refrigeration appliances individually.

At step 704 refrigeration appliance control application 118 may be launched on portable electronic device 100. In certain embodiments, refrigeration appliance control application 118 may be launched by a user of portable electronic device 100. In other embodiments, refrigeration appliance control application 118 may be launched by portable electronic device 100. In certain embodiments, refrigeration appliance control application 118 may be launched prior to steps 700. In certain embodiments, refrigeration appliance control application 118 may be launched prior to steps 702. In other embodiments, refrigeration appliance control application 118 may be launched automatically once the wireless communication connection between portable electronic device 100 and refrigeration appliance 1000 is established.

At step 706 refrigeration appliance 1000 may be identified. In certain embodiments, this identification may be made by refrigeration appliance 1000 sending identifying information including, but not limited to, serial number, model number, and/or name information to portable electronic device 100. In other embodiments, identification of refrigeration appliance 1000 may be made by refrigeration appliance control application 118 in a variety of ways, including, but not limited to, receiving identifying information including, but not limited to, serial number, model number, and/or name information from refrigeration appliance 1000, scanning an NFC tag disposed on refrigeration appliance 1000 wherein the NFC tag includes identifying information of refrigeration appliance 1000, taking a photograph of refrigeration appliance with portable electronic device 100 wherein portable electronic device 100 includes a camera, scanning a barcode or some other machine-readable representation of data, scanning a two-dimensional barcode (e.g., quick response (QR) code) or some other machine-readable representation of data, and/or a user manually entering identifying information.

In other embodiments, a password may be required to be entered into refrigeration appliance control application 118 in order to establish a wireless communication connection with refrigeration appliance 1000. In certain embodiments that require a password, the use of a password may assist in preventing unauthorized access to controller 80 of refrigeration appliance 1000. In various embodiments, for example, the password may be the serial number of refrigeration appliance 1000. For example, the serial number may be located inside refrigeration appliance 1000 and thus may only be visible to someone who can open a portion or all of refrigeration appliance 1000. In other embodiments, the password may be an alphanumeric password created by the owner, servicer, manufacturer, etc. of refrigeration appliance 1000. In other embodiments, the password may include a data or physical key stored or disposed on portable electronic device 100 which may be recognized by refrigeration appliance 1000 such that only portable electronic devices having the correct key can connect with refrigeration appliance 1000. It will be understood that other types passwords and/or means of authenticating a portable electronic device 100 attempting to connect with refrigeration appliance 1000 known in the art may be used without departing from the scope of the invention.

At step 708, portable electronic device 100 may display information corresponding to refrigeration appliance 1000 on user interface 108 of portable electronic device 100. The displayed information may include, but is not limited to, the identifying information of refrigeration appliance 1000. As will be described with respect to optional steps of the method of FIG. 4 shown in FIGS. 4A-4G, a variety of other information may be presented or displayed on user interface 108 of portable electronic device 100.

As illustrated in FIG. 4A, the method of FIG. 4 may optionally include one or more of: initiating an ice making cycle 710 of an ice maker 10, setting and/or modifying a name 711 of the refrigeration appliance 1000, initiating a cleaning cycle 712, setting and/or modifying a purge quantity 713, initiating a harvest cycle 714, setting and/or modifying time of day ice production limits 715, setting and/or modifying ice thickness 716, setting and/or modifying maximum ice production limits 715, initiating a defrost cycle 718, setting and/or modifying the temperature (T) in compartment 206 of a refrigerator 200 and/or freezer 204. As described more fully elsewhere herein, each of steps 710-720 may be performed with portable electronic device 100 connected to refrigeration appliance 1000.

Referring now to FIG. 4B, the method of FIG. 4 may optionally include displaying or presenting on user interface 108 of portable electronic device 100 one or more of: an installation checklist 722, a quick clean checklist 724, a full clean checklist 726, a full sanitize checklist 728, an exterior surface clean checklist 730, manual cleaning controls 732, and an extended shutdown checklist 734. As described more fully elsewhere herein, each of steps 722-734 may be performed with portable electronic device 100 connected to refrigeration appliance 1000.

As shown in FIG. 4C, the method of FIG. 4 may optionally include setting up reminders 736 and/or selecting recipients to receive the reminders 738 with portable electronic device 100 connected to refrigeration appliance 1000 as described more fully elsewhere herein.

Referring now to FIG. 4D, the method of FIG. 4 may optionally include displaying or presenting on user interface 108 of portable electronic device 100 one or more of: agency approval document(s) 740, parts manual(s) 742, service manual(s) 744, user's manual(s) 746, performance and specifications document(s) 748, and warranty policy document(s) 750. As described more fully elsewhere herein, each of steps 740-750 may be performed with portable electronic device 100 connected to refrigeration appliance 1000.

As shown in FIG. 4E, the method of FIG. 4 may optionally include displaying or presenting on user interface 108 of portable electronic device 100 one or more of status and/or duration of warranty coverage 752 and/or the warranty policy of the manufacturer 754. In certain embodiments, registration of the warranty for refrigeration appliance 1000 can be performed with portable electronic device 100 at step 756. As described more fully elsewhere herein, each of steps 752-756 may be performed with portable electronic device 100 connected to refrigeration appliance 1000.

Referring now to FIG. 4F, the method of FIG. 4 may optionally include one or more of the following steps: contacting one or more of a manufacturer, dealer, servicer, etc. of refrigeration appliance 1000 at step 758, overriding controller 80 of refrigeration appliance 1000 at step 760, performing diagnostic routines at step 762, displaying current operating information of refrigeration appliance 1000 at step 764, displaying history logs of refrigeration appliance 1000 at step 766, and displaying and/or updating the firmware of refrigeration appliance 1000 at step 774. Displaying history logs may further include the optional steps of displaying service history of refrigeration appliance 1000 at step 768, displaying historical performance and/or operating information of refrigeration appliance at step 770, and/or displaying event log(s) of refrigeration appliance 1000 at step 772. As described more fully elsewhere herein, each of steps 758-774 may be performed with portable electronic device 100 connected to refrigeration appliance 1000.

As shown in FIG. 4G, the method of FIG. 4 may optionally include displaying or presenting on user interface 108 of portable electronic device 100 one or more of: a tutorial for how to use refrigeration control application 118 at step 776 and frequently asked questions at step 778. As described more fully elsewhere herein, each of steps 776-778 may be performed with portable electronic device 100 connected to refrigeration appliance 1000.

While various steps are described herein in one order, it will be understood that other embodiments of the described methods can be carried out in any order and/or without all of the described steps without departing from the scope of the invention.

Illustrated in FIGS. 5-43 are examples of user interfaces of refrigeration appliance control application 118 displayed on user interface 108 of portable electronic device 100 for use in carrying out one or more of the methods of interacting with and/or controlling a refrigeration appliance 1000 according to one embodiment of the invention. In this particular embodiment, refrigeration appliance 1000 is an ice maker 10, however it will be understood that refrigeration appliance control application 118 may interact with and/or control refrigerators 200 and/or freezers 204 in similar manners without departing from the scope of the invention. References to the "application" mean refrigeration appliance control application 118 on portable electronic device 100 and the term "screen" refers to information displayed on user interface 108 of portable electronic device 100 by refrigeration appliance control application 118 running on portable electronic device 100.

The following figures illustrate various user interface elements that are displayed on the various screens. Some or all of the user interface elements, including, but not limited to, buttons, text boxes, and/or other inputs described herein may perform functions when manipulated by a user; however, the functions performed by the buttons, text boxes, and/or other inputs described herein, at certain times and in certain embodiments, may be performed by processor 104 of portable electronic device 100 without manipulation by a user. User manipulation of buttons, text boxes, and/or other inputs described herein may include, but is not limited to, pressing a button, moving a slider, swiping or sliding a button, checking a radio button, typing text, selecting numbers, etc. It will be apparent, however, to those familiar in the art, that many changes, variations, modifications, and other uses and applications of the user interface elements are possible. All such changes, variations, modifications, and other uses and applications that do not depart from the spirit and scope of the invention are deemed to be covered by the invention.

Referring to FIG. 5, upon launching refrigeration appliance control application 118 of portable electronic device 100, Front Panel screen 300 is presented on user interface 108 of portable electronic device 100. Front Panel screen 300 may be representative of a physical control panel on ice maker 10. Front Panel screen 300 may include population of buttons which operate ice maker 10. In certain embodiments, Front Panel screen 300 may include display 302, power button 304, clean button 306, harvest button 308, thickness button 310 and menu button 312. In certain embodiments, display 302 may emulate a three digit, seven element display. Display 302 may provide feedback to a user.

In various embodiments, manipulating Power button 304 can turn ice maker ON and OFF. Manipulating Power button 304 may also cause a signal to be sent to controller 80 of ice maker 10 to initiate the making of ice by ice maker 10 as described above. Manipulating Clean button 306 can cause a signal to be sent to controller 80 of ice maker 10 to initiate a clean and sanitize process to eliminate mineral, metals, biologics and/or other contaminants from ice maker 10 to keep it in a safe and efficient operating condition. Manipulating Harvest button 308 can cause a signal to be sent to controller 80 of ice maker 10 to open hot gas valve 24 to initiate a harvest cycle. Manipulating Thickness button 312 can provide access to additional screens and functions to set and/or modify the thickness of the ice produced by ice maker 10. Manipulating Menu button 312 can provide access to additional screens and functions to control ice maker 10.

FIG. 6 illustrates an embodiment of a Menu screen 314 which may be accessed after Menu button 312 is manipulated. Menu screen 314 may be presented on user interface 108 of portable electronic device 100. Menu screen 314 may include a population of buttons, including, but not limited to, return to Front Panel button 316, Checklist button 322, Reminders button 324, Documents button 326, Warranty button 328, Ice Settings button 330, Service button 332, and Help button 334. Manipulating return to Front Panel button 316 returns application 118 to Front Panel screen 300. Manipulating Checklist button 322, Reminders button 324, Documents button 326, Warranty button 328, Ice Settings button 330, Service button 332, and Help button 334 enters menus and sub-menus of application 118 which permit interaction with and/or control of ice maker 10 as will be described more fully elsewhere herein.

Menus and sub-menus of application 118 corresponding to Checklist button 322 are described in detail with reference to FIGS. 7-14. Menus and sub-menus of application 118 corresponding to Reminders button 324 are described in detail with reference to FIGS. 15-17. Menus and sub-menus of application 118 corresponding to Documents button 326 are described in detail with reference to FIGS. 18-20. Menus and sub-menus of application 118 corresponding to Warranty button 328 are described in detail with reference to FIGS. 21-22. Menus and sub-menus of application 118 corresponding to Ice Settings button 330 are described in detail with reference to FIGS. 23-29. Menus and sub-menus of application 118 corresponding to Service button 332 are described in detail with reference to FIGS. 30-42. Menus and sub-menus of application 118 corresponding to Help button 334 are described in detail with reference to FIG. 43.

Referring now to FIG. 7, manipulating Checklists button 322 may cause Checklist screen 336 to be presented on user interface 108 of portable electronic device 100. Checklist screen 336 may include a population of buttons, including, but not limited to, Installation Checklist button 340, Quick Clean button 342, Full Clean button 344, Full Sanitize button 346, Exterior Surface Clean button 348, Extended Shutdown button 350, and Cleaning Controls button 352. Checklist screen 336 may also include a return to Menu Screen button 338 that, when manipulated, returns application 118 to Menu screen 314 as shown in FIG. 6.

Figures 8A, 8B, 8C:
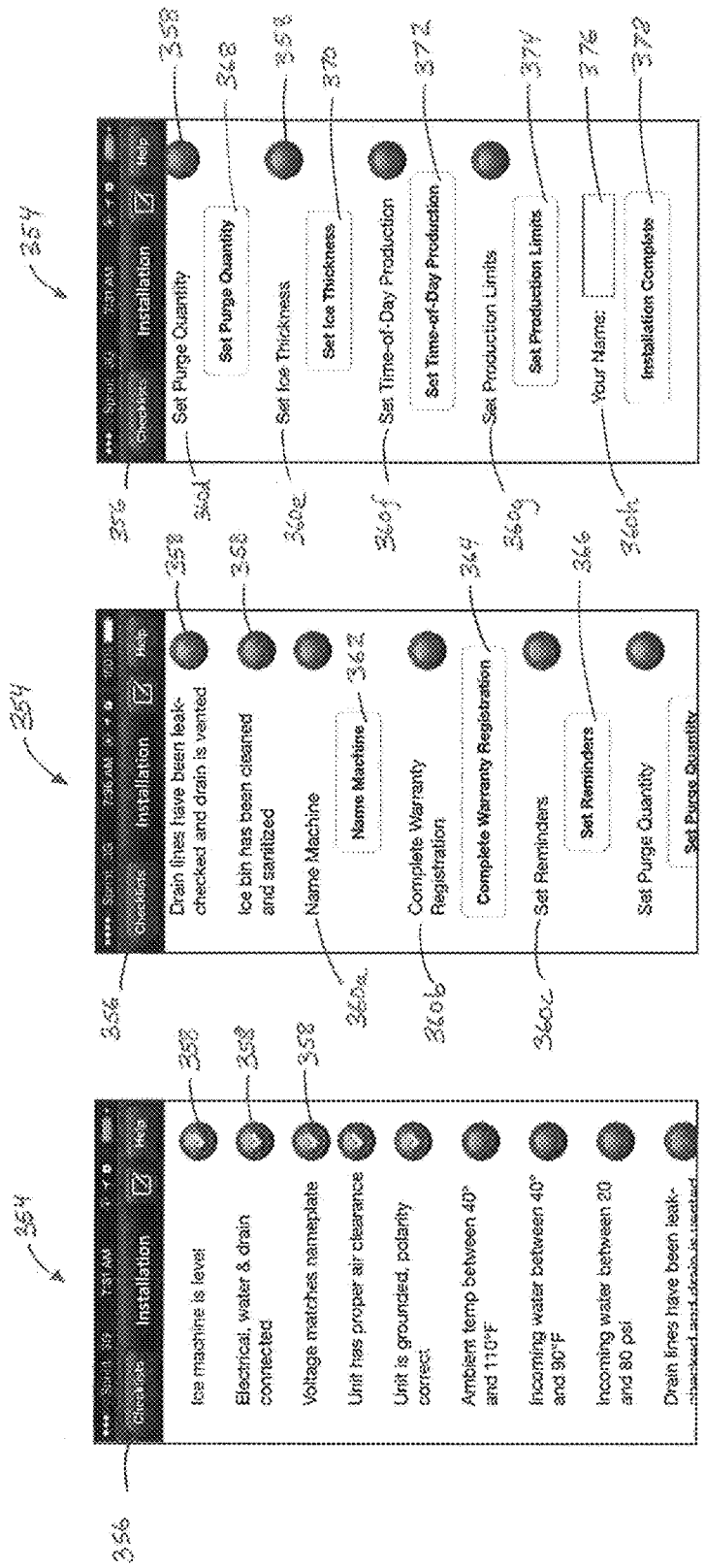

Accordingly, manipulating Installation Checklists button 340 may cause Installation screen 354 to be presented on user interface 108 of portable electronic device 100 as shown in FIGS. 8A, 8B and 8C. Installation screen 354 may be a scrollable screen and to illustrate the entire screen, multiple views at different scrolled positions are shown in FIGS. 8A, 8B and 8C. Installation screen 354 may display a list of steps for installing ice maker 10. Installation screen 354 may also include a return to Checklist Screen button 356 that, when manipulated, returns application 118 to Checklist screen 336 as shown in FIG. 7. A population of radio buttons 358 may correspond to the individual steps which permit tracking the progress of the installation of ice maker 10. Accordingly, in certain embodiments, the population of radio buttons 358 may be manipulated, or "checked," to indicate that a step of the installation has been completed. It will be understood that in certain embodiments, Installation screen 354 may include some or all of the steps illustrated in FIGS. 8A, 8B and 8C and/or may include additional steps not illustrated without departing from the scope of the invention.

Installation screen 354 may also include a population of action buttons which, when manipulated permit certain steps to be completed and/or to cause application 118 to send a signal to controller 80 of ice maker 10 to initiate a function. Accordingly, the population of action buttons on Installation screen 354 may include, but is not limited to, Name Machine button 362, Complete Warranty Registration button 364, Set Reminders button 366, Purge Quantity button 368, Set Ice Thickness button 370, Set Time of Day Production button 372, Set Production Limits button 374, and/or Installation Complete button 378. Installation screen 354 may also include a step to name the ice maker 360*a*, which can be accomplished by manipulating Name Machine button 362 and inputting text of a desired name for ice maker 10. Setting the machine or ice maker 10 name is described in more detail with respect to FIG. 24. Accordingly, manipulating Name Machine button 362 may cause application 118 to jump to Machine Name screen 494 (see FIG. 24). After naming the machine, application 118 may return to Installation screen 354 so that installation of ice maker 10 may continue. Installation screen 354 may further include a warranty registration step 360*b*.

If completing warranty registration is desired, Complete Warranty Registration button 364 may be manipulated and application 118 may enter a sub-menu wherein ice maker 10 may be registered on a website, a server, portable electronic device 100, and/or any suitable location for storing warranty registration information. Thus in certain embodiments, the warranty registration information may include, but is not limited to, owner information, serial number of ice maker 10, model number of ice maker 10, location of ice maker 10, and/or time of installation of ice maker 10. The owner information may include, but is not limited to, the name of the owner of ice maker 10, the telephone number of the owner of ice maker 10, the email address of the owner of ice maker 10, and/or the address of the owner of ice maker 10. Accordingly, the warranty registration information may be input into application 118 and application 118 may write, save and/or upload warranty information to memory 90 of ice maker 10, to memory 110 of portable electronic device 100, to a website, to computers or servers 142, 144, 146, and/or 148, to a remote server, and/or to any suitable location for storing a record of the warranty registration information of ice maker 10. In certain embodiments, this record may be one of a population of service records as described more fully elsewhere herein.

Additionally, Set Reminders button 366 may be manipulated according to set reminders step 360*c*. Various reminders may be set as described in more detail with respect to FIGS. 15-17. Accordingly, manipulating set reminders button 366 may cause application 118 to jump to Reminders screen 424, Set Up Reminders screen 430, and/or Recipient screen 4440 (see FIGS. 15-17). After setting reminders, application 118 may return to Installation screen 354 so that installation of ice maker 10 may continue.

In certain embodiments, a variety of operating settings may be set and/or modified on Installation screen 354. The operating settings may include, but are not limited to, the purge quantity, the ice thickness, the time of day production, the maximum ice production limits, etc. The amount of water to be purged each cooling cycle may additionally be set by manipulating Purge Quantity button 368 according to set purge quantity step 360*d*. Setting the purge quantity is described in more detail with respect to FIG. 26. Accordingly, manipulating Purge Quantity button 368 may cause application 118 to jump to Purge Quantity screen 506 (see FIG. 26). After setting the purge quantity, application 118 may return to Installation screen 354 so that installation of ice maker 10 may continue. The thickness of ice produced by ice maker 10 may additionally be set by manipulating Set Ice Thickness button 370 according to set ice thickness step 360*e*. Setting the ice thickness is described in more detail with respect to FIG. 25. Accordingly, manipulating Set Ice Thickness button 370 may cause application 118 to jump to Ice Thickness screen 500 (see FIG. 25). After setting the ice thickness, application 118 may return to Installation screen 354 so that installation of ice maker 10 may continue.

Additionally various other operating settings may be set according to steps 360*f*, 360*g*. The time of day that ice maker 10 produces ice may additionally be set by manipulating Set Time of Day Production button 372 according to set time of day production step 360*p*. Setting the time of day production is described in more detail with respect to FIG. 28. Accordingly, manipulating Set Time of Day Production button 372 may cause application 118 to jump to Production Time screen 518 (see FIG. 28). After setting the time-of-day that ice is to be produced, application 118 may return to Installation screen 354 so that installation of ice maker 10 may continue. The amount of ice that ice maker 10 is desired to produce during one or more days may additionally be set by manipulating Set Production Limits button 374 according to set production limits step 360*q*. Setting the amount of ice to be produced by ice maker 10 is described in more detail with respect to FIG. 29. Accordingly, manipulating Set Production Limits button 374 may cause application 118 to jump to Production Limits screen 524 (see FIG. 29). After setting the amount of ice to be produced, application 118 may return to Installation screen 354 so that installation of ice maker 10 may continue.

In various embodiments, the location of ice maker 10 may be optionally set using portable electronic device 100. In certain embodiments, portable electronic device 100 may include a global positioning system (GPS) chip which may permit portable electronic device 100 to calculate its position as known in the art. Accordingly, portable electronic device may be placed near or on ice maker 10 and the current location of portable electronic device 100 may be set as the location of ice maker 10. Application 118 may write, save and/or upload a record of this location to memory 90 of ice maker 10, to memory 110 of portable electronic device 100, to a website, to computers or servers 142, 144, 146, and/or 148, to a remote server, and/or to any suitable location for storing a record of the location of ice maker 10. Accordingly, this record may be later accessed and/or viewed to determine the location of ice maker 10. This location may be associated to the serial number of ice maker 10 so that a query of serial numbers may return the location of the ice maker 10 having that serial number. In certain embodiments, this record may be one of a population of service records as described more fully elsewhere herein.

Furthermore, the name of the installer may be input into text box 376 according to enter your name step 360*h*. By manipulating Installation Complete button 378, the installation of ice maker 10 is completed. Accordingly, manipulating Installation Complete button 378 may cause application 118 to write, save and/or upload a record of the installation to memory 90 of ice maker 10, to memory 110 of portable electronic device 100, to a website, to computers or servers 142, 144, 146, and/or 148, to a remote server, and/or to any suitable location for storing a record of the installation. Accordingly, this record may be later accessed and/or viewed to determine various aspects of the installation, including but not limited to, who installed the ice maker, the time that installation was completed, the operating parameters, the name of ice maker 10, etc. In certain embodiments, this record may be one of a population of service records as described more fully elsewhere herein. After the installation of ice maker 10 is complete, controller 80 of ice maker 10 may be able to control ice maker 10 according to the various operating parameters input during installation without requiring portable electronic device to be in proximity and/or connected to ice maker 10. Thus controller 80 may independently control ice maker 10.

Figure 9:
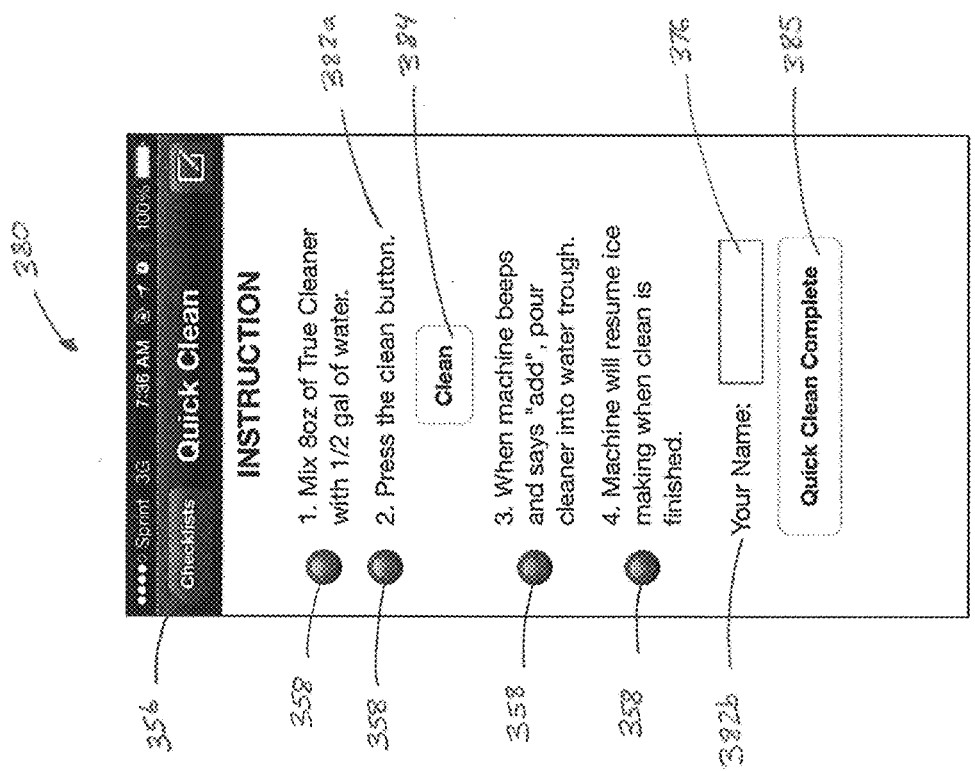
Figure 10:
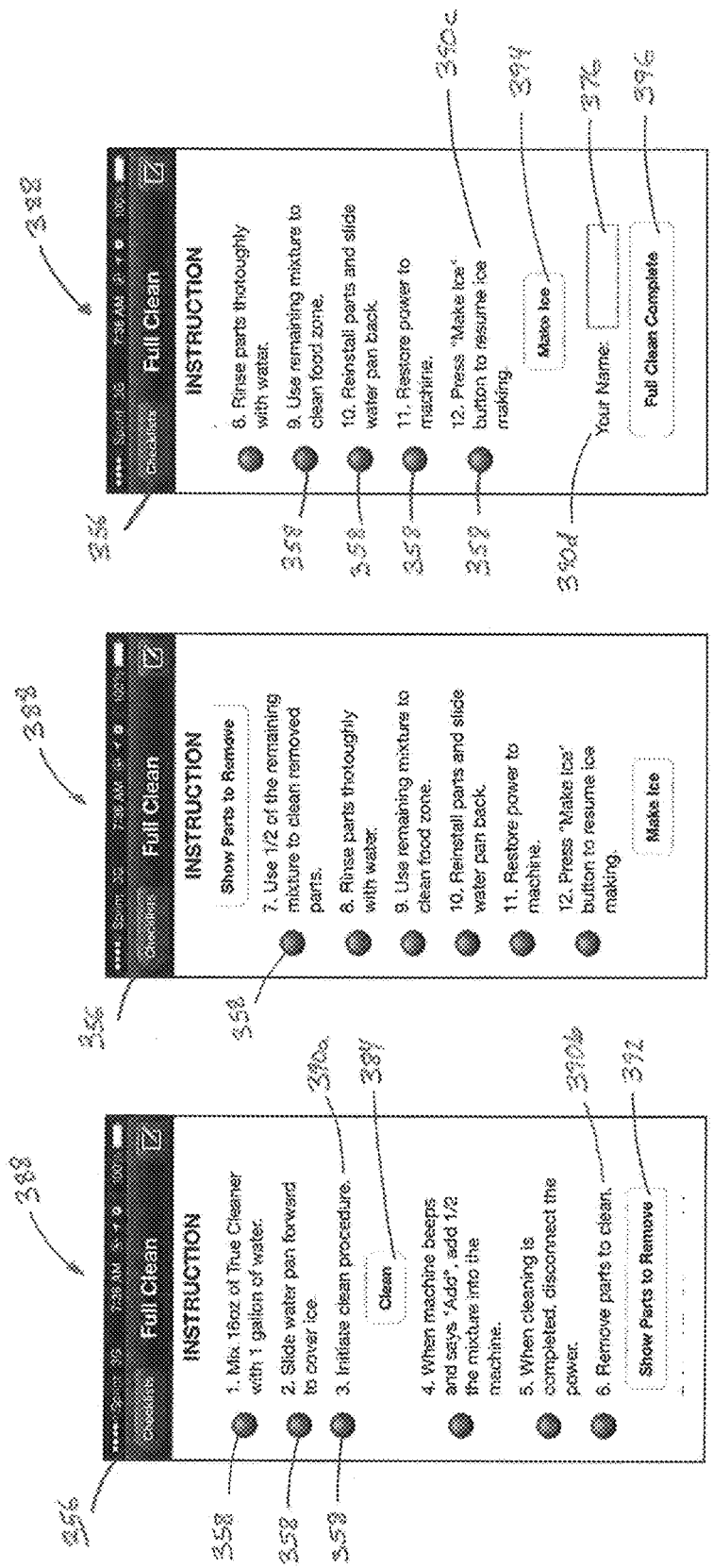

Returning now to FIG. 7, manipulating Quick Clean button 342 may cause Quick Clean screen 380 to be presented on user interface 108 of portable electronic device 100 as shown in FIG. 9. Quick Clean screen 380 may display a list of steps for performing a quick clean of ice maker 10. Quick Clean screen 380 may also include a return to Checklist Screen button 356 that, when manipulated, returns application 118 to Checklist screen 354 as shown in FIG. 7. A population of radio buttons 358 may be displayed that correspond to the individual steps which permit tracking the progress of the quick clean of ice maker 10. Accordingly, in certain embodiments, the population of radio buttons 358 may be manipulated, or "checked," to indicate that a step of the quick clean has been completed. It will be understood that in certain embodiments, Quick Clean screen 380 may include some or all of the steps illustrated in FIG. 9 and/or may include additional steps not illustrated without departing from the scope of the invention.

Quick Clean screen 380 may also include a population of action buttons which, when manipulated permit certain steps to be completed and/or to cause application 118 to send a signal to controller 80 of ice maker 10 to initiate a function. Accordingly, the population of action buttons on Quick Clean screen 380 may include, but is not limited to, Clean button 384, and/or Quick Clean Complete button 386. At step 382a, Clean button 384 may be manipulated which can cause a signal to be sent to controller 80 of ice maker 10 to initiate a clean and sanitize process to eliminate mineral, metals, biologics and/or other contaminants from ice maker 10. At step 382b, the person performing the quick clean may enter their name in text box 376. By manipulating Quick Clean Complete button 386, the quick clean of ice maker 10 is completed.

Accordingly, manipulating Quick Clean Complete button 386 may cause application 118 to write, save and/or upload a record of the quick clean to memory 90 of ice maker 10, to memory 110 of portable electronic device 100, to a website, to computers or servers 142, 144, 146, and/or 148, to a remote server, and/or to any suitable location for storing a record of the quick clean. Accordingly, this record may be later accessed and/or viewed to determine various aspects of the quick clean, including but not limited to, who performed the quick clean, the time that the quick clean was completed, etc. In certain embodiments, this record may be one of a population of service records as described more fully elsewhere herein. After the quick clean of ice maker 10 is complete, controller 80 of ice maker 10 may be able to control ice maker 10 according to the various parameters input during installation without requiring portable electronic device to be in proximity and/or connected to ice maker 10. Thus controller 80 may independently control ice maker 10.

Returning now to FIG. 7, manipulating Full Clean button 344 may cause Full Clean screen 388 to be presented on user interface 108 of portable electronic device 100 as shown in FIGS. 10A, 10B and 10C. Full Clean screen 388 may be a scrollable screen and to illustrate the entire screen, multiple views at different scrolled positions are shown in FIGS. 10A, 10B and 10C. As illustrated in FIGS. 10A, 10B and 10C, embodiments of Full Clean screen 388 may display a population of steps for conducting a full clean of ice maker 10. Full Clean screen 388 may also include a return to Checklist Screen button 356 that, when manipulated, returns application 118 to Checklist screen 354 as shown in FIG. 7. A population of radio buttons 358 may be displayed that correspond to the individual steps which permit tracking the progress of the full clean of ice maker 10. Accordingly, in certain embodiments, the population of radio buttons 358 may be manipulated, or "checked," to indicate that a step of the full clean has been completed. It will be understood that in certain embodiments, full clean screen 388 may include some or all of the steps illustrated in FIGS. 10A, 10B and 10C and/or may include additional steps not illustrated without departing from the scope of the invention.

Full Clean screen 388 may also include a population of action buttons which, when manipulated permit certain steps to be completed and/or to cause application 118 to send a signal to controller 80 of ice maker 10 to initiate a function. Accordingly, the population of action buttons on Full Clean screen 388 may include, but is not limited to, Clean button 384, Show Parts to Remove button 392, Make Ice button 394, and/or Full Clean Complete button 396. At step 390a, Clean button 384 may be manipulated which can cause a signal to be sent to controller 80 of ice maker 10 to initiate a clean and sanitize process to eliminate mineral, metals, biologics and/or other contaminants from ice maker 10. At step 390b, Show Parts to Remove button 392 may be manipulated which may cause to be displayed on user interface 108 the parts of ice maker 10 that need to be removed in order to perform a full clean. At step 390c, Make Ice button 394 may be manipulated which can cause a signal to be sent to controller 80 of ice maker 10 to make ice. At step 390d, the person performing the full clean may enter their name in text box 376. By manipulating Full Clean Complete button 396, the full clean of ice maker 10 is completed.

Accordingly, manipulating Full Clean Complete button 396 may cause application 118 to write, save and/or upload a record of the full clean to memory 90 of ice maker 10, to memory 110 of portable electronic device 100, to a website, to computers or servers 142, 144, 146, and/or 148, to a remote server, and/or to any suitable location for storing a record of the full clean. Accordingly, this record may be later accessed and/or viewed to determine various aspects of the full clean, including but not limited to, who performed the full clean, the time that the full clean was completed, etc. In certain embodiments, this record may be one of a population of service records as described more fully elsewhere herein. After the full clean of ice maker 10 is complete, controller 80 of ice maker 10 may be able to control ice maker 10 according to the various parameters input during installation without requiring portable electronic device to be in proximity and/or connected to ice maker 10. Thus controller 80 may independently control ice maker 10.

Figure 11:
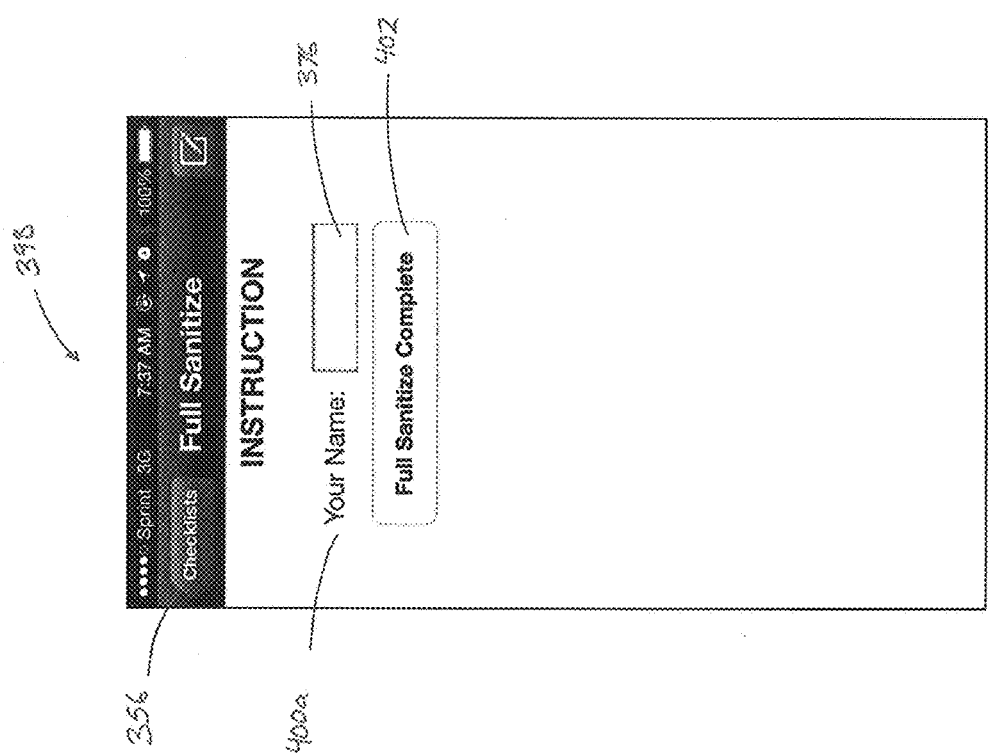

Returning now to FIG. 7, manipulating Full Sanitize button 346 may cause Full Sanitize screen 398 to be presented on user interface 108 of portable electronic device 100 as shown in FIG. 11. As illustrated in FIG. 11, embodiments of Full Sanitize screen 398 may display a population of steps for conducting a full sanitize of ice maker 10. Full Sanitize screen 398 may also include a return to Checklist Screen button 356 that, when manipulated, returns application 118 to Checklist screen 354 as shown in FIG. 7. A population of radio buttons (not shown) may be displayed that correspond to the individual steps which permit tracking the progress of the full sanitize of ice maker 10. Accordingly, in certain embodiments, the population of radio buttons (not shown) may be manipulated, or "checked," to indicate that a step of the full sanitize has been completed. It will be understood that in certain embodiments, Full Sanitize screen 398 may include some or all of the steps illustrated in FIG. 11 and/or may include additional steps not illustrated without departing from the scope of the invention.

Full Sanitize screen 398 may also include a population of action buttons which, when manipulated permit certain steps to be completed and/or to cause application 118 to send a signal to controller 80 of ice maker 10 to initiate a function. Accordingly, the population of action buttons on Full Sanitize screen 398 may include, but is not limited to, Full Sanitize Complete button 402. At step 400a, the person performing the full sanitize may enter their name in text box 376. By manipulating Full Sanitize Complete button 402, the full sanitize of ice maker 10 is completed.

Accordingly, manipulating Full Sanitize Complete button 402 may cause application 118 to write, save and/or upload a record of the full sanitize to memory 90 of ice maker 10, to memory 110 of portable electronic device 100, to a website, to computers or servers 142, 144, 146, and/or 148, to a remote server, and/or to any suitable location for storing a record of the full sanitize. Accordingly, this record may be later accessed and/or viewed to determine various aspects of the full sanitize, including but not limited to, who performed the full sanitize, the time that the full sanitize was completed, etc. In certain embodiments, this record may be one of a population of service records as described more fully elsewhere herein. After the full sanitize of ice maker 10 is complete, controller 80 of ice maker 10 may be able to control ice maker 10 according to the various parameters input during installation without requiring portable electronic device to be in proximity and/or connected to ice maker 10. Thus controller 80 may independently control ice maker 10.

Figure 12:
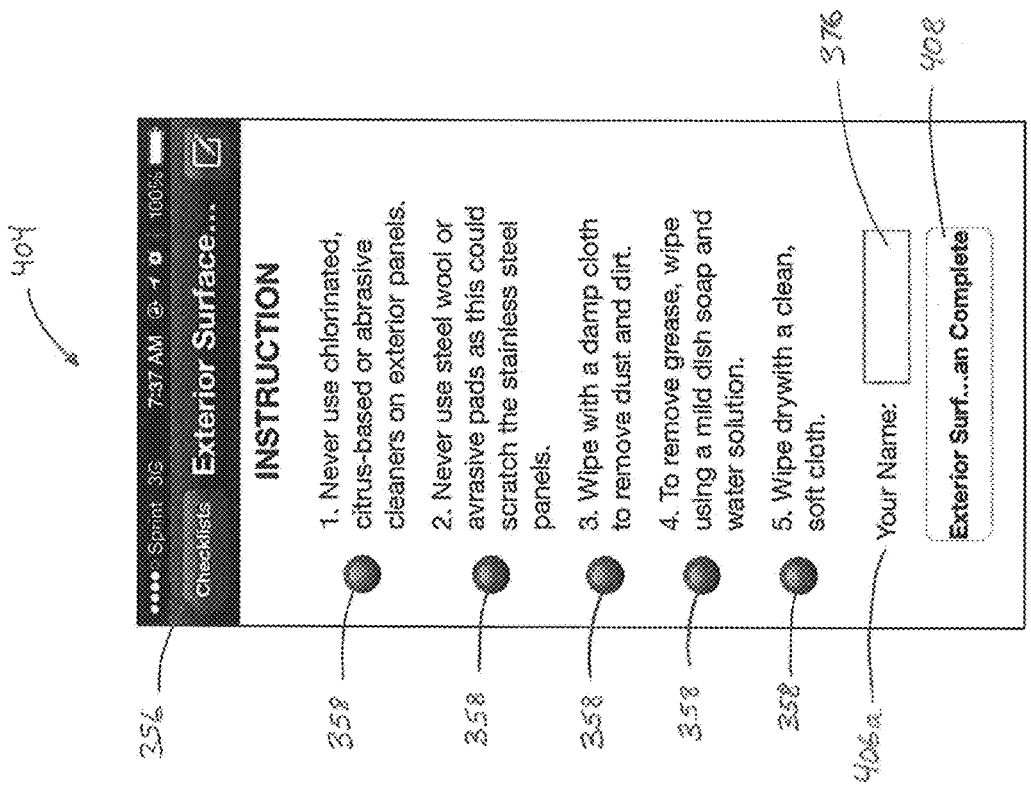
Figure 13:
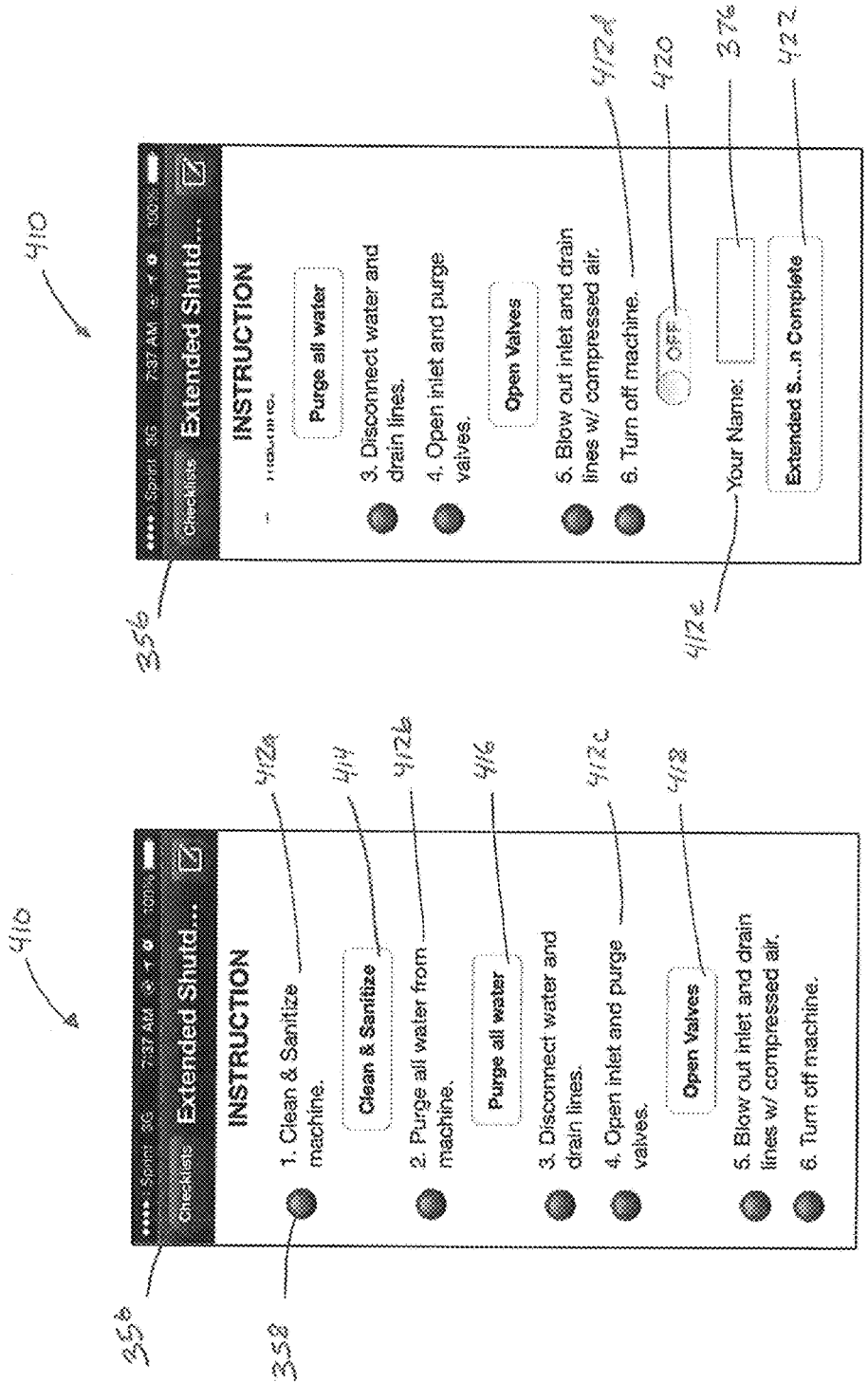

Returning now to FIG. 7, manipulating Exterior Surface Clean button 348 may cause Exterior Surface Clean screen 404 to be presented on user interface 108 of portable electronic device 100 as shown in FIG. 12. As illustrated in FIG. 12, embodiments of Exterior Surface Clean screen 404 may display a population of steps for conducting an exterior surface clean of ice maker 10. Exterior Surface Clean screen 404 may also include a return to Checklist Screen button 356 that, when manipulated, returns application 118 to Checklist screen 354 as shown in FIG. 7. A population of radio buttons 358 may be displayed that correspond to the individual steps which permit tracking the progress of the exterior surface clean of ice maker 10. Accordingly, in certain embodiments, the population of radio buttons 358 may be manipulated, or "checked," to indicate that a step of the exterior surface clean has been completed. It will be understood that in certain embodiments, Exterior Surface Clean screen 404 may include some or all of the steps illustrated in FIG. 12 and/or may include additional steps not illustrated without departing from the scope of the invention.

Exterior Surface Clean screen 404 may also include a population of action buttons which, when manipulated permit certain steps to be completed and/or to cause application 118 to send a signal to controller 80 of ice maker 10 to initiate a function. Accordingly, the population of action buttons on Exterior Surface Clean screen 404 may include, but is not limited to, Exterior Surface Clean Complete button 408. At step 406a, the person performing the exterior surface clean may enter their name in text box 376. By manipulating Exterior Surface Clean Complete button 408, the exterior surface clean of ice maker 10 is completed.

Accordingly, manipulating Exterior Surface Clean Complete button 408 may cause application 118 to write, save and/or upload a record of the exterior surface clean to memory 90 of ice maker 10, to memory 110 of portable electronic device 100, to a website, to computers or servers 142, 144, 146, and/or 148, to a remote server, and/or to any suitable location for storing a record of the exterior surface clean. Accordingly, this record may be later accessed and/or viewed to determine various aspects of the exterior surface clean, including but not limited to, who performed the exterior surface clean, the time that the exterior surface clean was completed, etc. In certain embodiments, this record may be one of a population of service records as described more fully elsewhere herein.

Returning now to FIG. 7, manipulating Extended Shutdown button 350 may cause Extended Shutdown screen 410 to be presented on user interface 108 of portable electronic device 100 as shown in FIGS. 13A and 13B. Extended Shutdown screen 410 may be a scrollable screen and to illustrate the entire screen, multiple views at different scrolled positions are shown in FIGS. 13A and 13B. As illustrated in FIGS. 13A and 13B, embodiments of Extended Shutdown screen 410 may display a population of steps for conducting an extended shutdown of ice maker 10. Extended Shutdown screen 410 may also include a return to Checklist Screen button 356 that, when manipulated, returns application 118 to Checklist screen 354 as shown in FIG. 7. A population of radio buttons 358 may be displayed that correspond to the individual steps which permit tracking the progress of the extended shutdown procedure of ice maker 10. Accordingly, in certain embodiments, the population of radio buttons 358 may be manipulated, or "checked," to indicate that a step of the extended shutdown procedure has been completed. It will be understood that in certain embodiments, extended shutdown screen 410 may include some or all of the steps illustrated in FIGS. 13A and 13B and/or may include additional steps not illustrated without departing from the scope of the invention.

Extended Shutdown screen 410 may also include a population of action buttons which, when manipulated permit certain steps to be completed and/or to cause application 118 to send a signal to controller 80 of ice maker 10 to initiate a function. Accordingly, the population of action buttons on Extended Shutdown screen 410 may include, but is not limited to, Clean and Sanitize button 414, Purge Water button 416, Open Valves button 418, Turn Off Machine button 420, and/or Extended Shutdown Complete button 422. At step 412a, Clean and Sanitize button 414 may be manipulated which can cause a signal to be sent to controller 80 of ice maker 10 to initiate a clean and sanitize process to eliminate mineral, metals, biologics and/or other contaminants from ice maker 10. At step 412b, Purge Water button 416 may be manipulated which can cause a signal to be sent to controller 80 of ice maker 10 to turn on water pump 62 and open purge valve 56 of ice maker to purge all water from ice maker 10. At step 412c, Open Valves button 418 may be manipulated which can cause a signal to be sent to controller 80 of ice maker 10 to open water inlet valve 52 and open purge valve 56 of ice maker 10. At step 412d, Turn Off Machine button 420 may be manipulated which can turn off ice maker 10. At step 412e, the person performing the extended shutdown procedure may enter their name in text box 376. By manipulating Extended Shutdown Complete button 422, the extended shutdown procedure of ice maker 10 is completed.

Accordingly, manipulating Exterior Surface Clean Complete button 408 may cause application 118 to write, save and/or upload a record of the extended shutdown to memory 90 of ice maker 10, to memory 110 of portable electronic device 100, to a website, to computers or servers 142, 144, 146, and/or 148, to a remote server, and/or to any suitable location for storing a record of the extended shutdown. Accordingly, this record may be later accessed and/or viewed to determine various aspects of the extended shutdown, including but not limited to, who performed the extended shutdown, the time that the extended shutdown was completed, etc. In certain embodiments, this record may be one of a population of service records as described more fully elsewhere herein.

Figure 14:
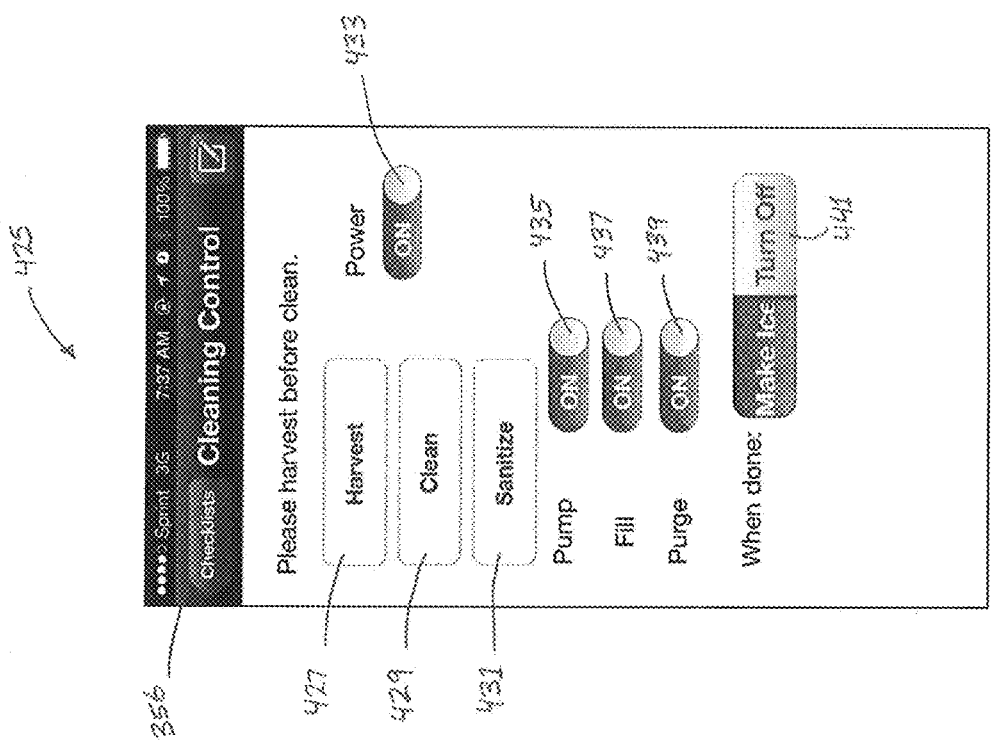

Returning now to FIG. 7, manipulating Cleaning Controls button 352 may cause Cleaning Control screen 425 to be presented on user interface 108 of portable electronic device 100 as shown in FIG. 14. As illustrated in FIG. 14, embodiments of Cleaning Control screen 425 may display a population of action buttons which may be manipulated to cause one or more signals to be sent to controller 80 of ice maker 10 to cause controller 80 to operate one or more components of ice maker 10. Accordingly, the population of buttons on Cleaning Control screen 425 may permit application 118 on portable electronic device to override ice maker firmware 96a so that portable electronic device 100 can control some or all of the operation of ice maker 10. In various embodiments, the population of action buttons on Cleaning Control screen 425 may include, but is not limited to, Cleaning Control screen 425 may display Harvest button 427, Clean button 429, Sanitize button 431, ice maker 10 Power ON/OFF button 433, water pump 620N/OFF button 435, water inlet valve 520N/OFF button 437, purge valve 560N/OFF (open/closed) button 439, and/or When Done button 441 to specify what the machine does when any of the cleaning commands is complete. If When Done button 441 is set to Make Ice, then ice maker 10 will make ice when the cleaning is complete. If When Done button 441 is set to Turn Off, then ice maker 10 will turn off when the cleaning is complete. Cleaning Control screen 425 may also include a return to Checklist Screen button 356 that, when manipulated, returns application 118 to Checklist screen 354 as shown in FIG. 7.

Figure 15:
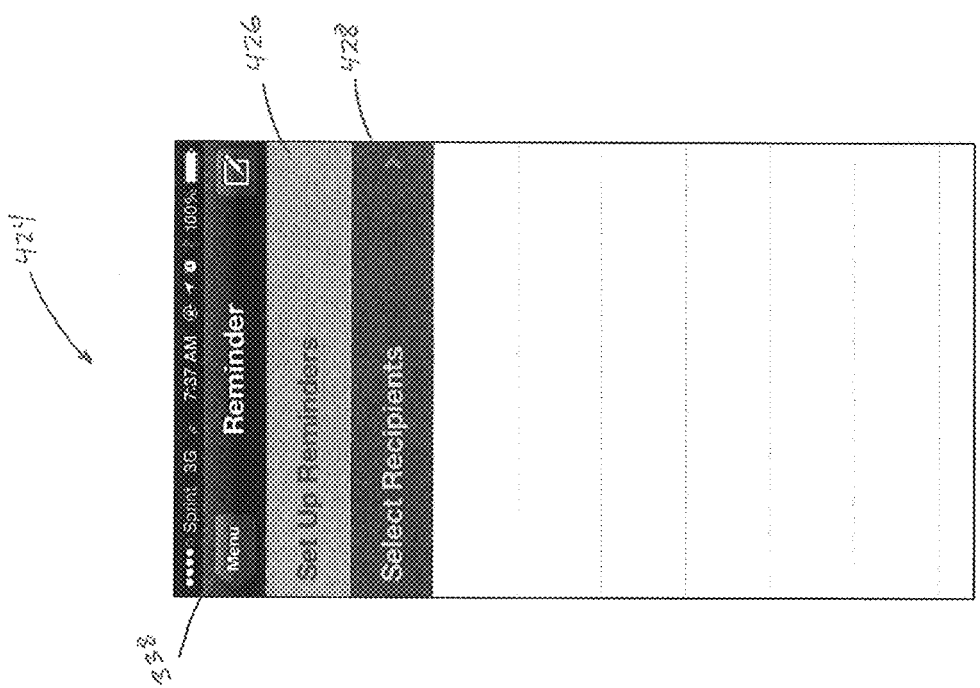

Returning to FIG. 6, manipulating Reminders button 324 may cause Reminder screen 424 to be presented on user interface 108 of portable electronic device 100 as shown in FIG. 15. Reminder screen 424 may include a population of buttons, including, but not limited to, Set Up Reminders button 426 and Select Recipients button 428. Manipulating Set Up Reminders button 426 and Select Recipients button 428 permits the scheduling of reminders for cleaning and/or routine servicing of ice maker 10 and for sending a reminder text message, email, voicemail, telephone call, instant message, calendar reminder, etc. to a recipient. Additionally, the reminders can be set as a calendar item on the portable electronic device 100 user's personal calendar or as a general reminder alert on the ice maker 10. Reminder screen 424 may also include a return to Menu button 338 that, when manipulated, returns application 118 to Menu screen 314 as shown in FIG. 6.

Figure 16:
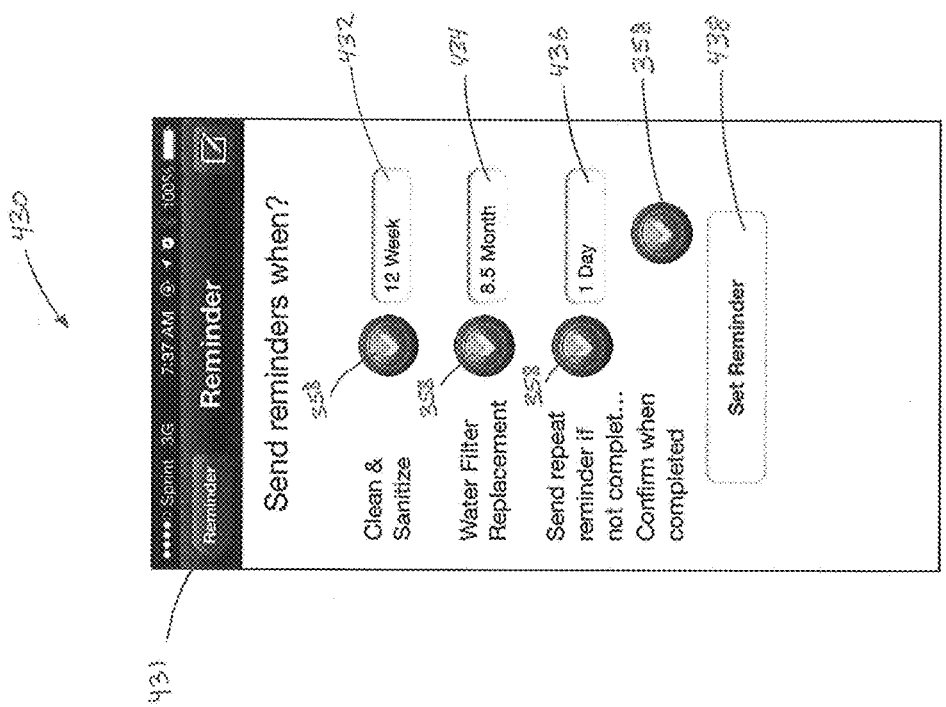

Manipulating Set Up Reminders button 426 may cause Set Up Reminder screen 430 to be presented on user interface 108 of portable electronic device 100 as shown in FIG. 16. As illustrated in FIG. 16, embodiments of Set Up Reminder screen 430 may display a population of reminders that can be scheduled for cleaning and/or routine servicing of ice maker 10. Set Up Reminder screen 430 may also include a return to Reminders button 431 that, when manipulated, returns application 118 to Reminder screen 424 as shown in FIG. 15. A population of radio buttons 358 may be manipulated to select the reminders desired to be activated or set. It will be understood that in certain embodiments, Set Up Reminder screen 430 may include some or all of the reminders illustrated in FIG. 16 and/or may include additional reminders not illustrated without departing from the scope of the invention. If a clean and sanitize reminder is desired, radio button 358 corresponding to the clean and sanitize reminder can be selected and a time for the reminder to occur can be entered into and/or selected in text box 432.

Additionally, if a water filter replacement reminder is desired, radio button 358 corresponding to the water filter replacement reminder can be selected and a time for the reminder to occur can be entered into and/or selected in text box 434. Furthermore, if it is desired that repeat reminders be sent if the clean and sanitize procedure is not completed and/or if the water filter is not replaced, radio button 358 corresponding to the repeat reminder can be selected and a time for the repeat reminder to occur can be entered into and/or selected in text box 436. Additionally, if it is desired that a confirmation message be sent when the clean and sanitize procedure is completed and/or the water filter is replaced, radio button 358 corresponding to the confirm when completed reminder can be selected.

By manipulating Set Reminder button 438, the selected reminders may be activated or set. Accordingly, manipulating Set Reminder button 438 may cause application 118 to write, save and/or upload a record of the selected reminders to memory 90 of ice maker 10, to memory 110 of portable electronic device 100, to a website, to computers or servers 142, 144, 146, and/or 148, to a remote server, and/or to any suitable location for storing a record of the selected reminders. Accordingly, ice maker 10, portable electronic device 100, a website, computers or servers 142, 144, 146, and/or 148, a remote server, etc. may then send out the selected reminders according to the times entered in text boxes 432, 434, 436. The reminders may be sent out to desired recipients as described with respect to FIG. 17. In certain embodiments, ice maker 10 may also include a display (not shown) which may be able to display messages, reminders, error or failure messages, etc. as reported and/or indicated by controller 80. The display may be any type and/or of display including, but not limited to, an LCD screen, one or more LEDs, etc. without departing from the scope of the invention. In certain embodiments, ice maker 10 may include an alarm (not shown) which can provide an audible alert corresponding to a set reminder. Alarm may include, but is not limited to, a speaker, a buzzer, a chime, a bell, and/or some other device capable of making a human-audible and/or non-human-audible sound.

Figure 17:
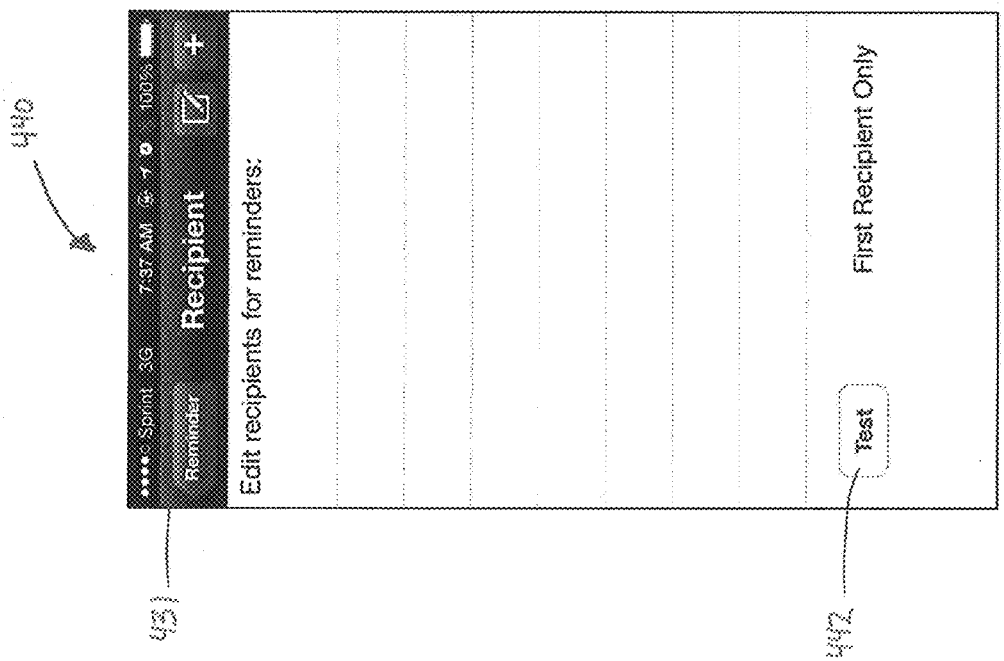

Returning to FIG. 15, manipulating Select Recipients button 428 may cause Recipient screen 440 to be presented on user interface 108 of portable electronic device 100 as shown in FIG. 17. On Recipient screen 440 a list can be made of recipients to which the reminders selected and set on Set Up Reminders screen 430 are desired to be sent. Recipient screen 440 may also include a return to Reminders button 431 that, when manipulated, returns application 118 to Reminder screen 424 as shown in FIG. 15. In certain embodiments, Recipient screen 440 may also include Test button 442 which can send a test reminder to one or more selected recipients to confirm that reminders can be properly sent and received. Accordingly, application 118 may write, save and/or upload a record of the selected recipients to memory 90 of ice maker 10, to memory 110 of portable electronic device 100, to a website, to computers or servers 142, 144, 146, and/or 148, to a remote server, and/or to any suitable location for storing the record of the list of recipients. Accordingly, one or more of ice maker 10, portable electronic device 100, a website, computers or servers 142, 144, 146, and/or 148, a remote server, etc. may then send out the selected reminders according to the times entered in text boxes 432, 434, 436 to the listed recipients. The selected reminders may be sent to the listed recipients in a variety of ways, including, but not limited to, via text message, via email, via voicemail, via telephone call, via instant message, via calendar reminder, etc.

Figure 18:
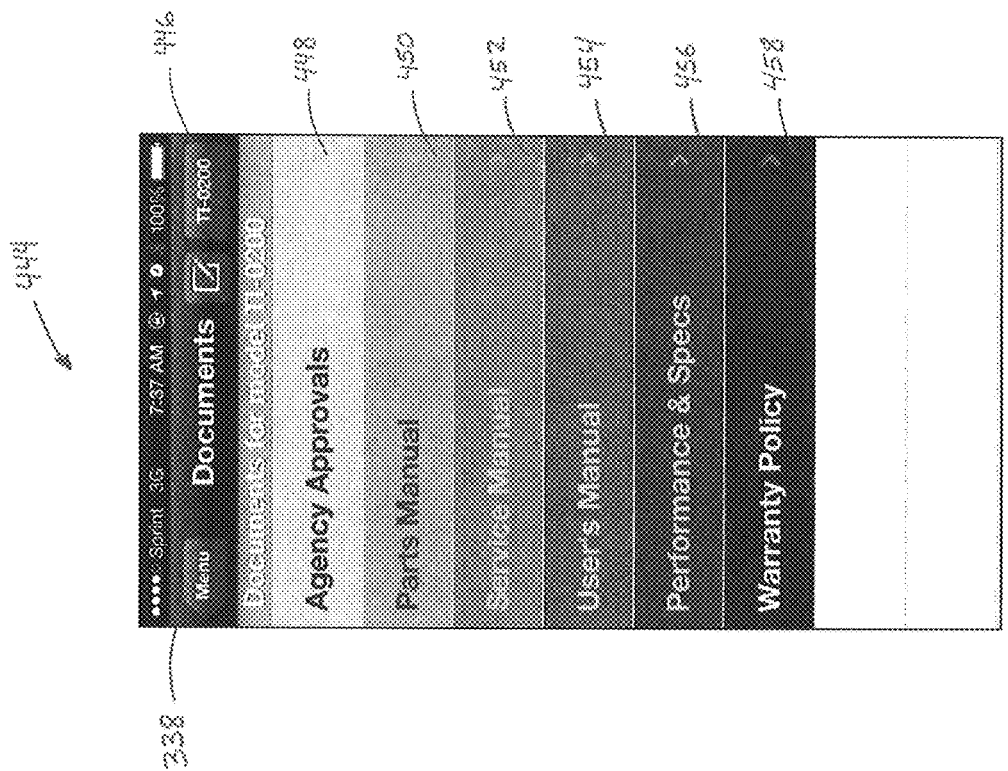

Returning to FIG. 6, manipulating Documents button 326 may cause Documents screen 444 to be presented on user interface 108 of portable electronic device 100 as shown in FIG. 18. As illustrated on FIG. 18, Documents screen 444 may include a population of buttons, including, but not limited to, Refrigerator Appliance Identifier button 446, Agency Approvals button 448, Parts Manual button 450, Service Manual button 452, User's Manual button 454, Performance and Specifications Document button 456, and Warranty Policy button 458. Documents screen 444 may also include a return to Menu Screen button 338 that, when manipulated, returns application 118 to Menu screen 314 as shown in FIG. 6. Documents available for viewing may default to those corresponding to ice maker 10 to which portable electronic device 100 is connected. Accordingly, manipulating Agency Approvals button 446, Parts Manual button 450, Service Manual button 452, User's Manual button 454, Performance and Specifications Document button 456, and Warranty Policy button 458 may present or display information corresponding to ice maker 10 to which portable electronic device 100 is connected. Refrigerator Appliance Identifier Button 446 may display a name, serial number, model number, and/or other identifier of ice maker 10 or appliance for which a document is desired to which portable electronic device 100 is connected. Additionally, Refrigerator Appliance Identifier button 446 may be manipulated to select a name, serial number, model number, and/or other identifier of ice maker 10 or refrigeration appliance 1000 to which portable electronic device 100 is not presently connected. In certain embodiments, this may allow a user to look up information regarding a refrigeration appliance 1000 without portable electronic device 100 being connected to a refrigeration appliance 1000. In other embodiments, manipulating Refrigerator Appliance Identifier button 446 to select Refrigeration Appliances that which portable electronic device 100 is not presently connected may allow a user to look up information regarding a refrigeration appliance 1000 different from the refrigeration appliance 1000 to which portable electronic device 100 is connected.

In various embodiments, application 118 may present and/or display agency approval documents, parts manuals, service manuals, user's manuals, performance and specification documents, and warranty documents, etc. In certain embodiments, for example, one or more of the agency approval documents, parts manuals, service manuals, user's manuals, performance and specifications document, and warranty policies may be stored on memory 110 of portable electronic device 100. In other embodiments, for example, one or more of the agency approval documents, parts manuals, service manuals, user's manuals, performance and specifications document, and warranty policies may be downloaded from memory 90 of ice maker 10, a website, computers or servers 142, 144, 146, and/or 148, a remote server, and/or any suitable location from which such information may be downloaded. Thus in certain embodiments, the most up-to-date documents may be displayed. These documents may be printed, emailed, downloaded or otherwise transferred for later viewing.

Figure 19:
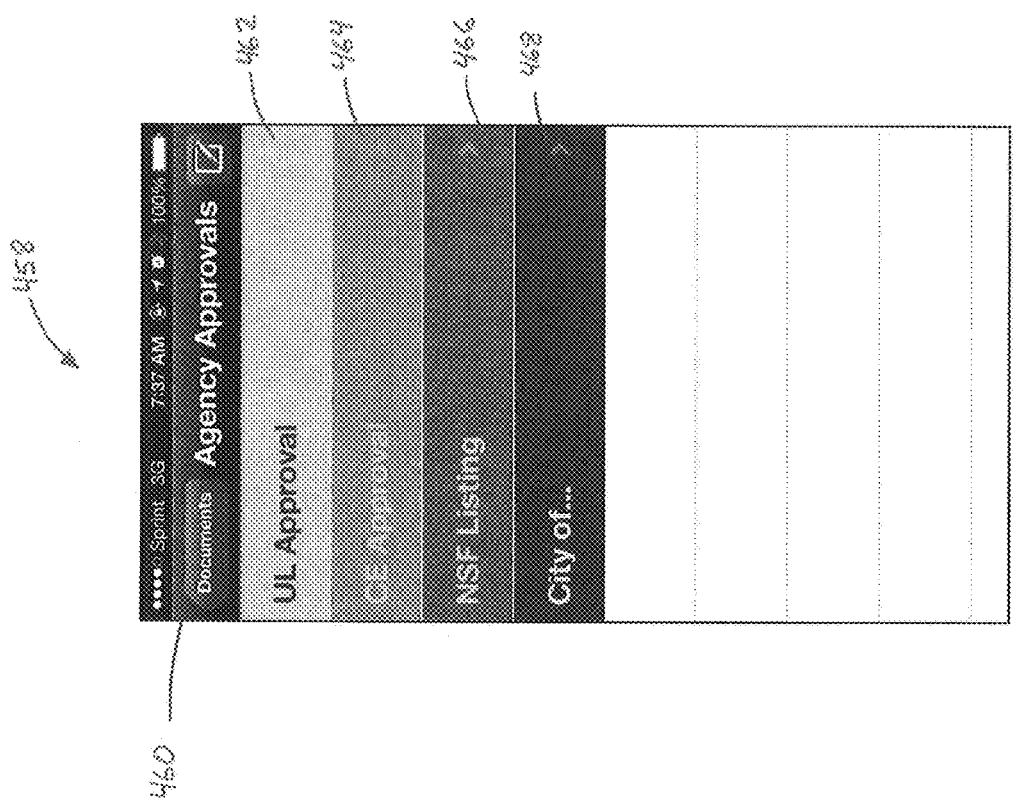
Figure 20:
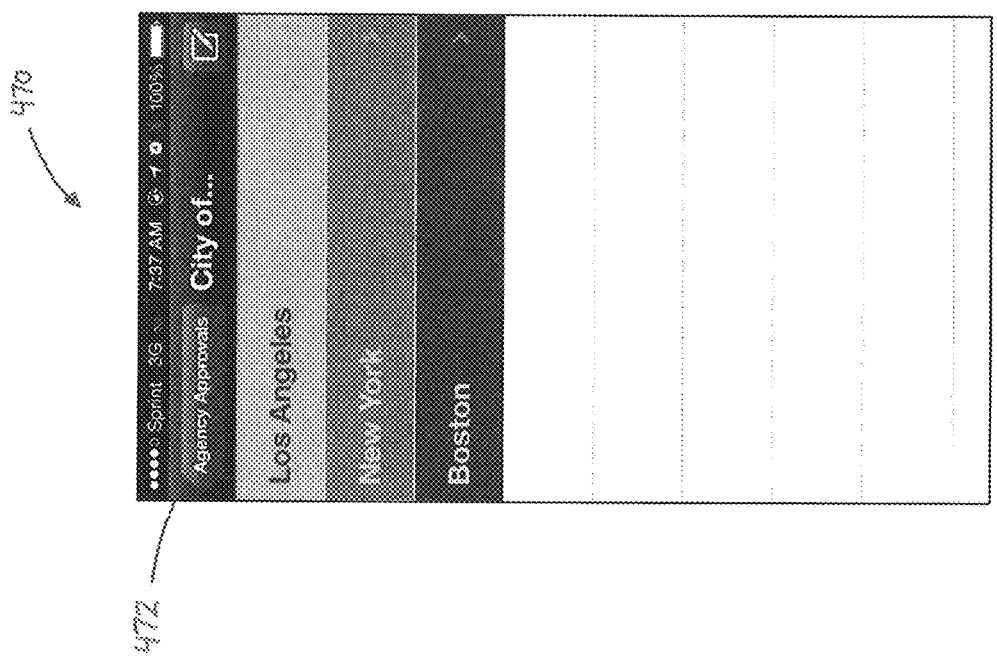

Manipulating Agency Approvals button 448 may cause Agency Approvals screen 458 to be presented on user interface 108 of portable electronic device 100 as shown in FIG. 19. As illustrated on FIG. 19, Agency Approvals screen 458 may include a population of buttons, including, but not limited to, Underwriters Laboratory (UL) Approval button 462, CE Approval button 464, NSF Listing Button 466, and City Approvals button 468. Agency Approvals screen 458 may also include a return to Documents Screen button 460 that, when manipulated, returns application 118 to Documents screen 444 as shown in FIG. 18. Manipulating Underwriters Laboratory (UL) Approval button 462, CE Approval button 464, and NSF Listing Button 466 may provide agency approval information specific to ice maker 10 to which portable electronic device 100 is connected. Additionally, manipulating City Approvals button 468 may provide specific city approval information specific to ice maker 10 to which portable electronic device 100 is connected, as shown in FIG. 20. Thus manipulating City Approvals button 468 may cause City Approvals screen 470 to be presented on user interface 108 of portable electronic device 100 as shown in FIG. 20. As illustrated on FIG. 20, City Approvals screen 470 may include a population of city name buttons which may be manipulated to access approval information from the corresponding city. City Approvals screen 470 may also include a return to Agency Approvals Screen button 472 that, when manipulated, returns application 118 to Agency Approvals screen 458 as shown in FIG. 18.

Figure 21:
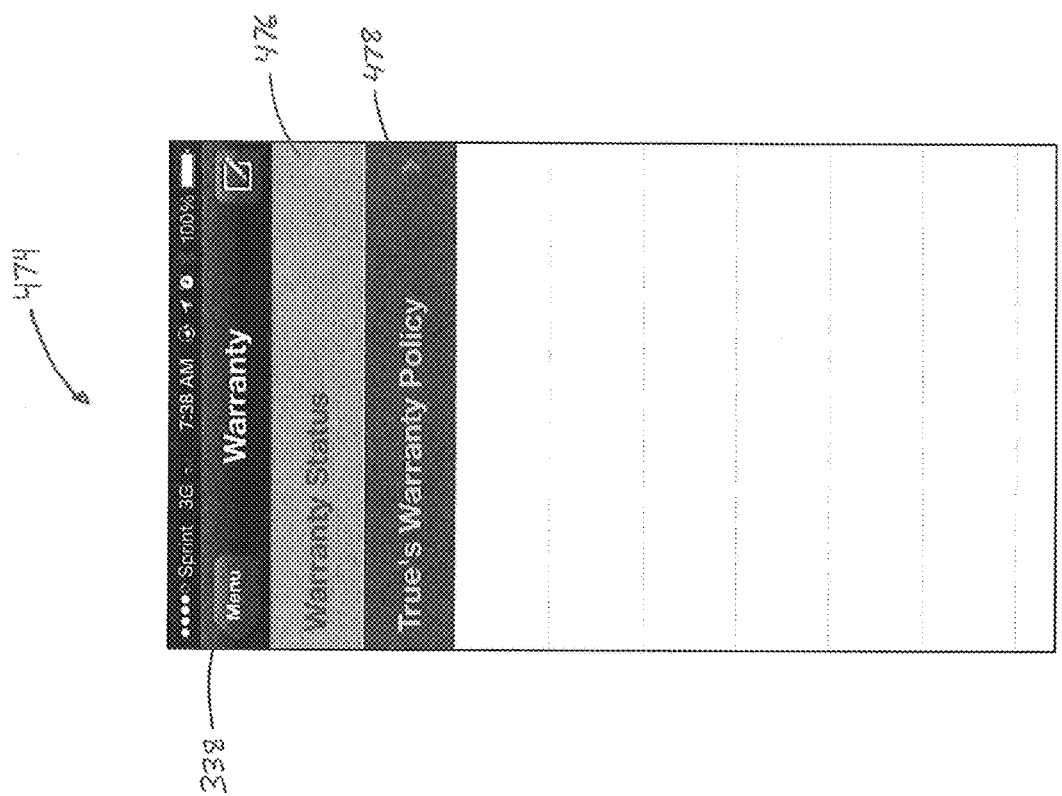
Figure 22:
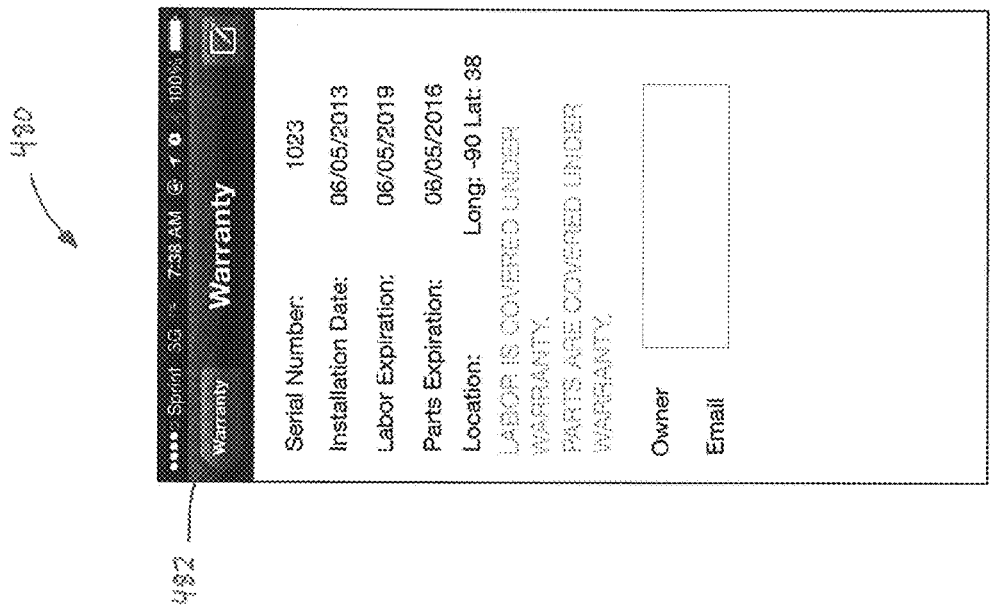

Returning to FIG. 6, manipulating Warranty button 328 may cause Warranty screen 474 to be presented on user interface 108 of portable electronic device 100 as shown in FIG. 21. As illustrated on FIG. 21, Warranty screen 474 may include a population of buttons, including, but not limited to, return to Menu button 338, Warranty Status button 476 and Warranty Policy button 478. Return to Menu Screen button 338 may, when manipulated, return application 118 to Menu screen 314 as shown in FIG. 6. Manipulating Warranty Status button 476 may cause Warranty Status screen 480 to be presented on user interface 108 of portable electronic device 100 as shown in FIG. 22. As illustrated on FIG. 22, Warranty Status screen 480 may provide warranty status information specific to ice maker 10 to which portable electronic device 100 is connected. Warranty Status screen 480 may also include a return to Warranty Screen button 482 that, when manipulated, returns application 118 to Warranty screen 474 as shown in FIG. 21.

Accordingly, manipulating Warranty Status button 476 may cause application 118 to query a database located on computers or servers 142, 144, 146, and/or 148, a remote server, etc. to determine and display the warranty status information corresponding to the serial number of ice maker 10. Application 118 may additionally or alternatively, display warranty status information of ice maker 10 according to the serial number of ice maker 10 and the installation date stored on ice maker 10 by using warranty rules programmed into controller 80 of ice maker 10 and/or programmed into application 118. The warranty status information may include, but is not limited to, the serial number of ice maker 10, the name of ice maker 10, the date that ice maker 10 was installed, the date that the labor warranty for ice maker 10 expires, the date that the parts warranty for ice maker 10 expires, an indication that ice maker 10 is or is not covered under the labor warranty, an indication that ice maker 10 is or is not covered under the parts warranty, etc. The warranty status information may also include information about the owner of ice maker 10 including, but not limited to, name, email, telephone number, address, and/or other contact information. Additionally, the warranty status information displayed on Warranty Status screen 480 may also include the location of ice maker 10. The location of ice maker 10 may be set as described more fully elsewhere herein.

Figure 23:
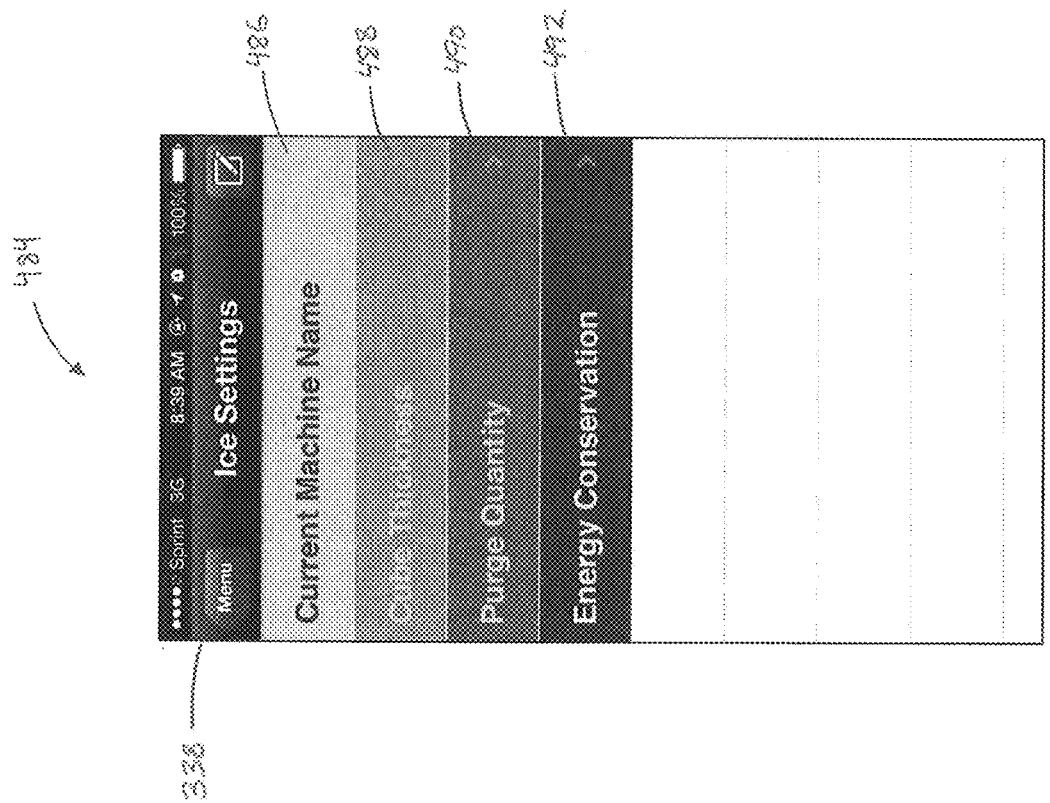
Figure 24:
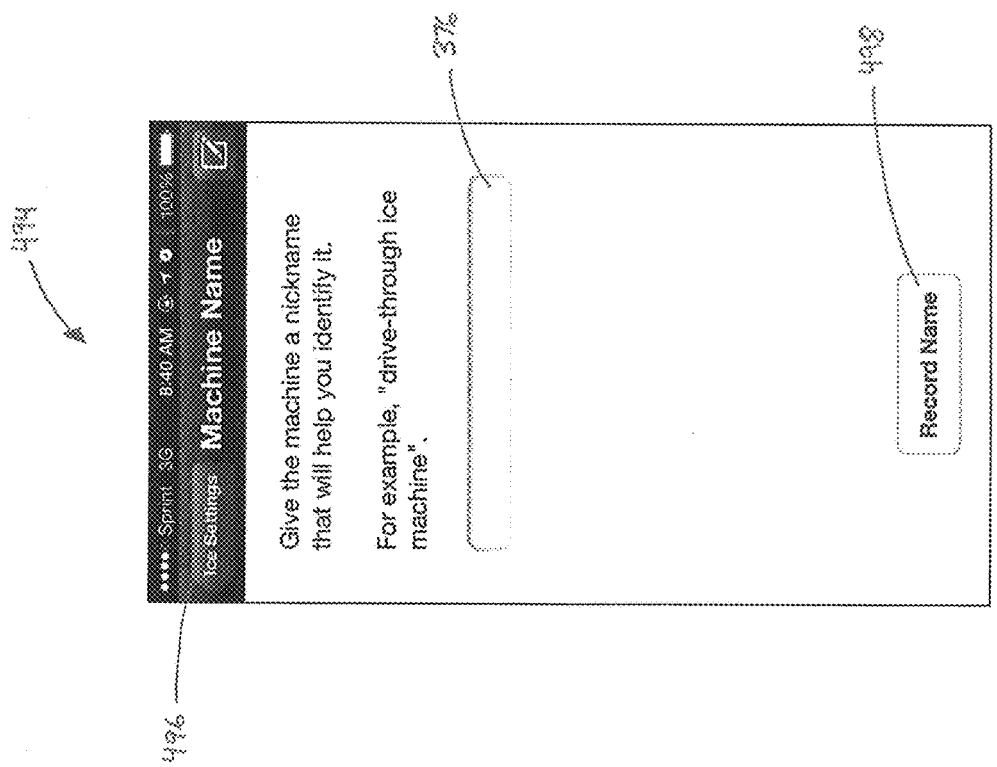

Returning to FIG. 6, manipulating Ice Settings button 330 may cause Ice Settings screen 484 to be presented on user interface 108 of portable electronic device 100 as shown in FIG. 23. As illustrated on FIG. 23, Ice Settings screen 484 may include a population of buttons, including, but not limited to, Current Machine Name button 486, Cube Thickness button 488, Purge Quantity button 490, and Energy Conservation button 492. Ice Settings screen 484 may also include a return to Menu Screen button 338 that, when manipulated, returns application 118 to Menu screen 314 as shown in FIG. 6. Manipulating Current Machine Name button 486 may cause Machine Name screen 494 to be presented on user interface 108 of portable electronic device 100 as shown in FIG. 24. Machine Name screen 494 may present or display the type, serial number, model number, etc. of ice maker 10 to which portable electronic device 100 is connected and may permit the entering of a name for ice maker 10. As illustrated on FIG. 24, Machine Name screen 494 may include text box 376 in which a name for ice maker 10 may input in order to assist in identifying ice maker 10. Manipulating Record Name button 498 may cause application 118 to write, save and/or upload a record of the name input into text box 376 to memory 90 of ice maker 10, to memory 110 of portable electronic device 100, to a website, to computers or servers 142, 144, 146, and/or 148, to a remote server, and/or to any suitable location for storing a record of the name of ice maker 10. In certain embodiments, this record may be one of a population of service records as described more fully elsewhere herein. Machine Name screen 494 may also include a return to Ice Settings Screen button 496 that, when manipulated, returns application 118 to Ice Settings screen 484 as shown in FIG. 23.

Figure 25:
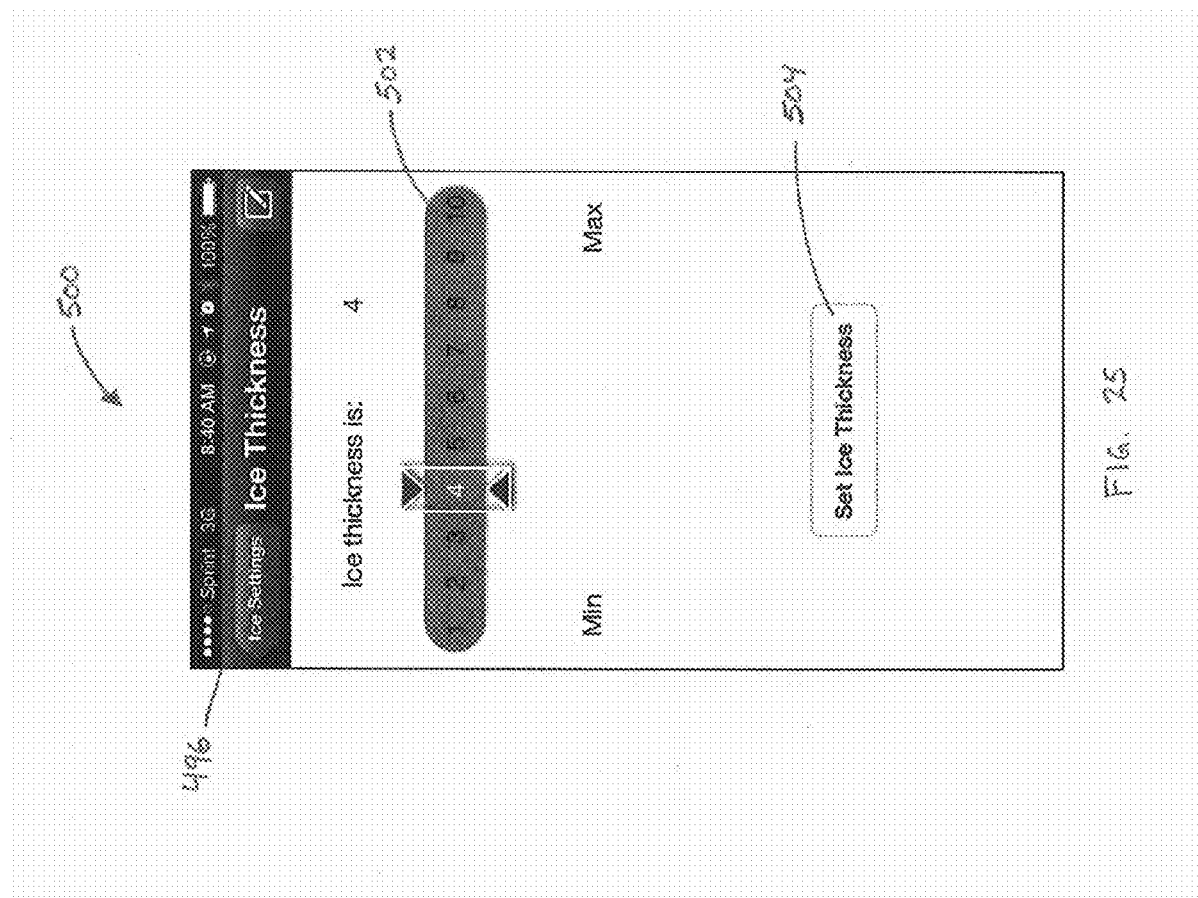

Returning to FIG. 23, manipulating Cube Thickness button 488 may cause Ice Thickness screen 500 to be presented on user interface 108 of portable electronic device 100 as shown in FIG. 25. As illustrated on FIG. 25, Ice Thickness screen 500 may include, but is not limited to, return to Ice Settings button 496, ice thickness input 502 and Set Ice Thickness button 504. The current ice thickness setting may be displayed on user interface 108 of portable electronic device 100. Ice thickness input 502 may permit setting the thickness of ice to be made by ice maker 10. Ice thickness input 502 is illustrated as a slider which can be slid to select the desired ice thickness. However, it will be understood that ice thickness input 502 may be any type of user interface element that permits inputting and/or selecting the thickness of ice to be made by ice maker 10, including, but not limited to, a text box, a number picker, etc. without departing from the scope of the invention. Manipulating Set Ice Thickness button 504 may cause application 118 to write, save and/or upload a record of the set ice thickness to memory 90 of ice maker 10 so that ice maker firmware 96a can produce ice to the selected thickness. In certain embodiments, application 118 may also write, save and/or upload a record of the selected ice thickness to memory 110 of portable electronic device 100, to a website, to computers or servers 142, 144, 146, and/or 148, to a remote server, and/or to any suitable location for storing a record of the selected thickness of ice. In certain embodiments, this record may be one of a population of service records as described more fully elsewhere herein.

Figure 26:
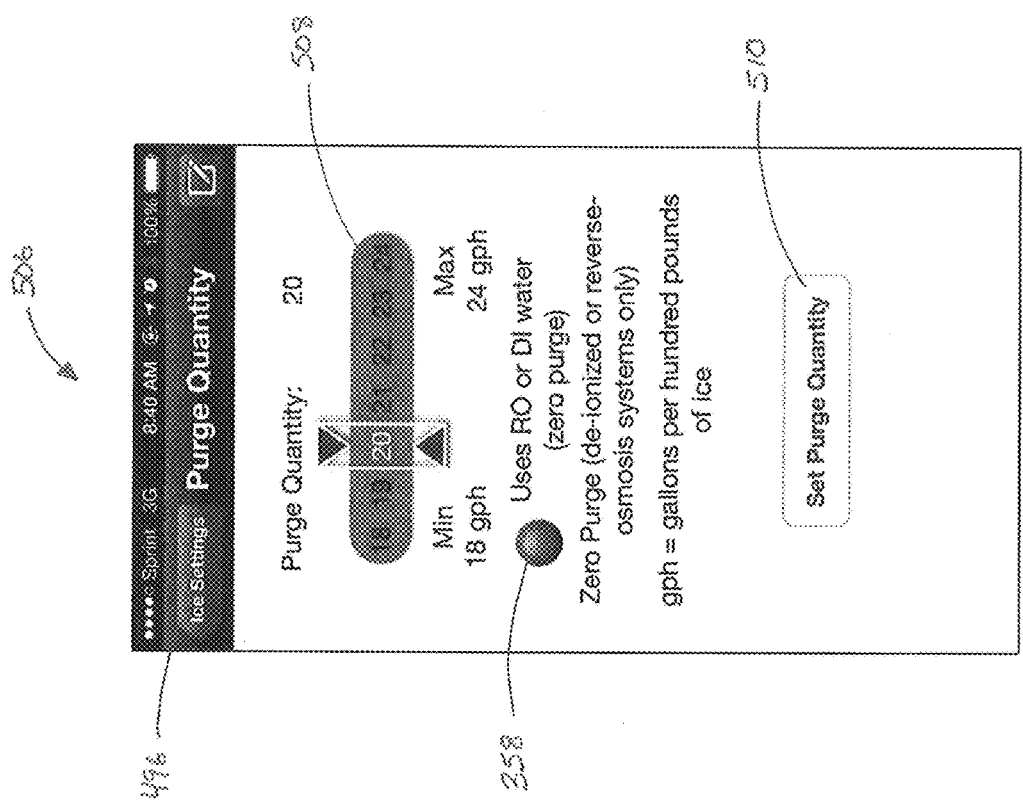

If desired, additional operating settings can be set by returning to Ice Settings screen 484 as shown in FIG. 23 by manipulating return to Ice Settings button 496. Then manipulating Purge Quantity button 490 may cause Purge Quantity screen 506 to be presented on user interface 108 of portable electronic device 100 as shown in FIG. 26. The current purge quantity setting may be displayed on user interface 108 of portable electronic device 100. As illustrated on FIG. 26, Purge Quantity screen 506 may include, but is not limited to, return to Ice Settings button 496, purge quantity input 508, radio button 358, and Set Purge Quantity button 510. Purge quantity input 508 may permit setting the amount of water to be purged from ice maker 10 per a set amount of ice. Accordingly, the purge quantity is the quantity of water that is flushed from ice maker 10 during each ice making cycle. In various embodiments, the purge quantity may be measured in gallons per hundred pounds of ice. It will be understood that the purge quantity may be measured in a variety of ways without departing from the scope of the invention. As illustrated in FIG. 26, for example, the purge quantity can be set from 18 to 24 gallons per hundred pounds of ice; however, it will be understood that other minimum and maximum limits of purge quantity may be specified without departing from the scope of the invention.

Purge quantity input 508 is illustrated as a slider which can be slid to set the desired purge quantity. However, it will be understood that purge quantity input 508 may be any type of user interface element that permits inputting and/or selecting the purge quantity, including, but not limited to, a text box, a number picker, etc. without departing from the scope of the invention. Additionally, radio button 358 may be selected to indicate whether ice maker 10 uses reverse osmosis (RO) or de-ionized (DI) water. If radio button 358 is selected to indicate that RO or DI water is used, ice maker 10 will not purge any water (Zero Purge). Manipulating Set Purge Quantity button 508 may cause application 118 to write, save and/or upload a record of the selected purge quantity to memory 90 of ice maker 10 so that ice maker firmware 96a can purge the selected quantity of ice. In certain embodiments, application 118 may also write, save and/or upload a record of the selected purge quantity to memory 110 of portable electronic device 100, to a website, to computers or servers 142, 144, 146, and/or 148, to a remote server, and/or to any suitable location for storing a record of the selected purge quantity.

Figure 27:
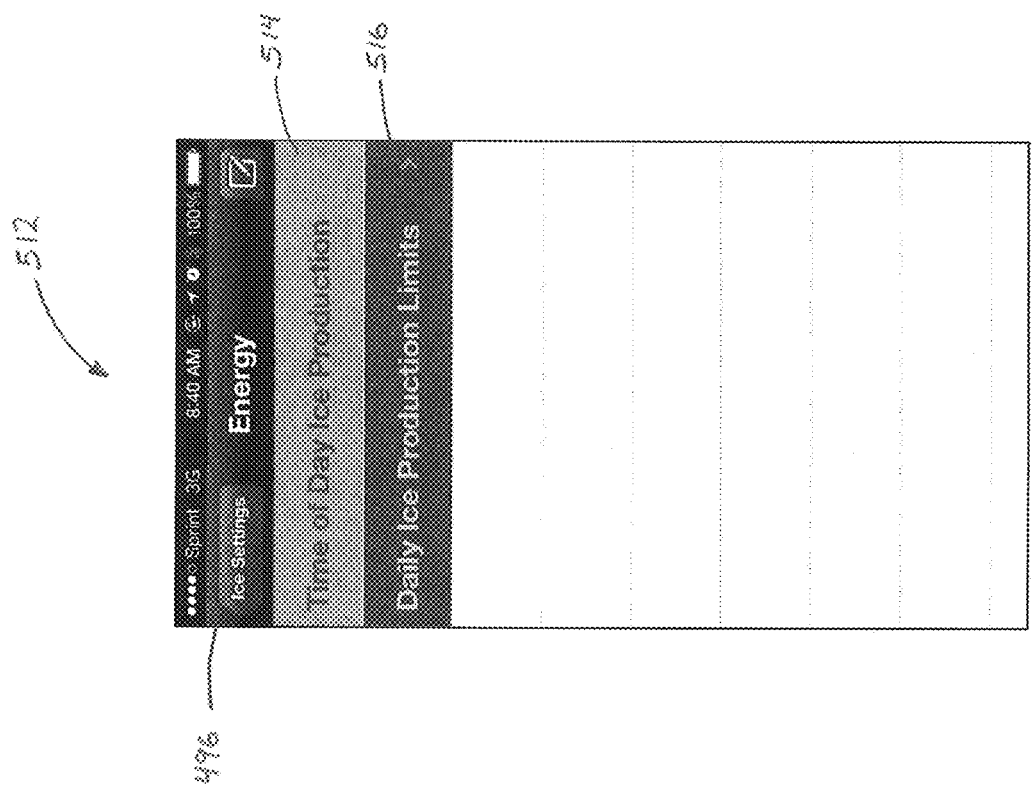
Figure 28:
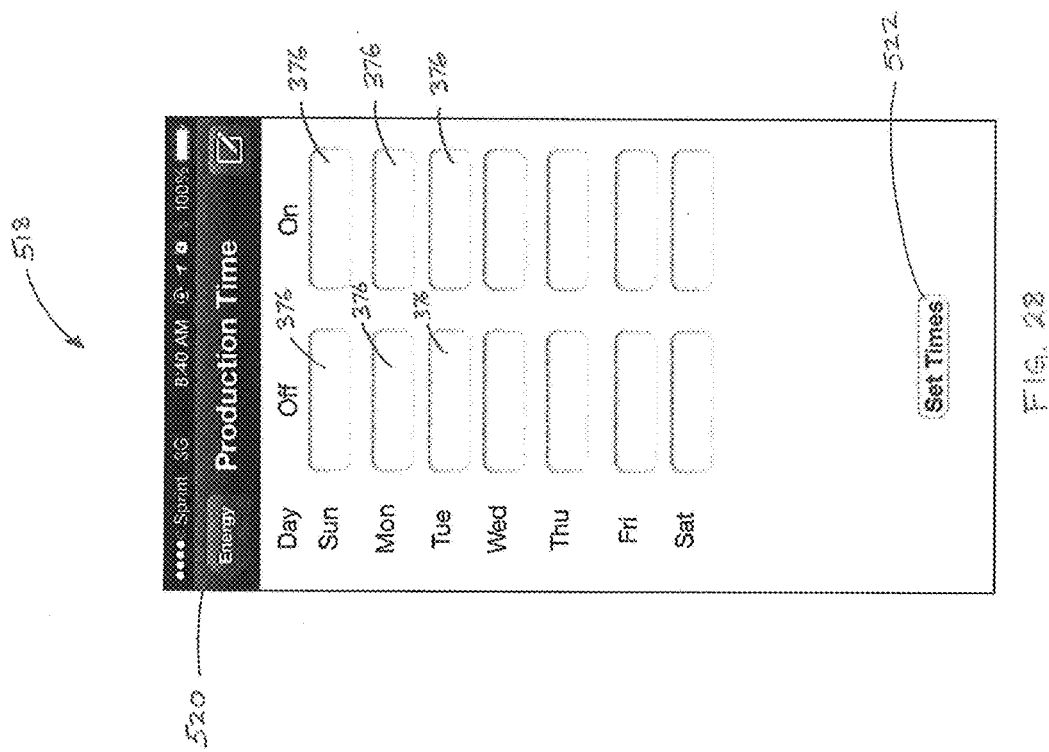

If desired, additional ice settings can be set by returning to Ice Settings screen 484 as shown in FIG. 23 by manipulating return to Ice Settings button 496. Then manipulating Energy Conservation button 492 may cause Energy Conservation screen 512 to be presented on user interface 108 of portable electronic device 100 as shown in FIG. 27. As illustrated on FIG. 27, Energy Conservation screen 512 may include a population of buttons, including, but not limited to, return to Ice Settings button 496, Time of Day Ice Production button 514, and Daily Ice Production Limits button 516. Manipulating Time of Day Ice Production button 514 may cause Time of Day Ice Production screen 518 to be presented on user interface 108 of portable electronic device 100 as shown in FIG. 28. As illustrated on FIG. 28, Time of Day Ice Production screen 518 may include a population of text boxes 376 corresponding to ice production on and off times for every day of the week and a Set Times button 522.

Accordingly, the time of day that ice production is to end (OFF) and the time of day that ice production is to start (ON) can be set for each day of the week. This option permits ice maker 10 to conserve energy during certain parts of the day, as programmed. In certain embodiments, Time of Day Ice Production screen 518 may present a calendar in which ice production times can be set for a day, a week, a month, a year, etc. Manipulating Set Times button 522 may cause application 118 to write, save and/or upload a record of the set ice production times to memory 90 of ice maker 10 so that ice maker firmware 96a can produce ice between the selected start (ON) and stop (OFF) times. In certain embodiments, application 118 may also write, save and/or upload a record of the set ice production times to memory 110 of portable electronic device 100, to a website, to computers or servers 142, 144, 146, and/or 148, to a remote server, and/or to any suitable location for storing the set ice production times.

Figure 29:
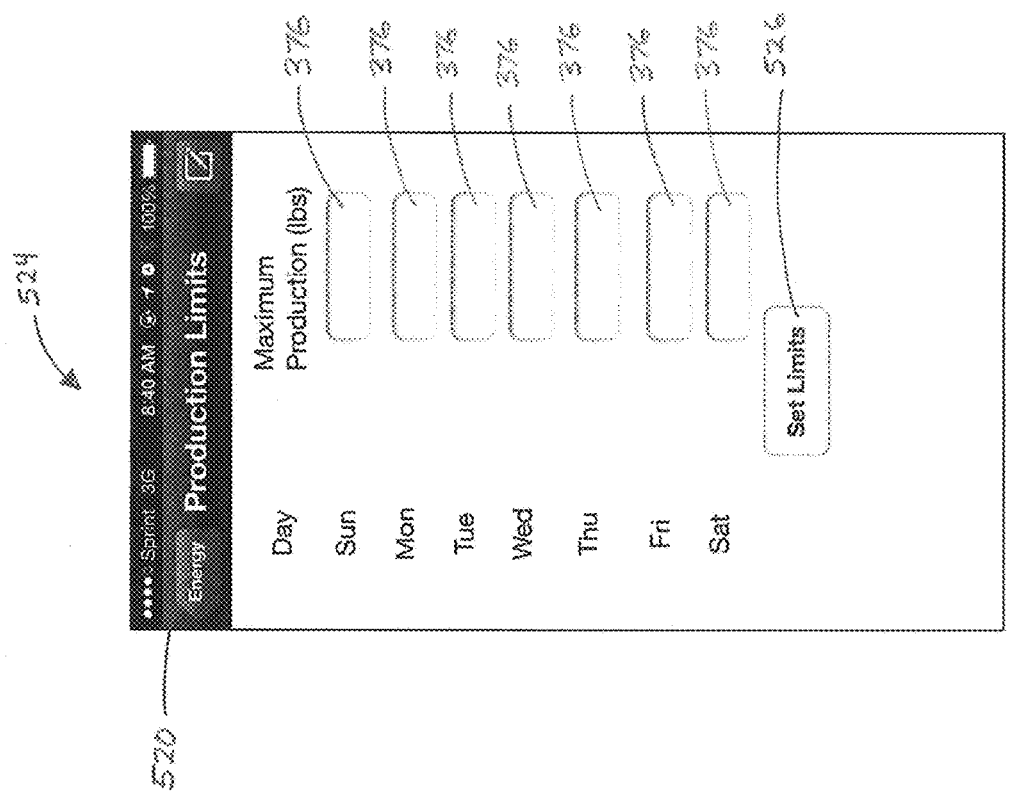

If desired, additional Energy Conservation settings can be set by returning to Energy Conservation screen 512 as shown in FIG. 27 by manipulating return to Energy Conservation Screen button 520. Then manipulating Daily Ice Production Limits button 516 may cause Daily Ice Production Limits screen 524 to be presented on user interface 108 of portable electronic device 100 as shown in FIG. 29. As illustrated on FIG. 29, Daily Ice Production Limits screen 524 may include a population of text boxes 376 corresponding to maximum ice production limits for every day of the week and a Set Limits button 526. In various embodiments, the maximum ice production limit may be measured in pounds of ice. It will be understood that the maximum ice production limit may be measured in a variety of ways without departing from the scope of the invention. The days of the week may have different and/or the same maximum ice production limits. If desired, for example, higher ice production limits can be set for Friday, Saturday and Sunday than the rest of the week. Accordingly, a maximum amount of ice to be produced by ice maker 10 can be set for each day of the week. In certain embodiments, Daily Ice Production Limits screen 524 may present a calendar in which maximum ice production amounts can be set for a day, a week, a month, a year, etc.

In certain embodiments, the maximum ice production limit may override the ice production times set on Time of Day Ice Production screen 518. For example, ice maker 10 may be set to make ice from 8 am to 8 pm on a certain day and may also be set to make a maximum of 100 pounds of ice on that same day. Accordingly, if ice maker 10 on that day makes 100 pounds of ice before 8 pm, ice maker 10 may stop producing ice because the ice production maximum has been met even though the time of day ice production time has not yet been reached. In other embodiments, ice maker 10 may continue to make ice, beyond the maximum ice production limit, until the time of day ice production time has been reached. Manipulating Set Limits button 526, may cause application 118 to write, save and/or upload a record of the set maximum ice production limits to memory 90 of ice maker 10 so that ice maker firmware 96a can produce ice until the maximum ice production limit is met. In certain embodiments, application 118 may also write, save and/or upload a record of the set maximum ice production limits to memory 110 of portable electronic device 100, to a website, to computers or servers 142, 144, 146, and/or 148, to a remote server, and/or to any suitable location for storing a record of the set maximum ice production limits. Production Limits screen 524 may also include a return to Energy Conservation Screen button 520 that, when manipulated, returns application 118 to Energy Conservation screen 512 as shown in FIG. 23.

Returning to FIG. 6, manipulating Service button 332 may cause Service screen 528 to be presented on user interface 108 of portable electronic device 100 as shown in FIG. 30. As illustrated on FIG. 30, Service screen 528 may include a population of buttons, including, but not limited to, return to Menu Screen button 338, Contact Manufacturer button 530, Override Controller button 532, Auto-Diagnostics button 534, History Logs Button 536, and Firmware button 538. Return to Menu Screen button 338 may, when manipulated, return application 118 to Menu screen 314 as shown in FIG. 6.

Manipulating Contact Manufacturer button 530 may cause Contact Manufacturer screen 540 to be presented on user interface 108 of portable electronic device 100 as shown in FIG. 31. As illustrated on FIG. 31, Contact Manufacturer screen 540 may include a population of buttons, including, but not limited to, return to Service screen button 542, Call Us button 544, and Email Us button 546. Manipulating Call Us button 544 may initiate a telephone call to the manufacturer of ice maker 10. The telephone call may be conducted over portable electronic device 100. Manipulating Email Us button 546 may launch an application in which an email may be composed and sent to the manufacturer of ice maker 10. In certain embodiments, Contact Manufacturer screen 540 may also display other information, including, but not limited to, a list of closest dealers of ice maker 10, a list of closest servicers of ice maker 10, and/or a list of factory contacts for ice maker 10. Manipulating return to Service screen button 542 may return application 118 to Service screen 528 as shown in FIG. 30.

Figures 32A, 32B:
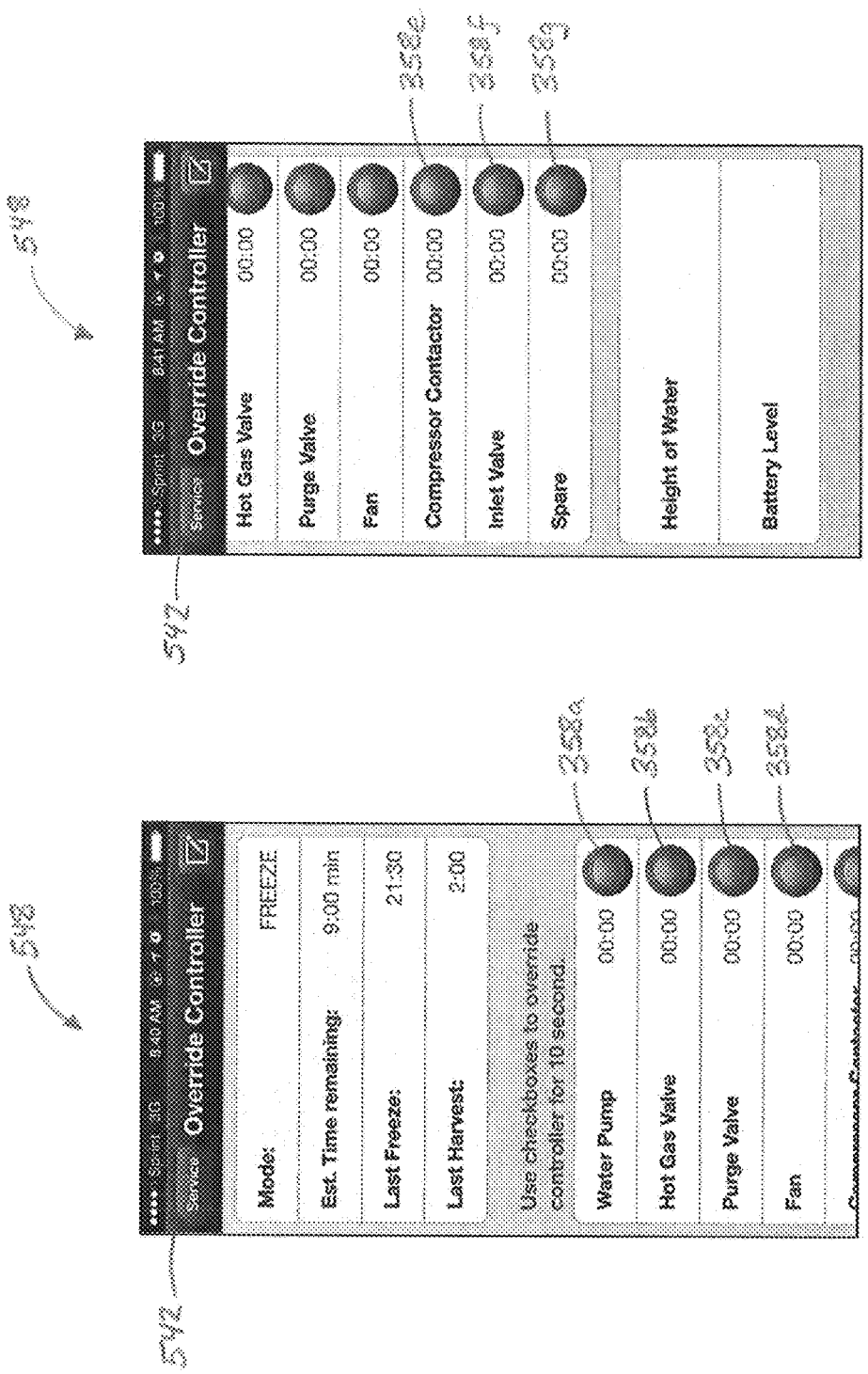

Accordingly, if desired, additional Service functions can be carried out by returning to Service screen 528 as shown in FIG. 30 by manipulating return to Service screen button 542. Then manipulating Override Controller button 532 may cause Override Controller screen 548 to be presented on user interface 108 of portable electronic device 100 as shown in FIGS. 32A and 32B. Override Controller screen 548 may be a scrollable screen and to illustrate the entire screen, multiple views at different scrolled positions are shown in FIGS. 32A and 32B. Manipulating Override Controller screen 548 permits application 118 on portable electronic device 100 to send signals to and/or receive signals from controller 80 of ice maker 10 which permit application 118 to monitor and/or override controller 80 of ice maker 10. Therefore, application 118 may receive information regarding the current and/or historical operating information of the various components of ice maker 10.

Accordingly, in certain embodiments, Override Controller screen 548 may display the operating information of one or more of compressor 12, condenser fan 15, water pump 62, hot gas valve 24, purge valve 56, water inlet valve 52. In other embodiments, Override Controller screen 548 may display information as to whether an ice storage bin is full, and the depth of the water level in the sump of ice maker 10. Accordingly, application 118 can cause controller 80 to operate ice machine according to inputs from application 118 instead of according to ice maker firmware 96a stored in memory 90 of controller 80. Override Controller screen 548 may present or display information about the operating status of ice maker 10 reported to portable electronic device 100 by controller 80 of ice maker 10. This information may include, but is not limited to, the current operating mode of ice maker 10 (e.g., freeze, harvest, purge, etc.), the estimated time remaining in that mode, the duration of the last freeze cycle or mode, the duration of the last harvest cycle or mode, the height of the water in the sump, the charge of an on-board battery (if equipped), etc.

Furthermore, Override Controller screen 548 may include a population of radio buttons 358 which, when selected, cause a signal to be sent to controller 80 to override controller 80. Thus, application 118 can force controller 80 to operate various components of ice maker 10. For example, selecting radio button 358a may cause application 118 to send a signal to controller 80 to force controller 80 to turn on water pump 62, selecting radio button 358b may cause application 118 to send a signal to controller 80 to force controller 80 to open hot gas valve 24, selecting radio button 358*c* may cause application 118 to send a signal to controller 80 to force controller 80 to open purge valve 24, selecting radio button 358*d* may cause application 118 to send a signal to controller 80 to force controller 80 to turn on condenser fan 15, selecting radio button 358*e* may cause application 118 to send a signal to controller 80 to force controller 80 to turn on compressor 12, selecting radio button 358*f* may cause application 118 to send a signal to controller 80 to force controller 80 to open water inlet valve 52. Additionally, Override Controller screen 548 may include one or more spare radio buttons 358 for overriding additional components of ice maker 10.

In certain embodiments, some or all of the population of radio buttons 358 on Override Controller screen 548 may be selected at the same or similar times. For example, radio buttons 358*a*, 358*b*, and 358*c* may all be selected at or about the same time. In other embodiments, only one of the population of radio buttons 358 on Override Controller screen 548 may be selected at a time. In certain embodiments, the override of controller 80 by application 118 may last for a period of time. The period of time may be from about 5 seconds to about 1 minute (e.g., about 5 seconds, about 10 seconds, about 15 seconds, about 20 seconds, about 25 seconds, about 30 seconds, about 35 seconds, about 40 seconds, about 45 seconds, about 50 seconds, about 55 seconds, about 1 minute). In other embodiments, the override of controller 80 by application 118 may last as long as radio button 358 is selected. By overriding controller 80 with application 118, ice maker 10 may be diagnosed to determine if the components of ice maker 10 are working properly.

Figures 33A, 33B:
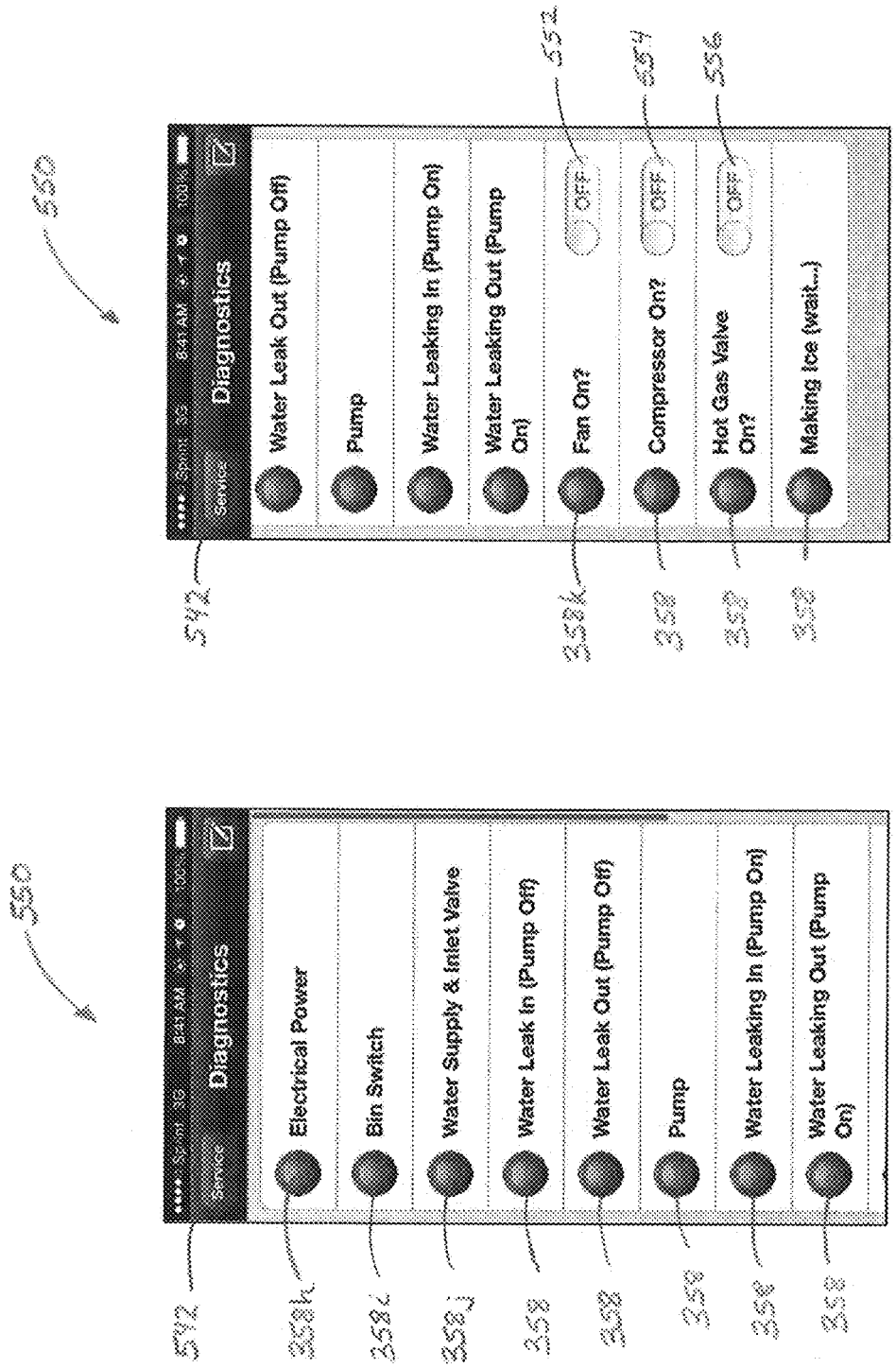
Figure 24:
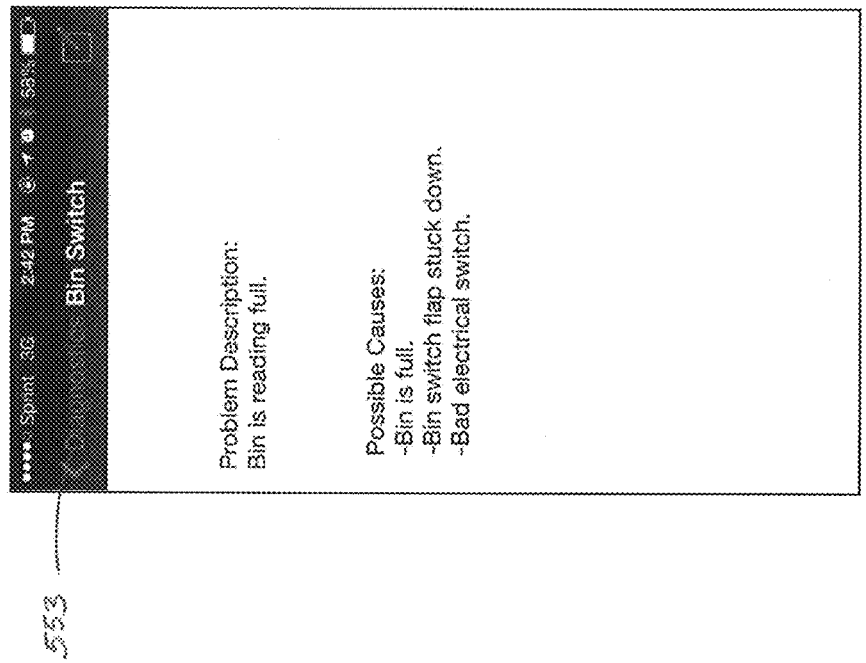

If desired, additional Service functions can be carried out by returning to Service screen 528 as shown in FIG. 30 by manipulating return to Service screen button 542. Then manipulating Auto-Diagnostics button 534 may cause Auto-Diagnostics screen 550 to be presented on user interface 108 of portable electronic device 100 as shown in FIGS. 33A and 33B. Auto-Diagnostics screen 550 may be a scrollable screen and to illustrate the entire screen, multiple views at different scrolled positions are shown in FIGS. 33A and 33B. Manipulating Auto-Diagnostics button 534 may cause application 118 on portable electronic device 100 to send signals to and/or receive signals from controller 80 of ice maker 10 to begin a diagnostics routine. Controller 80 of ice maker 10 can then perform a diagnostics routine to detect a failure mode of the components of ice maker 10 and can send signals to portable electronic device 100 thereby communicating the results of the diagnostics routine. Application 118 can thus present or display the results of the diagnostics routine on user interface 108. Accordingly, a user can view information regarding the operating status of components of ice maker 10. Auto-Diagnostics screen 550 may include a population of radio buttons 358 that can indicate the results of the diagnostics routine of ice maker 10.

In certain embodiments, some or all of the population of radio buttons 358 may be selected by application 118 based on information received from controller 80 regarding the results of the diagnostics routine of ice maker 10. For example, if the diagnostics routine indicates one or more failure modes, application 118 can cause one or more radio buttons 358 to display that one or more failure modes have been detected. In certain embodiments, application 118 may indicate that a failure mode has been detected by turning one or more radio buttons 358 red. Accordingly, if the diagnostics routine indicates that one or more components of ice maker 10 are working properly, application 118 can cause one or more radio buttons 358 to display that one or more components of ice maker 10 are working properly. In certain embodiments, application 118 may indicate that one or more components of ice maker 10 are working properly by turning one or more radio buttons 358 green. Thus, the population of radio buttons 358 may indicate the results of the diagnostics routine without the need for a user to select the population of radio buttons. It will be understood that other means of displaying the results of the diagnostics routines may be used without departing from the scope of the invention.

For example, application 118 on portable electronic device 100 can determine from its communication status with ice maker 10 whether controller 80 and/or ice maker 10 has electrical power. If there is no power to controller 80 and/or ice maker 10, portable electronic device 100 may not be able to connect to ice maker 10. If controller 80 and/or ice maker 10 does not have electrical power, application 118 may turn radio button 358*h* red, indicating a problem with the electrical power. Application 118 may then be able to display possible reasons why ice maker 10 does not have electrical power. In another example, if diagnostics routine performed by controller 80 of ice maker 10 determines that water inlet valve 52 is working properly, application 118 may turn radio button 358*j* green.

While controller 80 may be able to perform a diagnostics routine on certain components of ice maker 10 without further intervention from application 118, controller 80 may not be able to perform a diagnostics routine on other components of ice maker 10. For example, controller 80 of ice maker 10 can determine if power has been provided to condenser fan 15, compressor 12 and/or hot gas valve 24, but in certain embodiments controller 80 may not be able to determine if any of these components have actually turned on or opened. For these components, and potentially others on which controller 80 may not be able to perform an automatic diagnostics routine, the diagnostic feature of application 118 can use information provided the user of application 118 to diagnose problems with ice maker 10. By manipulating Fan On button 352, Compressor On button 554, and/or Hot Gas Valve On button 556 a signal can be sent from application 118 on portable electronic device 100 to controller 80 of ice maker 10 to assist in controller 80 determining whether a failure mode of one or more of the components of ice maker 10 has occurred. For example, controller 80 may attempt to turn on condenser fan 15 and a user of application 118 can see and/or hear if condenser fan 15 is on. If the user determines that condenser fan 15 is off, the user can manipulate Fan On button 352 to OFF to signal to controller 80 that condenser fan 15 is off. Application 118 may then turn radio button 358*k* red, indicating a failure mode.

If one or more failure modes of one or more components has occurred, application 118 may present or display on user interface 108 one or more screens showing possible explanations of why the failure modes have occurred. Potential fixes to the failure modes may also be presented or displayed on user interface 108. For example, as shown in FIG. 34, if ice maker 10 includes a bin switch and it is determined that a failure mode of the bin switch has occurred, radio button 358*i* may indicate that a failure mode has been detected and Bin Switch Failure screen 551 may be presented or displayed on user interface 108 of portable electronic device 100. The Bin Switch Failure screen may list a failure mode or problem description as well as possible may cause of the failure mode. Bin Switch Failure screen 551 may also include a return to Diagnostics Screen button 553 that, when manipulated, returns application 118 to Diagnostics screen 550 as shown in FIGS. 33A and 33B. It will be understood that application 118 may present or display screens similar to Bin Switch Failure screen 551 for one or more of the other components of ice maker 10 without departing from the scope of the invention.

Figure 36:
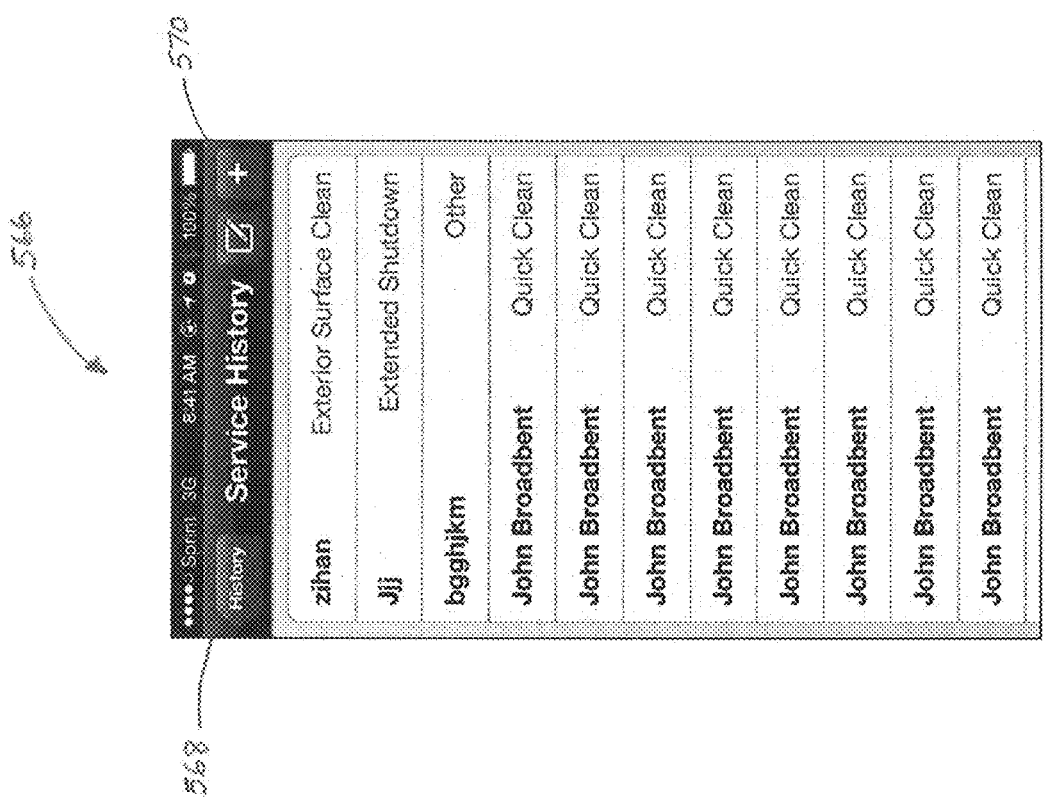

If desired, additional Service functions can be carried out by returning to Service screen 528 as shown in FIG. 30 by manipulating return to Service screen button 542. Then manipulating History Logs button 536 may cause History screen 558 to be presented on user interface 108 of portable electronic device 100 as shown in FIG. 35. As illustrated on FIG. 35, History screen 558 may include a population of buttons, including, but not limited to, return to Service Screen button 542, Service History button 560, Performance history button 562, Event Log button 564. Manipulating return to Service screen button 542 may return application 118 to Service screen 528 as shown in FIG. 30. Manipulating Service History button 560 may cause Service History screen 566 to be presented on user interface 108 of portable electronic device 100 as shown in FIG. 36. Manipulating Service History button 560 of application 118 may also cause application 118 to access and read service record data stored on memory 90 of ice maker 10, memory 110 of portable electronic device 100, a website, computers or servers 142, 144, 146, and/or 148, a remote server, and/or any suitable location which may store the service record data of ice maker 10. As illustrated on FIG. 36, Service History screen 566 may include a population of buttons, including, but not limited to, return to History Screen button 568 and Add New Service Record button 570. Service history screen 566 may also display a list of prior service records, thus showing the service history for the ice maker 10 to which portable electronic device 100 is attached. Manipulating return to History Screen button 568 may return application 118 to History screen 558 as shown in FIG. 35.

Accordingly, the service record data may be populated by application 118 after a variety of actions are completed using application 118 as described more fully elsewhere herein. This may include, but is not limited to, when installation is completed by manipulating Installation Complete button 378 (see FIGS. 8A, 8B, 8C), when quick clean is completed by manipulating Quick Clean Complete button 385 (see FIG. 9), when full clean is completed by manipulating Full Clean Complete button 396 (see FIGS. 10A, 10B, 10C), when full sanitize is completed by manipulating Full Sanitize Complete button 402 (see FIG. 11), when exterior surface clean is completed by manipulating Exterior Surface Clean Complete button 408 (see FIG. 12), and/or when extended shutdown is completed by manipulating Extended Shutdown Complete button 422 (see FIGS. 13A, 13B).

The above service record data, as well as other service record data, may also be populated by manipulating Add Service Record button 570 which may permit the entry of service record information including, but not limited to, the person performing the service, the type of service performed, the date of service, and/or notes about the service. Application 118 may then write, save and/or upload the added service record to memory 90 of ice maker 10, to memory 110 of portable electronic device 100, to a website, to computers or servers 142, 144, 146, and/or 148, to a remote server, and/or to any suitable location for storing the service record data. If desired, additional history information can be viewed by returning to History screen 558 as shown in FIG. 35 by manipulating return to History Screen button 568.

Returning to FIG. 35, manipulating Performance History button 562 may cause Performance History screen 572 to be presented on user interface 108 of portable electronic device 100 as shown in FIG. 37. Manipulating Performance History button 562 of application 118 may also cause application 118 to access and read service performance history information stored on memory 90 of ice maker 10, memory 110 of portable electronic device 100, a website, computers or servers 142, 144, 146, and/or 148, a remote server, and/or any suitable location which may store the performance history information of ice maker 10. In certain embodiments, the performance history information displayed on Performance History screen 572 may include, but is not limited to, the amount of ice produced, the energy consumed, the weight of water used, or any other performance history information desired. In certain embodiments, the performance history information for each of the last seven days may be displayed. In other embodiments, the performance history information for the last month may be displayed. In yet other embodiments, the performance history information for the last year may be displayed. Accordingly, it will be understood that performance history information may be displayed for any period of time without departing from the scope of the invention.

Figure 38:
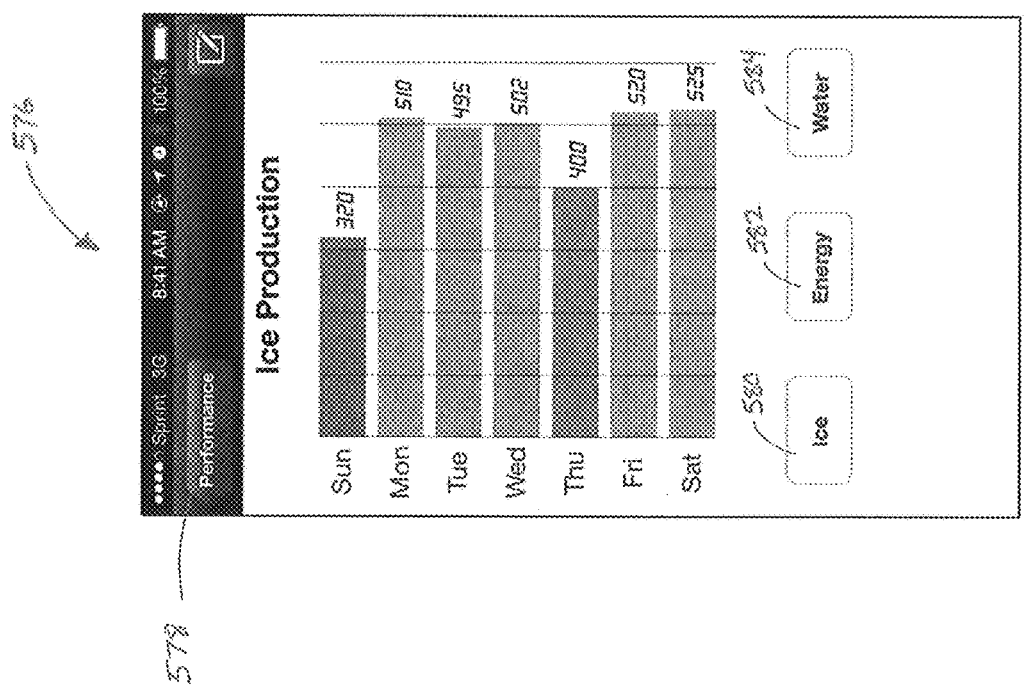
Figure 39:
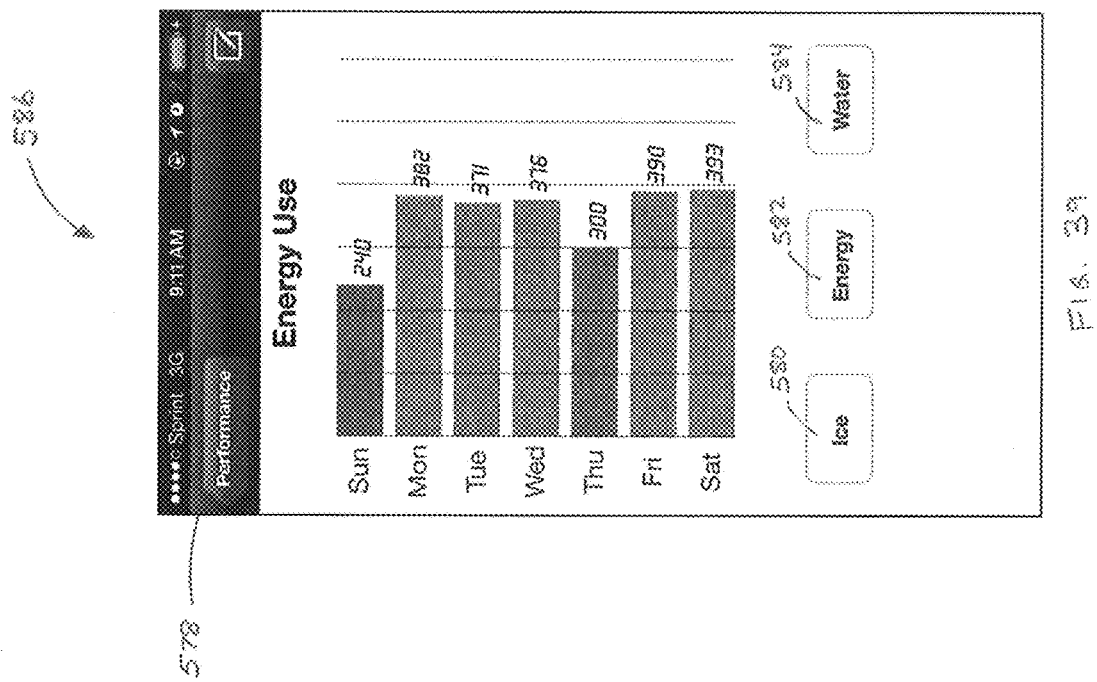
Figure 40:
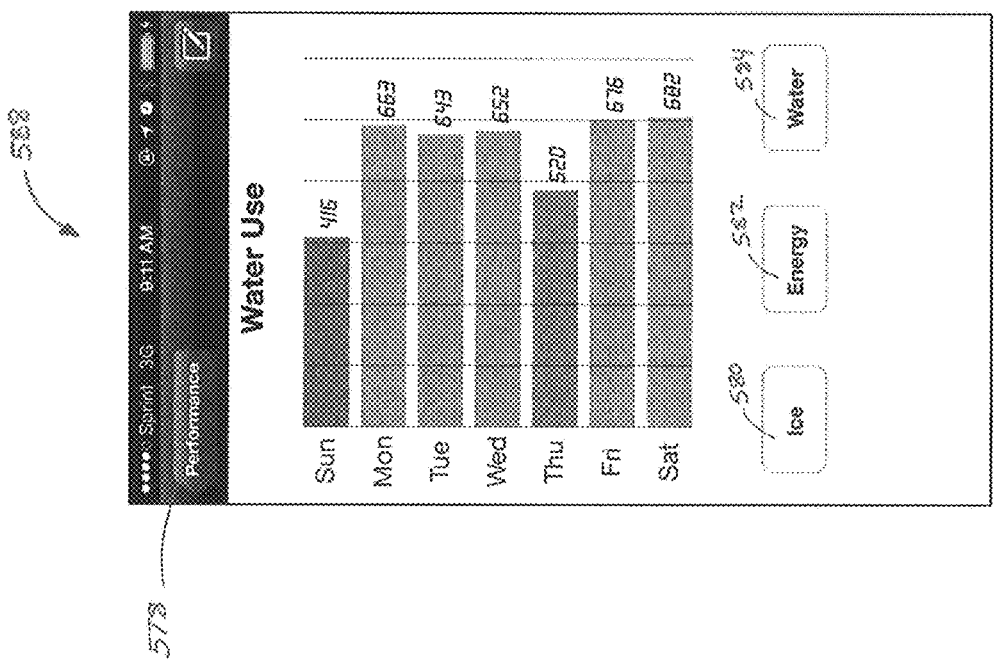

As illustrated on FIG. 37, Performance History screen 572 may also include a Graph button 574, that when manipulated displays the performance history information in graph format. Accordingly, manipulating Graph button 574 may cause Ice Production screen 576 (see FIG. 38), Energy Use screen 586 (see FIG. 39), or Water Use screen 588 (see FIG. 40) to be presented on user interface 108 of portable electronic device 100. Ice button 580, Energy button 582, and Water button 584 may be displayed on each of Ice Production screen 576, Energy Use screen 586, and Water Use screen 588 and may permit switching between Ice Production screen 576, Energy Use screen 586, and Water Use screen 588. The graphs may show a bar chart of the performance history and the bars may be color coded based on the amounts displayed. For example, if ice maker 10 is producing the set amount of ice within a desired range, the bar may be green. If ice maker 10 is producing ice below the desired range, but within an acceptable range, the bar may be yellow. If ice maker 10 is producing ice below the acceptable range, the bar may be red. Similar color codes may be used for displaying energy use and water use (see FIGS. 39, 40). While the graphs shown in FIGS. 38, 39, 40 are bar charts, it will be understood that any type of data visualization may be displayed without departing from the scope of the invention. In certain embodiments, the performance history may be printed, emailed, downloaded or otherwise transferred for later viewing. Each of Ice Production screen 576, Energy Use screen 586, and Water Use screen 588 may also include a return to Performance History Screen button 578, which when manipulated may cause Performance History screen 572 to be presented on user interface 108 of portable electronic device 100 as shown in FIG. 37.

Returning to FIG. 35, manipulating Event Log button 564 may cause Event Log screen 590 to be presented on user interface 108 of portable electronic device 100 as shown in FIG. 41. Manipulating Event Log button 564 of application 118 may also cause application 118 to access and read event log information stored on memory 90 of ice maker 10, memory 110 of portable electronic device 100, a website, to computers or servers 142, 144, 146, and/or 148, a remote server, and/or any suitable location which may store the event log information of ice maker 10. As illustrated on FIG. 41, Event Log screen 590 may include a population of buttons, including, but not limited to, return to History screen button 568. Event Log screen 590 may also display a list of a variety of events which have occurred that correspond to the ice maker 10 to which portable electronic device 100 is connected. In certain embodiments, Event Log screen 590 may display a history of events for all of the inputs and outputs of controller 80 of ice maker 10. For example, Event Log screen 590 may a display variety of events, including, but not limited to, dates and/or times that an On/Off bin full state was detected, dates and/or times that a no water failure mode was detected, dates and/or times that condenser fan 15 has turned off and on, etc. Displaying the variety of events on Event Log screen 590 may assist in determining whether components need cleaning, replacing, and/or whether ice maker 10 is operating properly. For example, condenser fan 150n/Off times may indicate a need to clean the condenser. Manipulating return to History Screen button 568 may return application 118 to History screen 558 as shown in FIG. 35.

Figure 42:
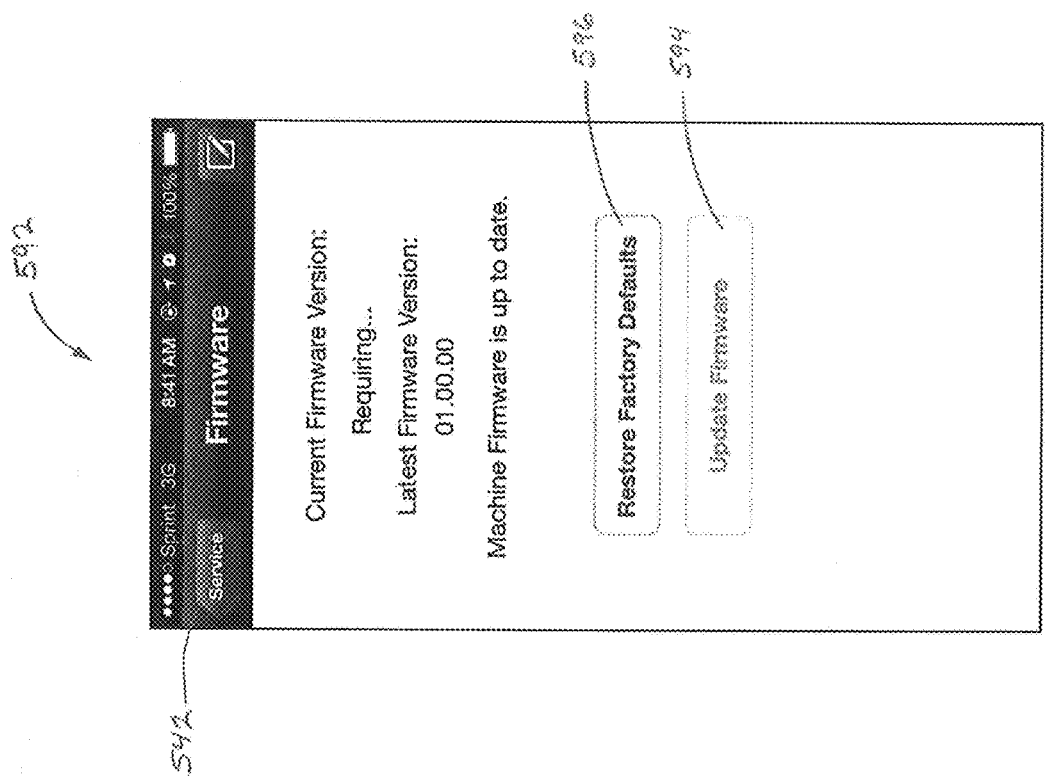

Returning to FIG. 30, manipulating Firmware button 538 may cause Firmware screen 592 to be presented on user interface 108 of portable electronic device 100 as shown in FIG. 42. Accordingly, application 188 may be able to determine the version of ice maker firmware 96a and may update ice maker firmware 96a to the latest available version. Manipulating Firmware button 538 of application 118 may also cause application 118 to access, read and/or determine the current ice maker firmware 96a stored on memory 90 of ice maker 10, memory 110 of portable electronic device 100, a website, computers or servers 142, 144, 146, and/or 148, a remote server, and/or any suitable location which may store ice maker firmware 96a of ice maker 10. Application 118 may also determine the latest version of ice maker firmware 96a available for ice maker 10 to which portable electronic device 100 is connected by querying memory 110 of portable electronic device 100, a website, computers or servers 142, 144, 146, and/or 148, a remote server, and/or any suitable location which may store the latest version of ice maker firmware 96a of ice maker 10. Firmware screen 592 may thus display the current firmware version of ice maker 10, the latest firmware for ice maker 10, and/or whether the current firmware of ice maker 10 is up to date (i.e., the same as the latest firmware available).

If the current firmware of ice maker 10 is not up to date, Update Firmware button 594 may be manipulated to download the latest version of ice maker firmware 96a from memory 110 of portable electronic device 100, a website, computers or servers 142, 144, 146, and/or 148, a remote server, and/or any suitable location which may store the latest version of ice maker firmware 96a of ice maker 10 and then upload the latest version of ice maker firmware 96a available onto memory 90 of ice maker 10, memory 110 of portable electronic device 100, a website, computers or servers 142, 144, 146, and/or 148, a remote server, and/or any suitable location which may store the version of ice maker firmware 96a of ice maker 10. Firmware screen 592 may also include a Restore Factory Defaults button 596 which may be manipulated to cause application 118 to return all settings on controller 80 of ice maker 10 to the factory defaults. In certain embodiments, for example, a prior version of ice maker firmware 96a may be uploaded onto memory 90 of ice maker 10, memory 110 of portable electronic device 100, a website, computers or servers 142, 144, 146, and/or 148, a remote server, and/or any suitable location which may store the version of ice maker firmware 96a of ice maker 10. Firmware screen 592 may also include a return to Service Screen button 542 that, when manipulated, returns application 118 to Service screen 528 as shown in FIG. 30.

Returning to FIG. 6, manipulating Help button 334 may cause Help screen 598 to be presented on user interface 108 of portable electronic device 100 as shown in FIG. 43. Help screen 598 may include a population of buttons, including, but not limited to, a return to Menu Screen button 338, a Tutorial button 600 and Frequently Asked Questions (FAQ) button 602. Manipulating return to Menu Screen button 338 may return application 118 to Menu screen 314 as shown in FIG. 6. Manipulating Tutorial button 600 may cause to be presented on user interface 108 of portable electronic device 100 a tutorial of how to use application 118. Manipulating Frequently Asked Questions (FAQ) button 602 may cause to be presented on user interface 108 of portable electronic device 100 a list of frequently asked questions regarding, but not limited to, the use of application 118, ice maker 10, the manufacturer of ice maker 10, dealers of ice maker 10, other products manufactured by the manufacturer of ice maker 10, etc.

It will be understood that application 118 may include additional and/or alternative screens which can be presented or displayed on user interface 108 of portable electronic device 100 without departing from the scope of the invention. In certain embodiments, for example, a factory screen may be displayed on user interface 108 which provides a button for starting a quality control test of ice maker 10 to determine whether ice maker 10 can successfully make ice. Manipulating a quality control test button may cause a signal to be sent to controller 80 of ice maker 10 to cause ice maker 10 to start an ice making test. Controller 80 may then be able to send a signal to portable electronic device 100 regarding the results of the test which may be presented on user interface 108 of portable electronic device 100. The results may include an indication of the cycle time to create a first batch of ice. Another button may be presented on the factory screen which, when manipulated may cause application 118 to write, save and/or upload a record a record of the ice making test to memory 90 of ice maker 10, to memory 110 of portable electronic device 100, to a website, to computers or servers 142, 144, 146, and/or 148, to a remote server, and/or to any suitable location for storing a record of the ice making test. In certain embodiments, this record may be one of a population of service records as described more fully elsewhere herein.

In other embodiments, for example, a submenu for setting date and time of ice maker 10, a date format for application 118, an installation date of ice maker 10, a language for application 118, a system of units for application 118 and/or warranty registration options for ice maker 10 may be displayed on user interface 108 of portable electronic device 100. In other embodiments, this information may be set according to other settings on portable electronic device 100. For example, if portable electronic device 100 is a smartphone and the language and units settings in the operating system 114 of the portable electronic device are set to Spanish and metric, then application 118 will be presented in Spanish and will use metric units.

In other embodiments, for example, application 118 may display a supplies screen on user interface 108 of portable electronic device 100. The supplies screen may display a population of buttons including, but not limited to, a cleaning chemicals button, a cleaning kits button, a filters button, a parts button, and a service button. Manipulating one or more of these buttons may cause to be displayed on user interface 108 of portable electronic device 100 a screen that provides options to purchase cleaning chemicals, cleaning kits, filters, parts, and service for ice maker 10. In certain embodiments, the supplies may be purchased from within application 118.

While FIGS. 5-43 are described with respect to an ice maker 10, it will be understood that refrigeration appliance control application 118 may interact with and/or control commercial, residential and industrial refrigerators 200 and/or freezers 204 in similar manners without departing from the scope of the invention. The following described examples are a non-exhaustive description of ways that application 118 may interact with and/or control commercial, residential and industrial refrigerators 200 and/or freezers 204. Accordingly, it will be understood that some or all of the above described functions of application 1118 may be applied to interacting with and/or controlling commercial, residential and industrial refrigerators 200 and/or freezers 204 without departing from the scope of the invention For example, in certain embodiments where refrigeration appliance 1000 is a residential ice maker 10, application 118 may be used to set up reminders to change a built-in water filter. In another embodiment, for example, where refrigeration appliance 1000 is a residential ice maker 10, application 118 may be used to initiate a diagnostics routine to check for a failure mode of a drain pump. In yet other embodiments, for example, where refrigeration appliance 1000 is a refrigerator 200 and/or freezer 204, application 118 may present or display an event log, similar to that described with respect to FIG. 41. For example, the event log may a display variety of events, including, but not limited to, dates and/or times that an On/Off bin full state was detected, dates and/or times of temperature readings of the evaporator, dates and/or times that condenser fan 15 has turned off and on, etc. Displaying the variety of events may assist in determining whether components need cleaning, replacing, and/or whether refrigerator 200 and/or freezer 204 is operating properly. For example, condenser fan 150n/Off times may indicate a need to clean the condenser. In various embodiments, for example, where refrigeration appliance 1000 is a refrigerator 200 and/or freezer 204, refrigerator 200 and/or freezer 204 may include an air pressure sensor which may be able to detect a clogging or clogged condenser. Application 118 may be able to present or display whether the condenser is clogged or clogging to assist in determining whether the condenser needs cleaning and/or replacement.

In other embodiments, for example, where refrigeration appliance 1000 is a refrigerator 200 and/or freezer 204, application 118 may present or display checklists for installation, cleaning, sanitizing, shutdown, etc. similar to those described with respect to FIGS. 7-14. In other embodiments, for example, where refrigeration appliance 1000 is a refrigerator 200 and/or freezer 204, reminders for cleaning and/or servicing, and recipients to receive the set reminders, may be set using application 118 similar to those described with respect to FIGS. 15-17. In other embodiments, for example, where refrigeration appliance 1000 is a refrigerator 200 and/or freezer 204, application 118 may display a variety of documents corresponding to refrigerator 200 and/or freezer 204 to which portable electronic device 100 is connected, including, but not limited to, agency approval documents, parts manuals, service manuals, user's manuals, performance and specification documents, and warranty documents, etc. similar to those described with respect to FIGS. 18-20.

In other embodiments, for example, where refrigeration appliance 1000 is a refrigerator 200 and/or freezer 204, application 118 may display or present a checklist for performing a manual defrost of refrigerator 200 and/or freezer 204. In other embodiments, application 118 may signal to controller 80 of refrigerator 200 and/or freezer 204 to initiate a defrost cycle. In yet other embodiments, for example, where refrigeration appliance 1000 is a refrigerator 200 and/or freezer 204, application 118 may permit warranty registration for refrigerator 200 and/or freezer 204. As described more fully elsewhere herein with respect to ice maker 10, warranty registration information for refrigerator 200 and/or freezer 204 may be input into application 118 and application 118 may write, save and/or upload warranty information to memory 90 of refrigerator 200 and/or freezer 204, to memory 110 of portable electronic device 100, to a website, to computers or servers 142, 144, 146, and/or 148, to a remote server, and/or to any suitable location for storing a record of the warranty registration information of refrigerator 200 and/or freezer 204. In certain embodiments, this record may be one of a population of service records as described more fully elsewhere herein.

In yet other embodiments, for example, where refrigeration appliance 1000 is a refrigerator 200 and/or freezer 204, application 118 on portable electronic device 100 may send signals to and/or receive signals from controller 80 of refrigerator 200 and/or freezer 204 to begin a diagnostics routine similar to the diagnostics routine described with respect to FIGS. 33-34. Controller 80 of refrigerator 200 and/or freezer 204 can then perform a diagnostics routine to detect a failure mode of the components of refrigerator 200 and/or freezer 204 and can send signals to portable electronic device 100 thereby communicating the results of the diagnostics routine. Application 118 can thus present or display the results of the diagnostics routine on user interface 108.

In yet other embodiments, example, where refrigeration appliance 1000 is a refrigerator 200 and/or freezer 204, application 118 may include a population of buttons, including, but not limited to, call us and/or email us buttons which, when manipulated, may initiate a telephone call and/or send an email to the manufacturer, dealer, servicer, factory contact, etc. of refrigerator 200 and/or freezer 204 similar to the description with respect to FIG. 31.

In yet other embodiments, where refrigeration appliance 1000 is a refrigerator 200 and/or freezer 204, application 118 may send signals to and/or receive signals from controller 80 of refrigerator 200 and/or freezer 204 which permit application 118 to monitor and/or override controller 80 of refrigerator 200 and/or freezer 204 similar to the description with respect to FIG. 31 similar to the controller override described with respect to FIGS. 32A and 32B.

In yet other embodiments, where refrigeration appliance 1000 is a refrigerator 200 and/or freezer 204, application 118 may display a supplies screen on user interface 108 of portable electronic device 100. The supplies screen may display a population of buttons including, but not limited to, a cleaning chemicals button, a cleaning kits button, a filters button, a parts button, and a service button. Manipulating one or more of these buttons may cause to be displayed on user interface 108 of portable electronic device 100 a screen that provides options to purchase cleaning chemicals, cleaning kits, filters, parts, and service for refrigerator 200 and/or freezer 204. In certain embodiments, the supplies may be purchased from within application 118.

The following enumerated embodiments are presented to illustrate certain aspects of the invention, and are not intended to limit its scope:

1. A method of interacting with a refrigeration appliance using a portable electronic device, wherein the refrigeration appliance comprises a refrigeration system comprising one or more refrigeration components and a controller adapted to control the one or more refrigeration components and wherein the portable electronic device comprises an application for interacting with the controller of the refrigeration appliance, the method comprising the steps of:

positioning the portable electronic device in proximity to the refrigeration appliance;

establishing a wireless communication connection between the refrigeration appliance and the portable electronic device; and displaying information on the portable electronic device corresponding to the refrigeration appliance to which the portable electronic device is connected.

2. The method of enumerated embodiment 1 wherein the step of displaying information comprises displaying one or more of: a serial number of the refrigeration appliance, a model number of the refrigeration appliance, a firmware version, and a name of the refrigeration appliance.

3. The method of enumerated embodiment 1 wherein the step of displaying information comprises displaying a checklist for one or more of: installing the refrigeration appliance, cleaning the refrigeration appliance, sanitizing the refrigeration appliance, and shutting down refrigeration appliance for an extended period of time.

4. The method of enumerated embodiment 3 further comprising manipulating a population of buttons in order to track the progress of completion of the displayed checklist.

5. The method of enumerated embodiment 3 further comprising manipulating one or more action buttons to complete one or more steps of the displayed checklist and/or to send a signal to the controller of the refrigeration appliance.

6. The method of enumerated embodiment 3 further comprising:

completing the displayed checklist; and saving a service record of the completed displayed checklist.

7. The method of enumerated embodiment 1 wherein the step of displaying information comprises displaying one or more service records.

8. The method of enumerated embodiment 7 further comprising adding one or more service records.

9. The method of enumerated embodiment 1 further comprising:

determining a version of firmware on the refrigeration appliance;

displaying on the portable electronic device the determined firmware version;

uploading a version of firmware to refrigeration appliance from portable electronic device.

10. The method of enumerated embodiment 1 wherein the step of displaying information comprises displaying documents corresponding to the refrigeration appliance to which portable electronic device is connected, and wherein the displayed documents comprise one or more of: agency approval documents, parts manuals, service manuals, user's manuals, performance and specification documents, and warranty documents.

11. The method of enumerated embodiment 1 wherein the step of displaying information comprises displaying the warranty status of the refrigeration appliance to which the portable electronic device is connected.

12. The method of enumerated embodiment 1 wherein the step of displaying information comprises displaying current operating information of the refrigeration appliance.

13. The method of enumerated embodiment 1 wherein the step of displaying information comprises displaying historical operating information of the refrigeration appliance.

14. The method of enumerated embodiment 1 further comprising the step of registering a warranty of the refrigeration appliance using the portable electronic device.

15. The method of enumerated embodiment 14 wherein the registering a warranty comprises the steps of:

entering warranty information into the portable electronic device; and uploading the warranty information to one or more of a website, a computer, a server, and the refrigeration appliance.

16. The method of enumerated embodiment 1 further comprising the steps of:

setting and/or modifying one or more operating settings of one or more of the refrigeration components on the portable electronic device; and saving the set and/or modified one or more operating settings on the refrigeration appliance using the portable electronic device.

17. The method of enumerated embodiment 16 wherein the operating settings may include one or more of: an ice thickness, a purge quantity, a temperature, a time of day ice production limit, and a maximum ice production limit.

18. The method of enumerated embodiment 1 further comprising:

scheduling one or more reminders for cleaning and/or routine servicing of the refrigeration appliance; and selecting one or more recipients to receive the one or more reminders.

19. The method of enumerated embodiment 18 wherein the frequency of each one of the one or more reminders is adjustable.

20. The method of enumerated embodiment 18 further comprising sending the one or more reminders to the one or more selected recipients.

21. The method of enumerated embodiment 20 wherein the reminders are sent via one or more of a text message, an email, a voicemail, a telephone call, an instant message, a calendar reminder.

22. The method of enumerated embodiment 1 wherein the refrigeration appliance is an ice maker comprising a refrigeration system and a water system, the refrigeration system comprising one or more of a compressor, a condenser fan, and a hot gas valve, and the water system comprising one or more of a water pump, a water inlet valve, and a purge valve.

23. The method of enumerated embodiment 22 further comprising overriding the controller of the ice maker by:

sending one or more signals from the portable electronic device to the controller of the ice maker; and operating by the controller of the ice maker one or more of the compressor, the condenser fan, the hot gas valve, the water pump, the water inlet valve, and the purge valve in response to the one or more signals sent from the portable electronic device.

24. The method of enumerated embodiment 23 wherein the operation of one or more of the compressor, the condenser fan, the hot gas valve, the water pump, the water inlet valve, and the purge valve continues for a period of time.

25. The method of enumerated embodiment 24 wherein the period of time is from about 5 seconds to about 1 minute.

26. The method of enumerated embodiment 22 further comprising diagnosing one or more failures of the ice maker by:

sending a signal from the portable electronic device to the controller of the ice maker to initiate a diagnostic routine; and initiating a diagnostic routine by the controller of the ice maker in response to the one or more signals sent from the portable electronic device; and conducting a diagnostic routine by the controller of the ice maker to detect if a failure mode of one or more of the compressor, the condenser fan, the hot gas valve, the water pump, the water inlet valve, and the purge valve has occurred.

27. The method of enumerated embodiment 26 further comprising, if one or more failure modes are detected by the controller, displaying on the portable electronic device an indication of the one or more detected failure modes.

28. The method of enumerated embodiment 27 further comprising displaying on the portable electronic device one or more potential causes of a failure mode of one or more of the compressor, the condenser fan, the hot gas valve, the water pump, the water inlet valve, and the purge valve.

29. The method of enumerated embodiment 26 further comprising sending a signal from the portable electronic device to the controller of the ice maker indicating the operating state of one or more of the compressor, the condenser fan, the hot gas valve, the water pump, the water inlet valve, and the purge valve.

30. The method of enumerated embodiment 29 further comprising displaying on the portable electronic device one or more potential causes of a failure mode of one or more of the compressor, the condenser fan, the hot gas valve, the water pump, the water inlet valve, and the purge valve.

31. The method of enumerated embodiment 1 wherein the refrigeration appliance is a refrigerator comprising a refrigeration system and a compartment, the refrigeration system comprising one or more of a compressor, a condenser fan, an evaporator fan, and a thermostat, wherein the refrigeration system is adapted to maintain a temperature in the compartment.

32. The method of enumerated embodiment 31 further comprising setting and/or modifying the temperature in the compartment of the refrigerator using the portable electronic device.

33. The method of enumerated embodiment 31 further comprising overriding the controller of the refrigerator by:

sending one or more signals from the portable electronic device to the controller of the refrigerator; and operating by the controller of the refrigerator one or more of the compressor, the condenser fan, and the evaporator fan in response to the one or more signals sent from the portable electronic device.

34. The method of enumerated embodiment 33 wherein the operation of one or more of the compressor, the condenser fan, and the evaporator fan continues for a period of time.

35. The method of enumerated embodiment 34 wherein the period of time is from about 5 seconds to about 1 minute.

36. The method of enumerated embodiment 31 further comprising diagnosing one or more failures of the refrigerator by:

sending a signal from the portable electronic device to the controller of the refrigerator to initiate a diagnostic routine; and initiating a diagnostic routine by the controller of the refrigerator in response to the one or more signals sent from the portable electronic device; and conducting a diagnostic routine by the controller of the refrigerator to detect if a failure mode of one or more of the compressor, the condenser fan, and the evaporator fan has occurred.

37. The method of enumerated embodiment 36 further comprising, if one or more failure modes are detected by the controller, displaying on portable electronic device an indication of the one or more detected failure modes.

38. The method of enumerated embodiment 37 further comprising displaying on the portable electronic device one or more potential causes of a failure mode of one or more of the compressor, the condenser fan, and the evaporator fan.

39. The method of enumerated embodiment 36 further comprising sending a signal from the portable electronic device to the controller of the refrigerator indicating the operating state of one or more of the compressor, the condenser fan, and the evaporator fan.

40. The method of enumerated embodiment 39 further comprising displaying on the portable electronic device one or more potential causes of a failure mode of one or more of the compressor, the condenser fan, and the evaporator fan.

41. The method of enumerated embodiment 1 wherein the refrigeration appliance is a freezer comprising a refrigeration system and a compartment, the refrigeration system comprising one or more of a compressor, a condenser fan, an evaporator fan, and a thermostat, wherein the refrigeration system is adapted to maintain a temperature in the compartment.

42. The method of enumerated embodiment 41 further comprising setting and/or modifying the temperature in the compartment of the freezer using the portable electronic device.

43. The method of enumerated embodiment 41 wherein controlling the operation of the freezer comprises initiating a defrost cycle.

44. The method of enumerated embodiment 41 further comprising overriding the controller of the freezer by:

sending one or more signals from the portable electronic device to the controller of the freezer; and operating by the controller of the freezer one or more of the compressor, the condenser fan, and the evaporator fan in response to the one or more signals sent from the portable electronic device.

45. The method of enumerated embodiment 44 wherein the operation of one or more of the compressor, the condenser fan, and the evaporator fan continues for a period of time.

46. The method of enumerated embodiment 45 wherein the period of time is from about 5 seconds to about 1 minute.

47. The method of enumerated embodiment 41 further comprising diagnosing one or more failures of the freezer by:

sending a signal from the portable electronic device to the controller of the freezer to initiate a diagnostic routine; and initiating a diagnostic routine by the controller of the freezer in response to the one or more signals sent from the portable electronic device; and conducting a diagnostic routine by the controller of the freezer to detect if a failure mode of one or more of the compressor, the condenser fan, and the evaporator fan has occurred.

48. The method of enumerated embodiment 47 further comprising, if one or more failure modes are detected by the controller, displaying on the portable electronic device an indication of the one or more detected failure modes.

49. The method of enumerated embodiment 48 further comprising displaying on the portable electronic device one or more potential causes of a failure mode of one or more of the compressor, the condenser fan, and the evaporator fan.

50. The method of enumerated embodiment 47 further comprising sending a signal from the portable electronic device to the controller of the refrigerator indicating the operating state of one or more of the compressor, the condenser fan, and the evaporator fan.

51. The method of enumerated embodiment 50 further comprising displaying on portable electronic device one or more potential causes of a failure mode of one or more of the compressor, the condenser fan, and the evaporator fan.

Thus, there has been shown and described novel methods, systems and apparatuses for interacting and/or controlling a refrigeration appliance with a portable electronic device, which overcome many of the problems of the prior art set forth above. It will be apparent, however, to those familiar in the art, that many changes, variations, modifications, and other uses and applications for the subject devices and methods are possible. All such changes, variations, modifications, and other uses and applications that do not depart from the spirit and scope of the invention are deemed to be covered by the invention which is limited only by the claims which follow.

The invention claimed is:

1. A method of interacting with a refrigeration appliance using a portable electronic device, wherein the refrigeration appliance comprises an ice maker comprising a refrigeration system and a water system, the refrigeration system comprising one or more of a compressor, a condenser fan, and a hot gas valve, and the water system comprising one or more of a water pump, a water inlet valve, and a purge valve, and a controller adapted to control the refrigeration system and the water system by executing a stored software module interacting with stored operating parameters and wherein the portable electronic device comprises an application for interacting with the controller, the method comprising the steps of:
 positioning the portable electronic device in proximity to the ice maker;
 establishing a wireless communication connection between the ice maker and the portable electronic device;
 displaying information on the portable electronic device corresponding to the ice maker to which the portable electronic device is connected;
 sending one or more signals from the portable electronic device to the controller; and
 operating by the controller one or more of the compressor, the condenser fan, the hot gas valve, the water pump, the water inlet valve, and the purge valve in accordance with the one or more signals from the portable electronic device, instead of the stored software module.

2. The method of claim 1 wherein the step of displaying information comprises displaying one or more of: a serial number of the refrigeration appliance, a model number of the refrigeration appliance, a firmware version, and a name of the refrigeration appliance.

3. The method of claim 1 wherein the step of displaying information comprises displaying a checklist for one or more of: installing the refrigeration appliance, cleaning the refrigeration appliance, sanitizing the refrigeration appliance, and shutting down refrigeration appliance for an extended period of time.

4. The method of claim 3 further comprising manipulating a population of buttons in order to track the progress of completion of the displayed checklist.

5. The method of claim 3 further comprising manipulating one or more action buttons to complete one or more steps of the displayed checklist and/or to send a signal from the portable electronic device to the controller of the refrigeration appliance.

6. The method of claim 3 further comprising:
 completing the displayed checklist; and
 saving a service record of the completed displayed checklist.

7. The method of claim 1 wherein the step of displaying information comprises displaying one or more service records.

8. The method of claim 7 further comprising adding one or more service records.

9. The method of claim 1 further comprising:
 determining a version of firmware on the refrigeration appliance;
 displaying on the portable electronic device the determined firmware version;
 uploading a version of firmware to refrigeration appliance from portable electronic device.

10. The method of claim 1 wherein the step of displaying information comprises displaying documents corresponding to the refrigeration appliance to which portable electronic device is connected, and wherein the displayed documents comprise one or more of: agency approval documents, parts manuals, service manuals, user's manuals, performance and specification documents, and warranty documents.

11. The method of claim 1 wherein the step of displaying information comprises displaying the warranty status of the refrigeration appliance to which the portable electronic device is connected.

12. The method of claim 1 wherein the step of displaying information comprises displaying current operating information of the refrigeration appliance.

13. The method of claim 1 wherein the step of displaying information comprises displaying historical operating information of the refrigeration appliance.

14. The method of claim 1 further comprising the step of registering a warranty of the refrigeration appliance using the portable electronic device.

15. The method of claim 14 wherein the registering a warranty comprises the steps of:
 entering warranty information into the portable electronic device; and
 uploading the warranty information to one or more of a website, a computer, a server, and the refrigeration appliance.

16. The method of claim 1 further comprising:
 scheduling one or more reminders for cleaning and/or routine servicing of the refrigeration appliance; and
 selecting one or more recipients to receive the one or more reminders.

17. The method of claim 16 wherein the frequency of each one of the one or more reminders is adjustable.

18. The method of claim 16 further comprising sending the one or more reminders to the one or more selected recipients.

19. The method of claim 18 wherein the reminders are sent via one or more of a text message, an email, a voicemail, a telephone call, an instant message, a calendar reminder.

20. The method of claim 1 wherein the operation of one or more of the compressor, the condenser fan, the hot gas valve, the water pump, the water inlet valve, and the purge valve continues for a period of time.

21. The method of claim 20 wherein the period of time is from about 5 seconds to about 1 minute.

22. The method of claim 1 further comprising diagnosing one or more failures of the ice maker by:
   sending a signal from the portable electronic device to the controller of the ice maker to initiate a diagnostic routine; and
   initiating a diagnostic routine by the controller of the ice maker in response to the one or more signals sent from the portable electronic device; and
   conducting a diagnostic routine by the controller of the ice maker to detect if a failure mode of one or more of the compressor, the condenser fan, the hot gas valve, the water pump, the water inlet valve, and the purge valve has occurred.

23. The method of claim 22 further comprising, if one or more failure modes are detected by the controller, displaying on the portable electronic device an indication of the one or more detected failure modes.

24. The method of claim 23 further comprising displaying on the portable electronic device one or more potential causes of a failure mode of one or more of the compressor, the condenser fan, the hot gas valve, the water pump, the water inlet valve, and the purge valve.

25. The method of claim 22 further comprising sending a signal from the portable electronic device to the controller of the ice maker indicating the operating state of one or more of the compressor, the condenser fan, the hot gas valve, the water pump, the water inlet valve, and the purge valve.

26. The method of claim 25 further comprising displaying on the portable electronic device one or more potential causes of a failure mode of one or more of the compressor, the condenser fan, the hot gas valve, the water pump, the water inlet valve, and the purge valve.

27. The method of claim 1 wherein the refrigeration appliance is a refrigerator comprising a refrigeration system and a compartment, the refrigeration system comprising one or more of a compressor, a condenser fan, an evaporator fan, and a thermostat, wherein the refrigeration system is adapted to maintain a temperature in the compartment.

28. The method of claim 1 wherein the refrigeration appliance is a freezer comprising a refrigeration system and a compartment, the refrigeration system comprising one or more of a compressor, a condenser fan, an evaporator fan, and a thermostat, wherein the refrigeration system is adapted to maintain a temperature in the compartment.

29. A method of interacting with a refrigeration appliance using a portable electronic device, wherein the refrigeration appliance comprises an ice maker comprising a refrigeration system and a water system, the refrigeration system comprising one or more of a compressor, a condenser fan, and a hot gas valve, and the water system comprising one or more of a water pump, a water inlet valve, and a purge valve, and a controller adapted to control the refrigeration system and the water system in accordance with stored operating settings and wherein the portable electronic device comprises an application for interacting with the controller of the ice maker, the method comprising the steps of:
   positioning the portable electronic device in proximity to the ice maker;
   establishing a wireless communication connection between the ice maker and the portable electronic device; and
   sending one or more signals from the portable electronic device to the controller to modify one or more of the stored operating settings,
   wherein the stored operating settings comprise an ice thickness, a purge quantity, a time of day ice production limit, and a maximum ice production limit.

30. A method of interacting with a refrigeration appliance using a portable electronic device, wherein the refrigeration appliance comprises an ice maker comprising a refrigeration system and a water system, the refrigeration system comprising one or more of a compressor, a condenser fan, and a hot gas valve, and the water system comprising one or more of a water pump, a water inlet valve, and a purge valve, and a controller adapted to control the refrigeration system and the water system and wherein the portable electronic device comprises an application for interacting with the controller of the ice maker, the method comprising the steps of:
   positioning the portable electronic device in proximity to the ice maker;
   establishing a wireless communication connection between the ice maker and the portable electronic device; and
   sending one or more signals from the portable electronic device to the controller to initiate a function, wherein the function is selected from the group consisting of an ice making cycle, a cleaning cycle, a harvest cycle, and a defrost cycle.

* * * * *